(12) United States Patent
Icho et al.

(10) Patent No.: US 8,244,673 B2
(45) Date of Patent: Aug. 14, 2012

(54) INFORMATION PRESENTING DEVICE, INFORMATION PRESENTING METHOD, INFORMATION PRESENTING PROGRAM, AND INTEGRATED CIRCUIT

(75) Inventors: Keiji Icho, Osaka (JP); Noriaki Horii, Osaka (JP); Atsushi Saso, Kanagawa (JP)

(73) Assignee: Panasonic Corporation, Osaka (JP)

( * ) Notice: Subject to any disclaimer, the term of this patent is extended or adjusted under 35 U.S.C. 154(b) by 455 days.

(21) Appl. No.: 12/373,568

(22) PCT Filed: Aug. 23, 2007

(86) PCT No.: PCT/JP2007/066334
§ 371 (c)(1),
(2), (4) Date: Jan. 13, 2009

(87) PCT Pub. No.: WO2008/026495
PCT Pub. Date: Mar. 6, 2008

(65) Prior Publication Data
US 2010/0010986 A1 Jan. 14, 2010

(30) Foreign Application Priority Data
Aug. 30, 2006 (JP) ................................ 2006-233910

(51) Int. Cl.
*G06F 17/00* (2006.01)
*G06F 17/30* (2006.01)
(52) U.S. Cl. ........ 707/621; 707/688; 707/796; 707/804; 707/805; 463/1
(58) Field of Classification Search .................. 707/609, 707/602–603, 688, 705, 730, 748–752, 791–792, 707/797, 802–805, 821–829, 621, 796, 913–916; 463/40, 42–43, 1; 455/414.1, 414.3–414.4, 455/418; 709/203, 215–220; 725/9, 13, 725/34–35, 45–46
See application file for complete search history.

(56) References Cited

U.S. PATENT DOCUMENTS
5,778,382 A 7/1998 Hatori
(Continued)

FOREIGN PATENT DOCUMENTS
CN 1698051 11/2005
(Continued)

OTHER PUBLICATIONS
Michael Drafke, "Graphic Organizers"1993, 4 pages.*
(Continued)

*Primary Examiner* — Srirama Channavajjala
(74) *Attorney, Agent, or Firm* — Wenderoth, Lind & Ponack, L.L.P.

(57) ABSTRACT

An information presenting device for narrowing down information for users and stimulating interest in users from various viewpoints, and presenting the information to users in an easily ascertainable manner. Specifically, a content recommending device displays an image, a commonality map image includes a title image, a Venn diagram image, and a details button image. The Venn diagram in the commonality map image relating to all content is narrowed down to a Venn diagram about a set containing, as elements, content IDs of content having an attribute value, for example, "Mayumi Hamada" for an attribute "artist". In the content recommending device, a multiple profile acquiring unit acquires viewing/listening history tables including content IDs of content viewed/listened to in player terminals, and a profile common relationship ascertaining unit calculates an extent of a common portion of the acquired viewing/listening history tables. The commonality is expressed as a Venn diagram.

26 Claims, 39 Drawing Sheets

U.S. PATENT DOCUMENTS

| | | | |
|---|---|---|---|
| 6,243,725 B1 * | 6/2001 | Hempleman et al. | 715/210 |
| 6,393,426 B1 * | 5/2002 | Odom et al. | 1/1 |
| 6,587,127 B1 * | 7/2003 | Leeke et al. | 715/765 |
| 6,912,505 B2 * | 6/2005 | Linden et al. | 705/14.53 |
| 7,043,433 B2 * | 5/2006 | Hejna, Jr. | 704/270 |
| 7,653,653 B2 * | 1/2010 | Lefferts et al. | 707/821 |
| 2002/0018074 A1 * | 2/2002 | Buil et al. | 345/719 |
| 2002/0152278 A1 * | 10/2002 | Pontenzone et al. | 709/217 |
| 2003/0020739 A1 * | 1/2003 | Cohen et al. | 345/700 |
| 2003/0126108 A1 | 7/2003 | Martino et al. | |
| 2003/0140059 A1 * | 7/2003 | Ishizaka | 707/103 R |
| 2003/0236582 A1 * | 12/2003 | Zamir et al. | 700/94 |
| 2004/0266336 A1 * | 12/2004 | Patsiokas et al. | 455/3.04 |
| 2004/0267774 A1 * | 12/2004 | Lin et al. | 707/100 |
| 2005/0045025 A1 * | 3/2005 | Wells et al. | 84/615 |
| 2006/0015193 A1 | 1/2006 | Kato | |
| 2006/0195516 A1 * | 8/2006 | Beaupre | 709/203 |
| 2006/0227975 A1 * | 10/2006 | Ueda et al. | 380/281 |
| 2007/0027923 A1 * | 2/2007 | Tsukazaki et al. | 707/104.1 |
| 2007/0239697 A1 * | 10/2007 | Chen et al. | 707/4 |
| 2008/0091717 A1 * | 4/2008 | Garbow et al. | 707/104.1 |
| 2009/0077132 A1 * | 3/2009 | Yamamoto et al. | 707/200 |
| 2011/0173261 A1 * | 7/2011 | McCallie et al. | 709/204 |

FOREIGN PATENT DOCUMENTS

| | | | |
|---|---|---|---|
| EP | 1016991 | * | 7/2000 |
| GB | 2389742 | * | 12/2003 |
| JP | 7-306862 | | 11/1995 |
| JP | 9-6791 | | 1/1997 |
| JP | 2003-162544 | | 6/2003 |
| JP | 2004-94813 | | 3/2004 |
| JP | 2004-234128 | | 8/2004 |
| JP | 2004-326227 | | 11/2004 |
| JP | 2005-513688 | | 5/2005 |
| WO | WO 99/27681 | * | 6/1999 |
| WO | WO 0153963 | * | 7/2001 |

OTHER PUBLICATIONS

International Search Report issued Oct. 2, 2007 in the International (PCT) Application PCT/JP2007/066334 of which the present application is the U.S. National Stage.

* cited by examiner

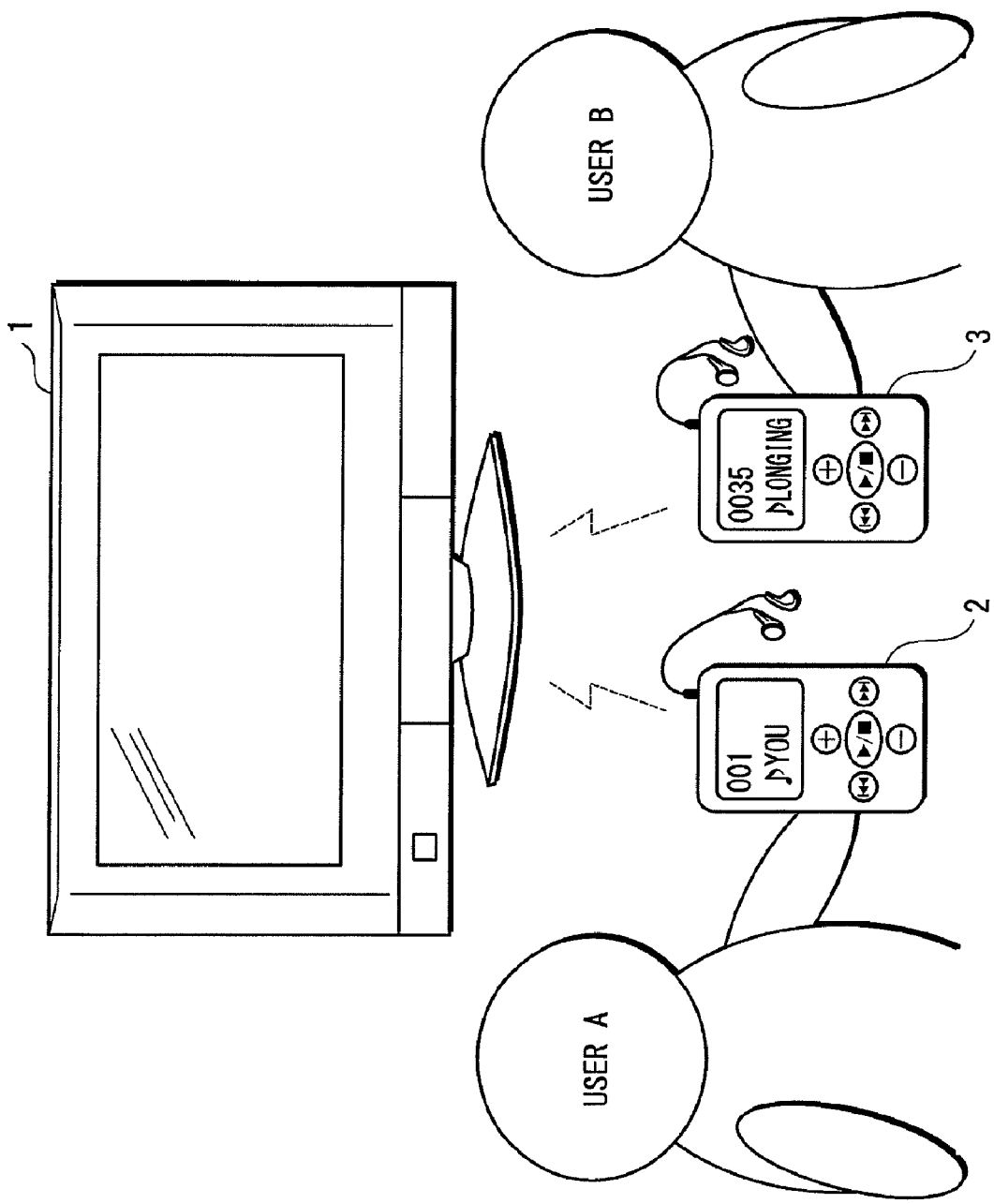

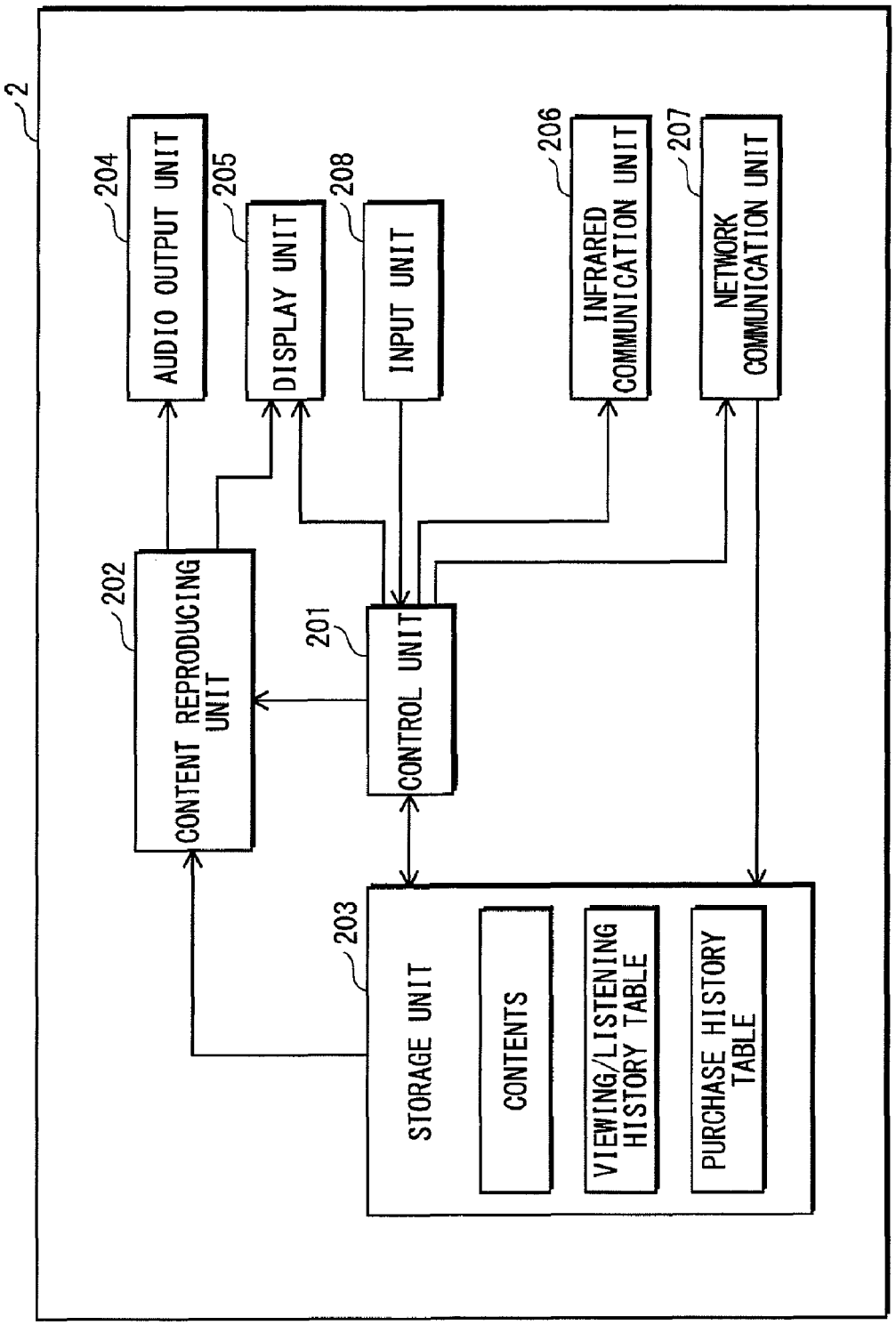

FIG. 3

| CONTENT ID | SONG TITLE | SONG STYLE | ARTIST NAME | ARTIST GENRE | REPRODUCTION COUNT |
|---|---|---|---|---|---|
| 01 | YOU | 2 (BALLAD) | MAYUMI HAMADA | 1 (JPOPS) | 45 |
| 02 | NEVER-ENDING SADNESS | 2 (BALLAD) | MAYUMI HAMADA | 1 (JPOPS) | 33 |
| 03 | BOYS AND GIRLS | 2 (BALLAD) | MAYUMI HAMADA | 1 (JPOPS) | 34 |
| 04 | THE BEGINNING | 1 (ROCK) | MAYUMI HAMADA | 1 (JPOPS) | 21 |
| 05 | HEAVEN | 1 (ROCK) | MAYUMI HAMADA | 1 (JPOPS) | 14 |
| 06 | RAINY DAY | 2 (BALLAD) | MAYUMI HAMADA | 1 (JPOPS) | 76 |
| 07 | REVOLUTION | 2 (BALLAD) | MAYUMI HAMADA | 1 (JPOPS) | 87 |
| 08 | LOVE | 2 (BALLAD) | MAYUMI HAMADA | 1 (JPOPS) | 98 |
| 09 | TRAUMA | 2 (BALLAD) | MAYUMI HAMADA | 1 (JPOPS) | 54 |
| 10 | INSPIRATION | 2 (BALLAD) | MAYUMI HAMADA | 1 (JPOPS) | 53 |
| 11 | MOMENT | 2 (BALLAD) | MAYUMI HAMADA | 1 (JPOPS) | 22 |
| 12 | VOYAGE | 2 (BALLAD) | MAYUMI HAMADA | 1 (JPOPS) | 35 |
| 13 | DAWN | 2 (BALLAD) | MAYUMI HAMADA | 1 (JPOPS) | 67 |
| 14 | EXISTENCE | 2 (BALLAD) | MAYUMI HAMADA | 1 (JPOPS) | 13 |
| 15 | TRUST | 2 (BALLAD) | MAYUMI HAMADA | 1 (JPOPS) | 24 |
| 16 | TOMORROW'S WIND | 1 (ROCK) | MAYUMI HAMADA | 1 (JPOPS) | 89 |

FIG. 4

| CONTENT ID | SONG TITLE | SONG STYLE | ARTIST NAME | ARTIST GENRE | REPRODUCTION COUNT |
|---|---|---|---|---|---|
| 01 | YOU | 2 (BALLAD) | MAYUMI HAMADA | 1 (JPOPS) | 100 |
| 02 | NEVER-ENDING SADNESS | 2 (BALLAD) | MAYUMI HAMADA | 1 (JPOPS) | 50 |
| 03 | BOYS AND GIRLS | 2 (BALLAD) | MAYUMI HAMADA | 1 (JPOPS) | 30 |
| 04 | THE BEGINNING | 1 (ROCK) | MAYUMI HAMADA | 1 (JPOPS) | 10 |
| 05 | HEAVEN | 1 (ROCK) | MAYUMI HAMADA | 1 (JPOPS) | 90 |
| 06 | RAINY DAY | 2 (BALLAD) | MAYUMI HAMADA | 1 (JPOPS) | 60 |
| 07 | REVOLUTION | 2 (BALLAD) | MAYUMI HAMADA | 1 (JPOPS) | 40 |
| 08 | LOVE | 2 (BALLAD) | MAYUMI HAMADA | 1 (JPOPS) | 33 |
| 09 | TRAUMA | 2 (BALLAD) | MAYUMI HAMADA | 1 (JPOPS) | 24 |
| 10 | INSPIRATION | 2 (BALLAD) | MAYUMI HAMADA | 1 (JPOPS) | 1 |
| 11 | MOMENT | 2 (BALLAD) | MAYUMI HAMADA | 1 (JPOPS) | 55 |
| 12 | VOYAGE | 2 (BALLAD) | MAYUMI HAMADA | 1 (JPOPS) | 42 |
| 13 | DAWN | 2 (BALLAD) | MAYUMI HAMADA | 1 (JPOPS) | 37 |
| 17 | SPIRITED | 2 (BALLAD) | MAYUMI HAMADA | 1 (JPOPS) | 34 |
| 18 | THE STARS | 1 (ROCK) | MAYUMI HAMADA | 1 (JPOPS) | 98 |

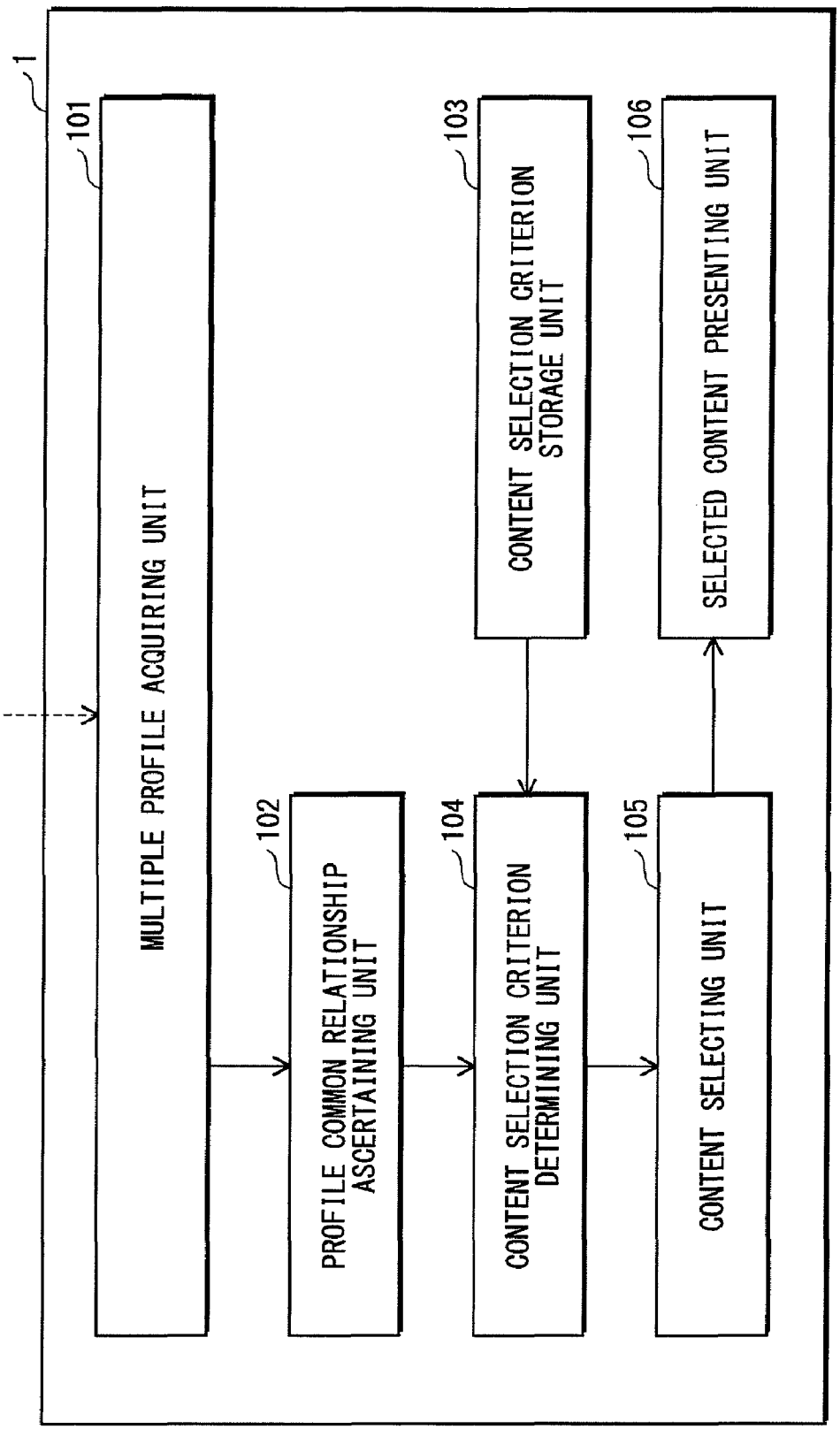

FIG. 7

| UNION LIST | PRODUCT SET LIST |
|---|---|
| 01 | 01 |
| 02 | 02 |
| 03 | 03 |
| 04 | 04 |
| 05 | 05 |
| 06 | 06 |
| 07 | 07 |
| 08 | 08 |
| 09 | 09 |
| 10 | 10 |
| 11 | 11 |
| 12 | 12 |
| 13 | 13 |
| 14 | |
| 15 | |
| 16 | |
| 17 | |
| 18 | |

FIG. 10

| CONTENT ID | SONG TITLE | SONG STYLE | ARTIST NAME | ARTIST GENRE | REPRODUCTION COUNT |
|---|---|---|---|---|---|
| 01 | YOU | 2 (BALLAD) | MAYUMI HAMADA | 1 (JPOPS) | 45 |
| 02 | NEVER-ENDING SADNESS | 2 (BALLAD) | MAYUMI HAMADA | 1 (JPOPS) | 33 |
| 03 | BOYS AND GIRLS | 2 (BALLAD) | MAYUMI HAMADA | 1 (JPOPS) | 34 |
| 04 | THE BEGINNING | 1 (ROCK) | MAYUMI HAMADA | 1 (JPOPS) | 21 |
| 05 | HEAVEN | 1 (ROCK) | MAYUMI HAMADA | 1 (JPOPS) | 14 |
| 06 | RAINY DAY | 2 (BALLAD) | MAYUMI HAMADA | 1 (JPOPS) | 76 |
| 07 | REVOLUTION | 2 (BALLAD) | MAYUMI HAMADA | 1 (JPOPS) | 87 |
| 08 | LOVE | 2 (BALLAD) | MAYUMI HAMADA | 1 (JPOPS) | 98 |
| 09 | TRAUMA | 2 (BALLAD) | MAYUMI HAMADA | 1 (JPOPS) | 54 |
| 10 | INSPIRATION | 2 (BALLAD) | MAYUMI HAMADA | 1 (JPOPS) | 53 |
| 11 | MOMENT | 2 (BALLAD) | MAYUMI HAMADA | 1 (JPOPS) | 22 |
| 12 | VOYAGE | 2 (BALLAD) | MAYUMI HAMADA | 1 (JPOPS) | 35 |
| 13 | DAWN | 2 (BALLAD) | MAYUMI HAMADA | 1 (JPOPS) | 67 |
| 14 | EXISTENCE | 2 (BALLAD) | MAYUMI HAMADA | 1 (JPOPS) | 13 |
| 15 | TRUST | 2 (BALLAD) | MAYUMI HAMADA | 1 (JPOPS) | 24 |
| 16 | TOMORROW'S WIND | 1 (ROCK) | MAYUMI HAMADA | 1 (JPOPS) | 89 |
| 30 | FIRST LOVE | 2 (BALLAD) | HIKARI UTADA | 1 (JPOPS) | 54 |
| 31 | KEEP FIGHTING | 1 (ROCK) | HIKARI UTADA | 1 (JPOPS) | 23 |
| 32 | FINAL | 1 (ROCK) | HIKARI UTADA | 1 (JPOPS) | 54 |
| 33 | WISH | 1 (ROCK) | HIKARI UTADA | 1 (JPOPS) | 67 |
| 34 | COLORS | 1 (ROCK) | HIKARI UTADA | 1 (JPOPS) | 78 |
| 35 | CHERRY BLOSSOMS | 2 (BALLAD) | HIKARI UTADA | 1 (JPOPS) | 8 |

FIG. 11

| CONTENT ID | SONG TITLE | SONG STYLE | ARTIST NAME | ARTIST GENRE | REPRODUCTION COUNT |
|---|---|---|---|---|---|
| 01 | YOU | 2 (BALLAD) | MAYUMI HAMADA | 1 (JPOPS) | 33 |
| 02 | NEVER-ENDING SADNESS | 2 (BALLAD) | MAYUMI HAMADA | 1 (JPOPS) | 44 |
| 03 | BOYS AND GIRLS | 2 (BALLAD) | MAYUMI HAMADA | 1 (JPOPS) | 65 |
| 04 | THE BEGINNING | 1 (ROCK) | MAYUMI HAMADA | 1 (JPOPS) | 5 |
| 05 | HEAVEN | 1 (ROCK) | MAYUMI HAMADA | 1 (JPOPS) | 34 |
| 06 | RAINY DAY | 2 (BALLAD) | MAYUMI HAMADA | 1 (JPOPS) | 23 |
| 07 | REVOLUTION | 2 (BALLAD) | MAYUMI HAMADA | 1 (JPOPS) | 86 |
| 08 | LOVE | 2 (BALLAD) | MAYUMI HAMADA | 1 (JPOPS) | 54 |
| 09 | TRAUMA | 2 (BALLAD) | MAYUMI HAMADA | 1 (JPOPS) | 63 |
| 10 | INSPIRATION | 2 (BALLAD) | MAYUMI HAMADA | 1 (JPOPS) | 4 |
| 11 | MOMENT | 2 (BALLAD) | MAYUMI HAMADA | 1 (JPOPS) | 3 |
| 12 | VOYAGE | 2 (BALLAD) | MAYUMI HAMADA | 1 (JPOPS) | 21 |
| 13 | DAWN | 2 (BALLAD) | MAYUMI HAMADA | 1 (JPOPS) | 76 |
| 17 | SPIRITED | 2 (BALLAD) | MAYUMI HAMADA | 1 (JPOPS) | 85 |
| 18 | THE STARS | 1 (ROCK) | MAYUMI HAMADA | 1 (JPOPS) | 77 |
| 30 | FIRST LOVE | 2 (BALLAD) | HIKARI UTADA | 1 (JPOPS) | 21 |
| 36 | WITHOUT YOU | 1 (ROCK) | HIKARI UTADA | 1 (JPOPS) | 43 |
| 37 | DANGER | 1 (ROCK) | HIKARI UTADA | 1 (JPOPS) | 62 |
| 38 | TIME LIMIT | 1 (ROCK) | HIKARI UTADA | 1 (JPOPS) | 74 |
| 39 | DISTANCE | 1 (ROCK) | HIKARI UTADA | 1 (JPOPS) | 42 |
| 40 | LONGING | 2 (BALLAD) | HIKARI UTADA | 1 (JPOPS) | 1 |

FIG. 13

| ATTRIBUTE VALUE | COMMONALITY RATIO S |
|---|---|
| MAYUMI HAMADA | 0.72 |
| HIKARI UTADA | 0.09 |

FIG. 19A

| CONTENT ID | SONG TITLE | SONG STYLE | ARTIST NAME | ARTIST GENRE |
|---|---|---|---|---|
| 01 | YOU | 2 (BALLAD) | MAYUMI HAMADA | 1 (JPOPS) |
| 20 | INSPIRATION | 2 (BALLAD) | MAYUMI HAMADA | 1 (JPOPS) |
| 21 | SONG OF JOY | 1 (ROCK) | MAYUMI HAMADA | 1 (JPOPS) |

FIG. 19B

| CONTENT ID | SONG TITLE | SONG STYLE | ARTIST NAME | ARTIST GENRE |
|---|---|---|---|---|
| 01 | YOU | 2 (BALLAD) | MAYUMI HAMADA | 1 (JPOPS) |
| 20 | INSPIRATION | 2 (BALLAD) | MAYUMI HAMADA | 1 (JPOPS) |
| 22 | FUN PARK | 1 (ROCK) | MAYUMI HAMADA | 1 (JPOPS) |

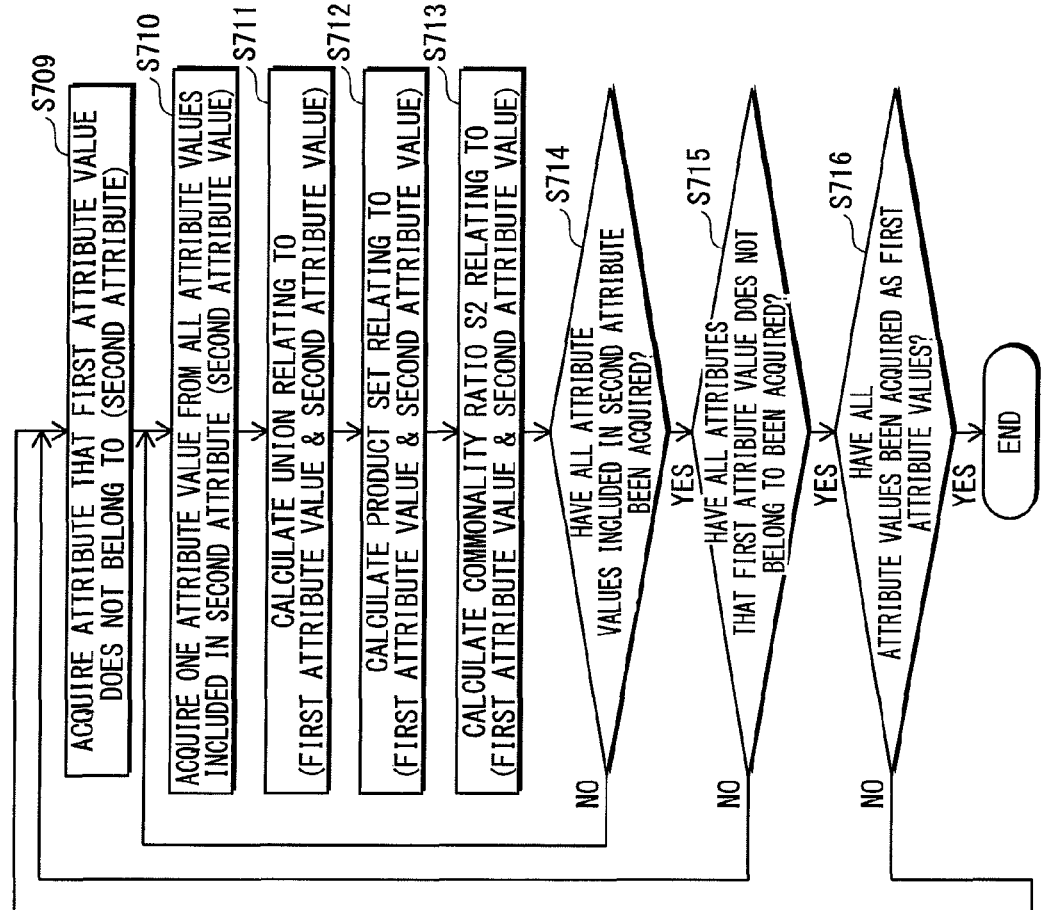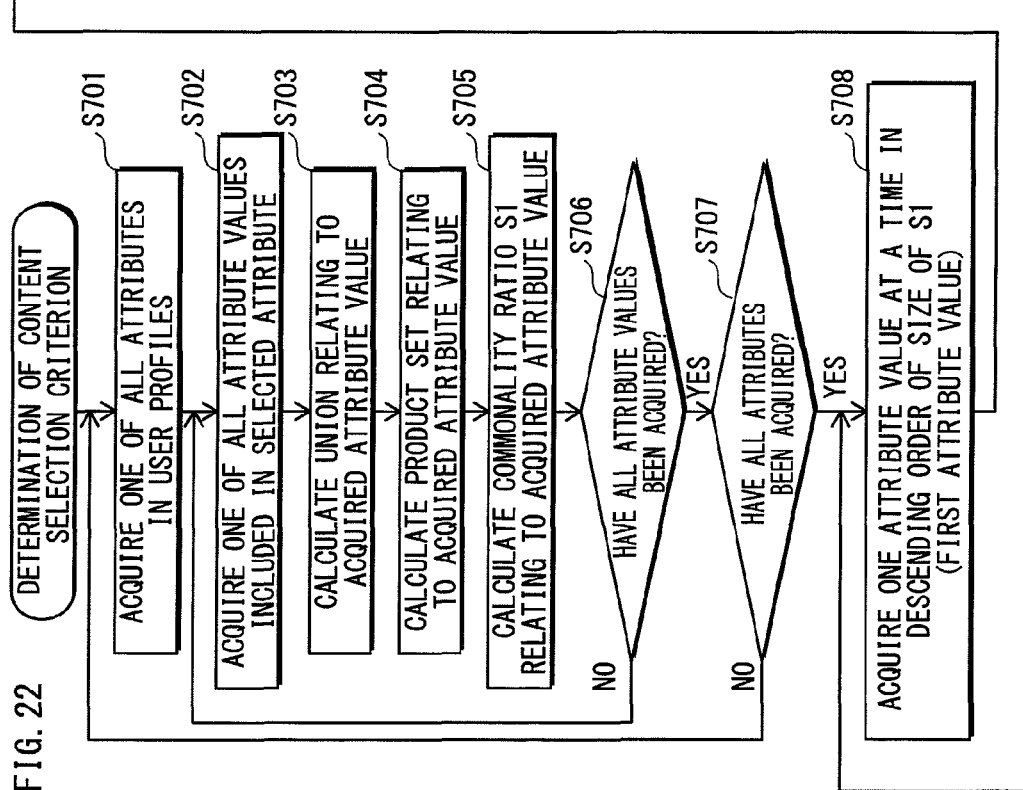
FIG. 22

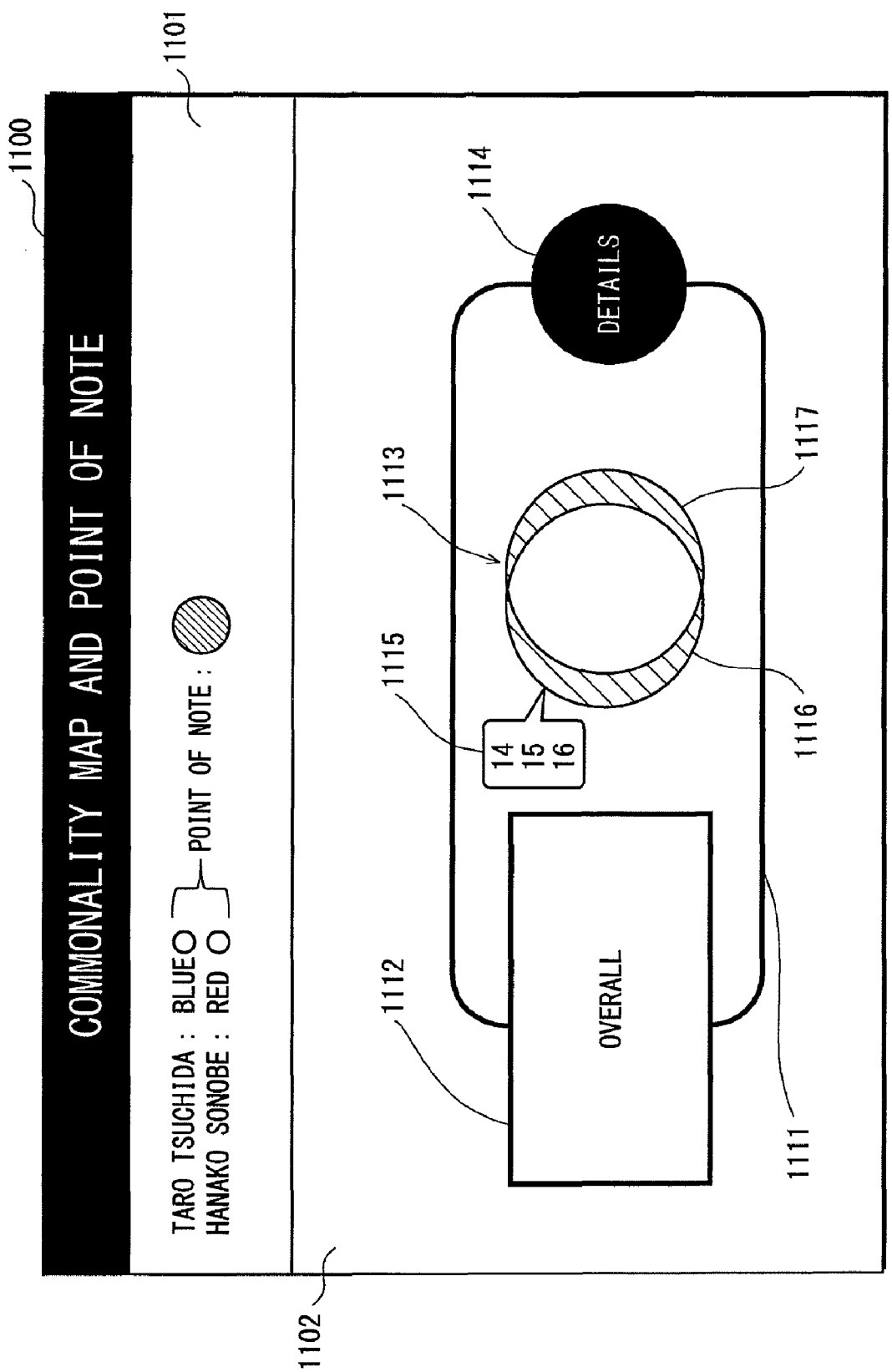

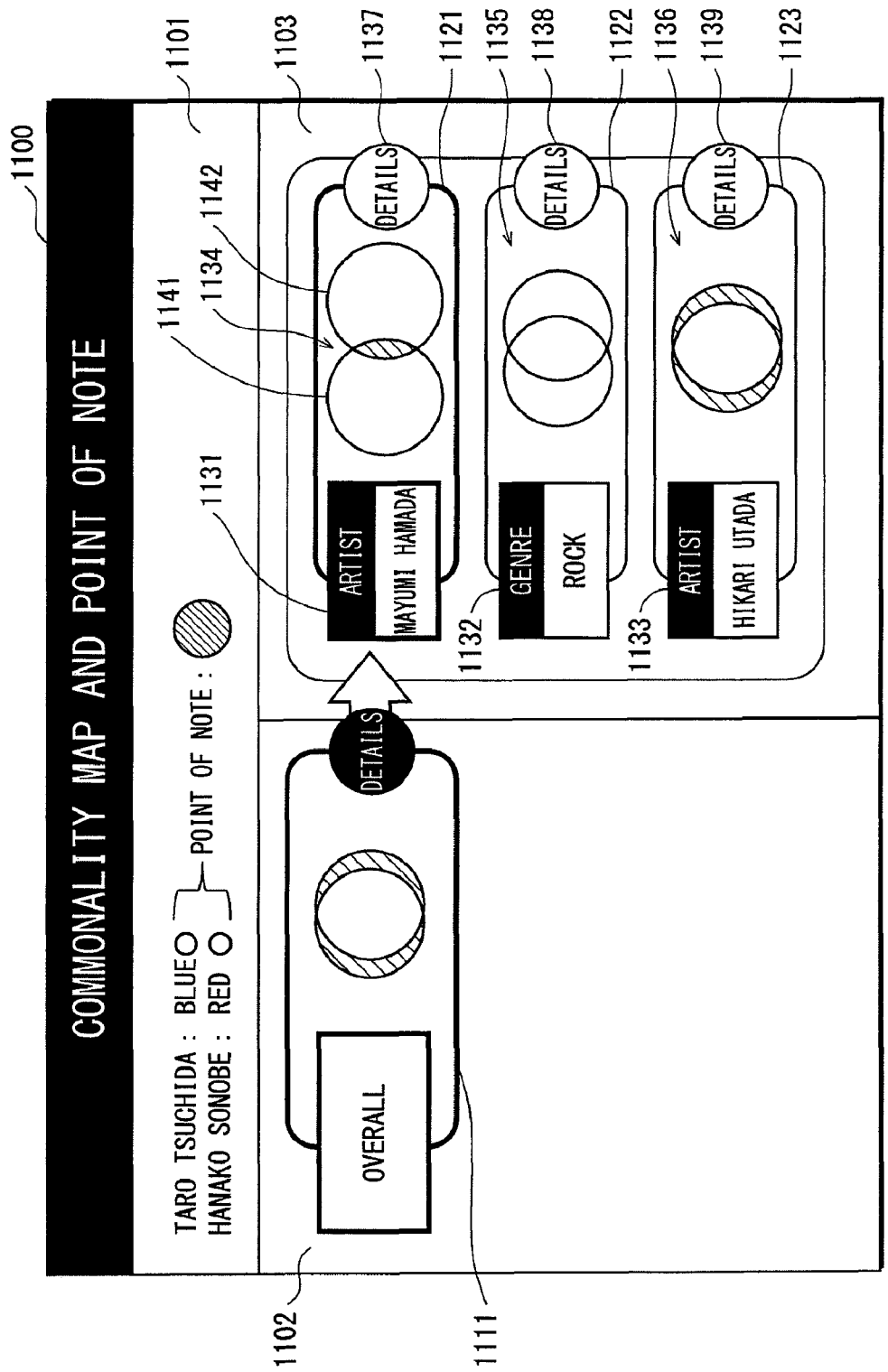

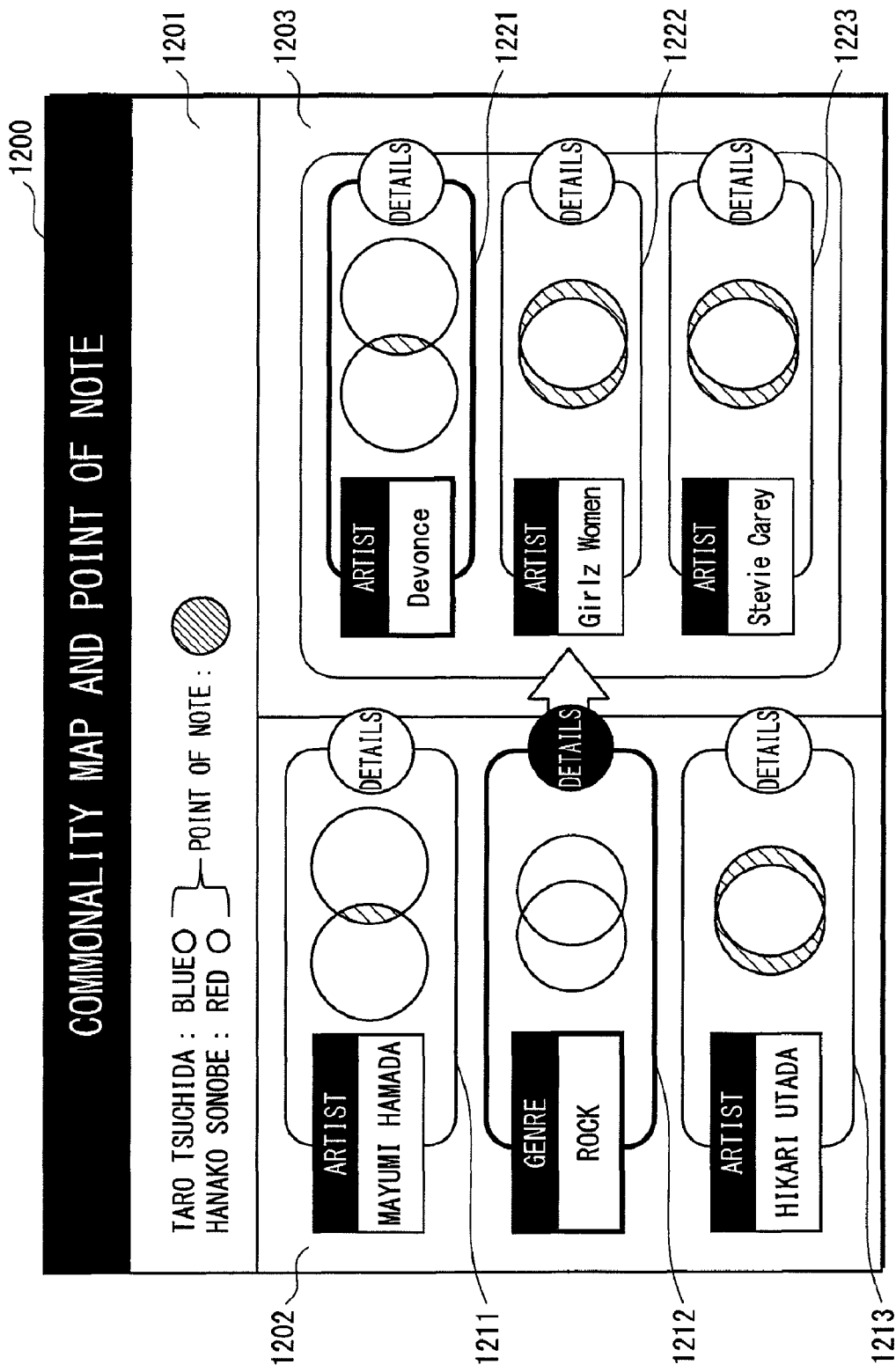

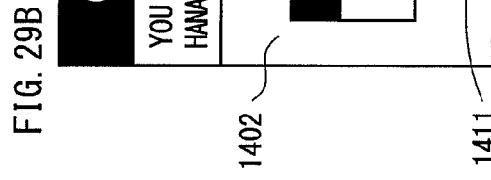
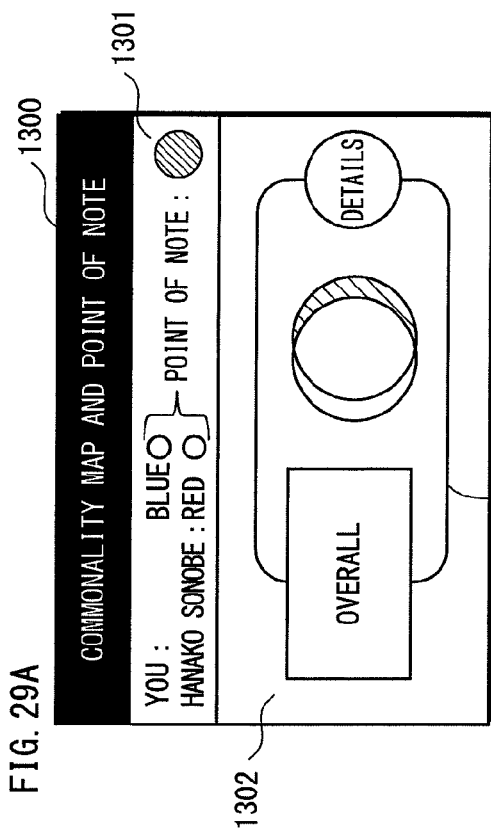
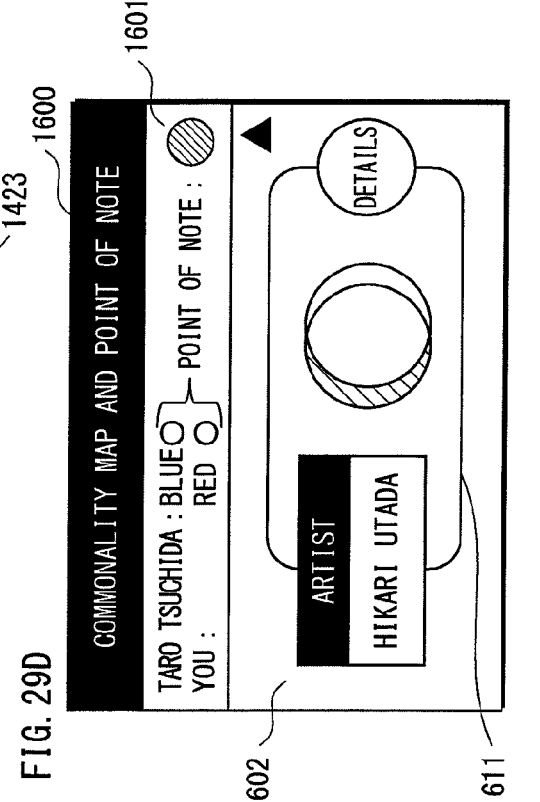
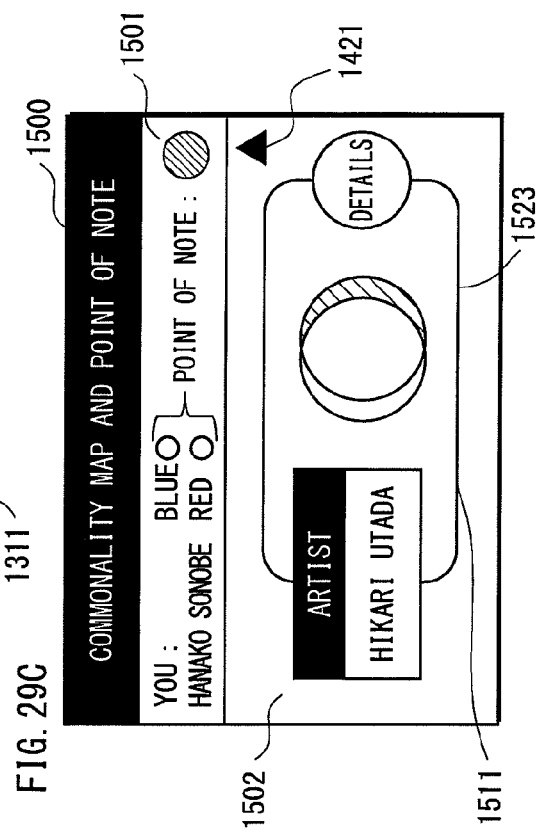

FIG. 33

| | 3301 | 3302 | 3303 | 3304 | 3305 | 3306 |
|---|---|---|---|---|---|---|
| PHOTO 1 | (ACTIVITY MEDIUM, DRIVE) | ... | (ZONE, URBAN) | (AREA, KANSAI) | (DESTINATION, THEME PARK) | (PARK NAME, OSAKA PARK) |
| PHOTO 2 | ......... | ......... | ......... | ......... | ......... | ......... |
| ......... | | | | | | |
| PHOTO 100 | (DESTINATION, THEME PARK) | (PARK NAME, TOKYO PARK) | (THEME, SCARY MACHINE) | (AREA, KANTO) | (PREFECTURE, CHIBA) | |
| | 3307 | 3308 | 3309 | 3310 | 3311 | 3312 |

FIG. 34

| | 3401 | 3402 | 3403 | 3404 |
|---|---|---|---|---|
| PHOTO 1 | (ACTIVITY MEDIUM, DRIVE) | (ZONE, URBAN) | | (AREA, KANSAI) |
| | (DESTINATION, THEME PARK) — 3405 | (PARK NAME, OSAKA PARK) — 3406 | | |
| | (ACTIVITY CONTENT, TRAVEL) — 3407 | (AREA, KANSAI) — 3408 | | |
| PHOTO 2 | ... | ... | ......... | ......... |
| PHOTO 100 — 3411 | (DESTINATION, THEME PARK) — 3412 | (PARK NAME, TOKYO PARK) — 3413 | | |
| | | (THEME, SCARY RIDE) — 3414 | | |
| | | (AREA, KANTO) — 3415 | | (PREFECTURE, CHIBA) — 3416 |

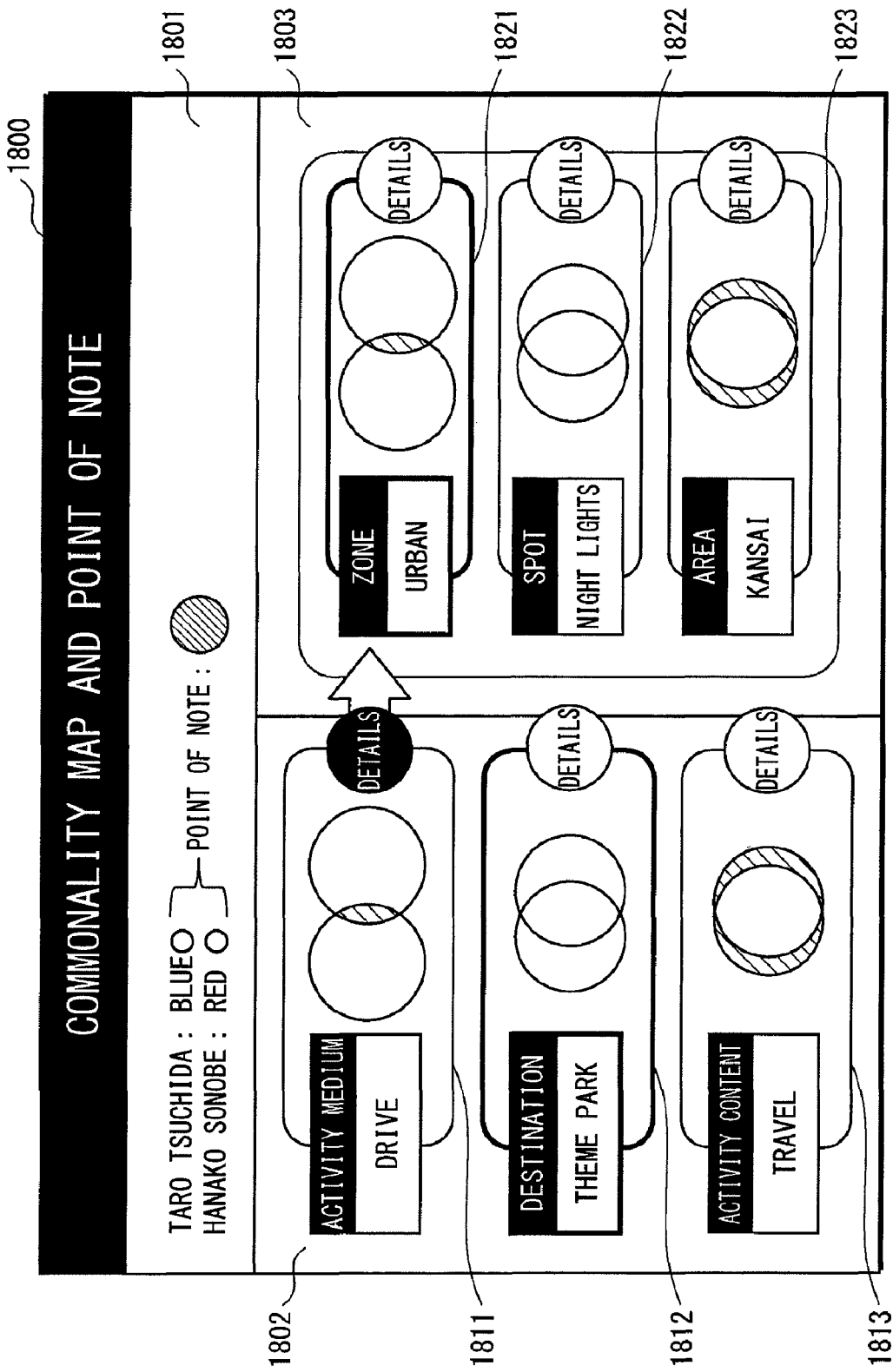

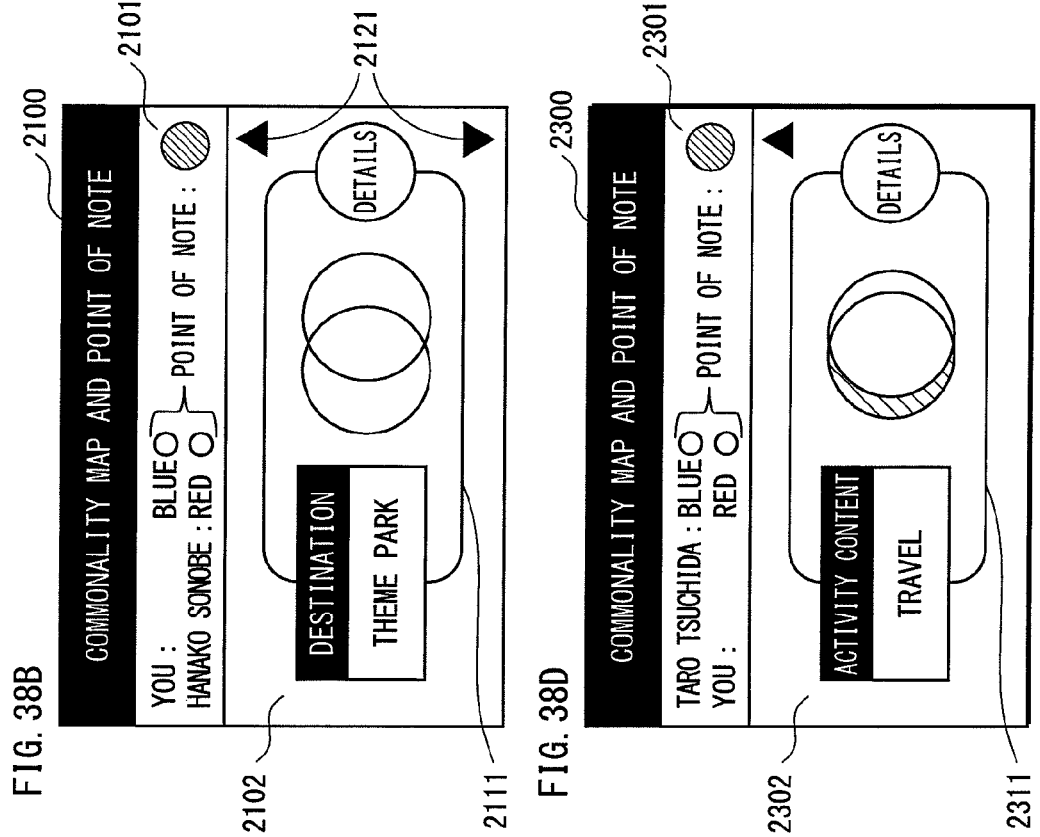
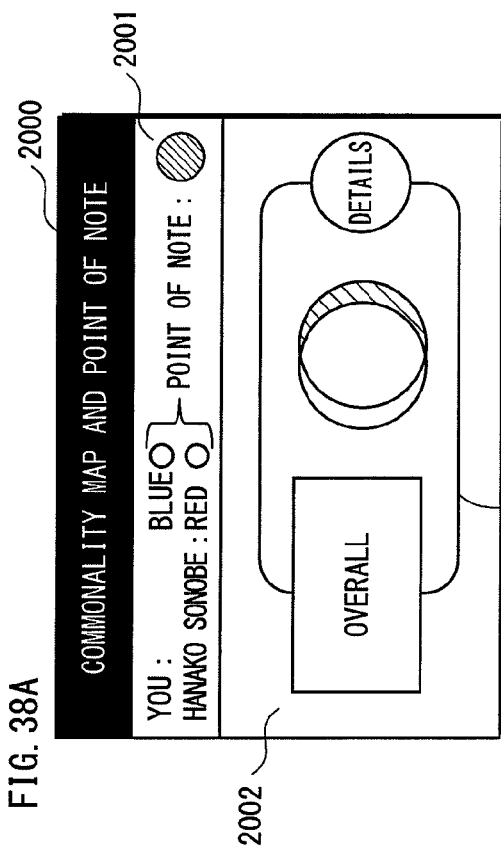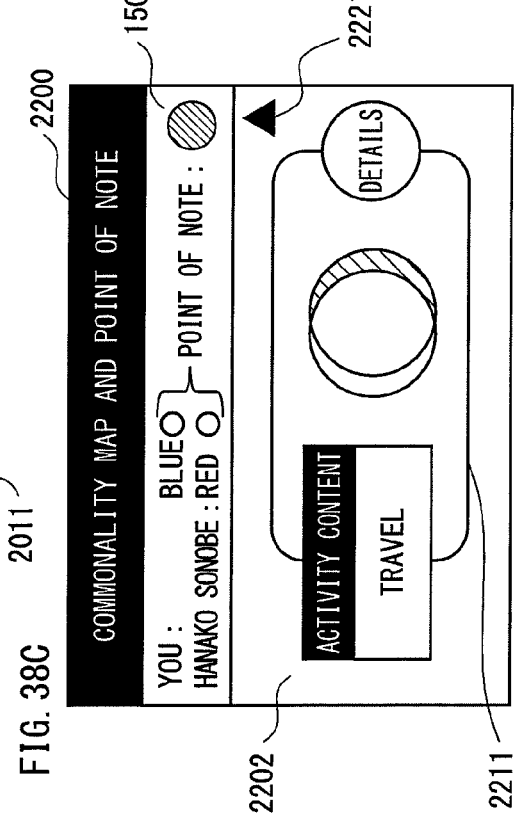

INFORMATION PRESENTING DEVICE, INFORMATION PRESENTING METHOD, INFORMATION PRESENTING PROGRAM, AND INTEGRATED CIRCUIT

TECHNICAL FIELD

The present invention relates to an information presenting device that presents beneficial information to a user based on profile information and the like including viewing/listening history, and in particular relates to a method of presenting the information.

BACKGROUND ART

One example of information presenting devices is portable music players. In recent years, due to increases in storage capacity in portable music players and the like, such portable music players have come to store an enormous volume of contents therein. This makes it difficult for the user to select suitable contents for viewing/listening to from among the overwhelming amount of contents.

In response to this problem, Patent Document 1 discloses a technique for gathering a user profile for each of a plurality of users, each of which includes viewing/listening information and the like relating to the plurality of users, and presenting contents that match a considerable number of user profiles.

Patent Document 1: JP 20.05-513688 A

DISCLOSURE OF THE INVENTION

Problem to be Solved by the Invention

However, in the conventional technique of Patent Document 1, the presented contents are selected simply on the basis that they are frequently reproduced by a plurality of users. Contents presented in this way lack freshness for the user, and are unlikely to stimulate conversation. As such, it is difficult to say that contents to be viewed/listened to are being presented appropriately.

In view of the stated problem, the present invention has an object of providing an information presenting device for presenting information about contents or the like that will stimulate conversation between users, in a manner that is easy for a user to grasp.

Means to Solve the Problem

In order to solve the stated problem, the present invention is an information presenting device for presenting a relationship between pluralities of data pieces, each plurality of data pieces being held by a respective one of a plurality of users, the information presenting device including: an acquiring unit operable to acquire at least (i) a first information group composed of a plurality of data pieces each held by a first user and attached with a first attribute and a second attribute, and (ii) a second information group composed of a plurality of data pieces each held by a second user and attached with the first attribute and the second attribute; a generating unit operable to, with respect to each of a plurality of values of the first attribute, extract data pieces having a same value of the first attribute from the first information group and the second information group, thereby generating a first subgroup consisting of the data pieces having the same value from the first information group, and a second subgroup consisting of the data pieces having the same value from the second information group; a calculating unit operable to, with respect to each of pair of generated first and second subgroups, each pair pertaining to a different one of the first attribute values, calculate a commonality between second attributes attached to the data pieces in the first subgroup and second attributes attached to the data pieces in the second subgroup in the pair; a determining unit operable to determine a presentation order in which to present all the calculated commonalities, based on how many data pieces the first and second subgroups in each respective pair contain; and a presenting unit operable to present the calculated commonalities arranged in the determined presentation order.

Effects of the Invention

According to the stated structure, the information presenting device of the present invention presents the calculated commonality ratios of each set together. Therefore, the correlation between the first and second information groups can be presented in terms of a plurality of points of view in a manner that is easy to understand at a glance for the user.

Furthermore, the presenting unit may include: a set selecting sub-unit operable to, with respect to each pair, select one of (a) a product set of the first subgroup and the second subgroup in the pair and (b) a difference set of (i) the first subgroup or the second subgroup in the pair and (ii) the product set; and a display sub-unit operable to display the commonalities arranged in the determined presentation order and in a manner that the selected one of the product set and the difference set is easily distinguishable from any other displayed set.

According to the stated structure, either the product set or the union is selected based on the commonality. Therefore, data that will stimulate conversation between the users can be recommended. For instance, between users having approximately the same tastes, as indicated by the commonality being the predetermined value of higher, data unknown to one of the users can be recommended to that user. Furthermore, between users having mostly differing tastes, data relating to their shared interests can be recommended.

Furthermore, the set selecting sub-unit may select the difference set when a ratio of the number of elements in the product set and the number of elements in the union is a predetermined value or higher.

According to the stated structure, with respect to users having approximately similar interests, as indicated by the commonality being the predetermined value of higher, data unknown to one of the users can be selected in order to recommend data that will stimulate conversation between users.

Furthermore, the set selecting sub-unit may select the product set when a ratio of the number of elements in the product set and the number of elements in the union is lower than a predetermined value.

According to the stated structure, between users having mostly differing tastes, as indicated by the ratio being lower than the predetermined value, data that will stimulate conversation between the users can be recommended, for instance by recommending data relating to an interest shared by the users.

Furthermore, the determining unit may determine the presentation order as a descending order of how many elements each of a plurality of unions contains, the unions each being a union of the first and second subgroups in a respective pair.

According to the stated structure, the commonalities are presented in descending order of the number of elements in the unions. Therefore, the data can be narrowed down in terms of interests that are estimated to be common to both users, and the data can be presented in order of the commonalities. This increases the possibility that conversation will be stimulated between the users.

Furthermore, the determining unit may determine the presentation order as a descending order of size of the commonalities of the pairs.

According to the stated structure, the commonalities are presented in order starting from the largest commonality. Therefore, the commonalities can be presented in order with the data having been narrowed down in terms of interests that are estimated to be common to both users. This increases the possibility that conversation will be stimulated between the users.

Furthermore, the calculating unit may further calculate a commonality between first attributes attached to the data pieces in the first subgroup and first attributes attached to the data pieces in the second subgroup, and the presenting unit may be further operable to present the calculated commonality of the first attributes in a visualized manner.

Furthermore, the presenting unit may be further operable to receive a switch instruction, and when the switch instruction is received, switch from the presentation of the commonality of the first attributes to the presentation of the commonalities of the second attributes, the presentation of the commonalities of the second attributes being details of what is presented in the presentation of the commonality of the first attributes.

Furthermore, the presenting unit may be further operable to receive a switch instruction, and when the switch instruction is received, switch from the presentation of the commonality of the first attributes to a presentation of the commonalities of the first attributes and the second attributes, the presentation of the commonalities of the first attributes and the second attributes being details of what is presented in the presentation of the commonality of the first attributes.

Furthermore, the presenting unit, when the commonality is equal to or greater than a predetermined value, may select a difference set of (a) the first information group or the second information group and (b) a product set of the first information group and the second information group, and display the selected difference set in a manner that the selected difference set is easily distinguishable from any other displayed set.

Furthermore, the presenting unit, when the commonality is less than a predetermined value, may select a product set of the first information group and the second information group, and display the selected product set in a manner that the selected difference set is easily distinguishable from any other displayed set.

According to the stated structure, the commonality for the first attribute value is presented in a visualized manner, and the commonalities for a plurality of second attribute values relating to data information pieces that share the first attribute value are also presented in a visualized manner. Therefore, the attributes can be managed in a hierarchical structure in which the first attribute is on a high level and the second attributes are on a lower level representing the first attribute in more detail.

Furthermore, the presenting unit may display the calculated commonality of the first attributes and the calculated commonalities of the second attributes of each pair together.

According to the stated structure, the commonality relating to the first attribute value and the commonalities relating to the second attribute values can be presented to the user in a manner that they can be ascertained at a glance.

Furthermore, each first attribute may be a grouping ID showing a grouping to which the respective data piece belongs, and each second attribute may be a data ID that identifies the respective data piece.

Furthermore, each first attribute may be a grouping ID showing a grouping to which the respective data piece belongs, and each second attribute may be a different grouping ID to the respective first attribute.

According to the stated structure, the data is grouped, and each grouping and each piece of data can be easily distinguished.

Furthermore, the first and second attributes may compose a tree structure in which the first attributes are on a top level and the second attributes are on a level below the top level, and possible values of the second attributes may be predetermined in advance in correspondence with contents of the first attributes.

According to the stated structure, the settings for the first and second attribute values are organized into a hierarchical structure, and made easily ascertainable by the user.

Furthermore, the presenting unit may display each commonality in a visualized manner by displaying a Venn diagram showing the relationship between the first subgroup and the second subgroup.

According to the stated structure, the relationship between the first and second sets can be presented to the user in an easy-to-understand manner.

Furthermore, each data piece may be content.

According to the stated structure, the correlation between the first and second information groups composed of content can be presented in terms of a plurality of points of view in a manner that is easy to understand at a glance for the user.

Furthermore, each data piece may be log information.

According to the stated structure, the correlation between the first and second information groups composed of log information can be presented in terms of a plurality of points of view in a manner that is easy to understand at a glance for the user.

Furthermore, the information presenting device may further include: a commonality calculating unit operable to calculate a commonality relating to the acquired first information group and the acquired second information group; a set selecting unit operable to, based on the commonality calculated by the commonality calculating unit, select one of (a) a common set consisting of common portions of the first information group and the second information group, and (b) a non-common set consisting of one of (i) a portion of the first information group, excluding the common portion of the first information group and (ii) a portion of the second information group, excluding the common portion of the second information group; and an information selecting unit operable to select data information pieces included in the one of the common set and the non-common set selected by the set selecting unit.

According to the stated structure, either the common set or the non-common set is selected based on the commonality. Therefore, data that will stimulate conversation between the users can be recommended. For instance, between users having approximately the same tastes, as indicated by the commonality being the predetermined value of higher, data unknown to one of the users can be recommended to that user. Furthermore, between users having mostly differing tastes, data relating to their shared interests can be recommended.

Furthermore, the set selecting unit may select the non-common set when the commonality calculated by the commonality calculating unit is a predetermined value or higher.

According to the stated structure, with respect to users having approximately similar interests, as indicated by the commonality being the predetermined value of higher, data unknown to one of the users can be selected in order to recommend data that will stimulate conversation between users.

Furthermore, the set selecting unit may select the common set when the commonality calculated by the commonality calculating unit is lower than a predetermined value.

According to the stated structure, between users having mostly differing tastes, as indicated by the ratio being lower than the predetermined value, data that will stimulate conversation between the users can be recommended, for instance by recommending data relating to an interest shared by the users.

Furthermore, the commonality calculating unit may (a) calculate a first number showing how many data information pieces are included in at least one of the first information group and the second information group, (b) calculate a second number showing how many data information pieces are included in the common set, and (c) calculate, as the commonality, a ratio of the second number to the first number.

According to the stated structure, data to be recommended can be selected using an indicator that is the ratio of the first number and the second number as the commonality.

Furthermore, each data information piece may include a data ID identifying the respective data piece, and a grouping ID showing which grouping the data piece belongs to, the acquiring unit may further (a) acquire a third information group composed of a plurality of data information pieces, and a fourth information group composed of a plurality of data information pieces, (b) with respect to each value of the grouping IDs included in the data information pieces in the third information group and the fourth information group, generate a first information group consisting of one or more data information pieces whose grouping ID has the value from among the data information pieces in the third information group, and generate a second information group consisting of one or more data information pieces whose grouping ID has the value from among the data information pieces in the fourth information group, the commonality calculating unit may be further operable to calculate, with respect to each value of the grouping IDs, a commonality of the first information group and the second information group corresponding to the grouping ID, the set selecting unit may be further operable to (a) select at least one of the grouping IDs in descending order of size of the commonalities corresponding to the values of the grouping IDs, and (b) based on the commonality corresponding to the selected grouping ID, select one of (i) a common set consisting of common portions of the first and second information groups corresponding to the value of the selected grouping ID, and (ii) a non-common set consisting portions from the first information group and the second information group corresponding to the value of the grouping ID excluding the common portions, and the information selecting unit may select one or more data information pieces included in the one of the common set and the non-common set selected by the set selecting unit.

According to the stated structure, the order in which data is recommended can be made in more detail based on the commonalities calculated for the grouping IDs. Therefore, data that will stimulate conversation between the users even more can be recommended.

An information presenting method of the present invention is an information presenting method used in an information presenting device for presenting a relationship between pluralities of data pieces, each plurality of data pieces being held by a respective one of a plurality of users, the information presenting method including: an acquiring step of acquiring at least (i) a first information group composed of a plurality of data pieces each held by a first user and attached with a first attribute and a second attribute, and (ii) a second information group composed of a plurality of data pieces each held by a second user and attached with the first attribute and the second attribute; a generating step of, with respect to each of a plurality of values of the first attribute, extracting data pieces having a same value of the first attribute from the first information group and the second information group, thereby generating a first subgroup consisting of the data pieces having the same value from the first information group, and a second subgroup consisting of the data pieces having the same value from the second information group; a calculating step of, with respect to each of pair of generated first and second subgroups, each pair pertaining to a different one of the first attribute values, calculating a commonality between second attributes attached to the data pieces in the first subgroup and second attributes attached to the data pieces in the second subgroup in the pair; a determining step of determining a presentation order in which to present all the calculated commonalities, based on how many data pieces the first and second subgroups in each respective pair contain; and a presenting step of presenting the calculated commonalities arranged in the determined presentation order.

An information presenting program of the present invention is an information presenting program used in an information presenting device for presenting a relationship between pluralities of data pieces, each plurality of data pieces being held by a respective one of a plurality of users, the information presenting program causing a computer to execute the steps of: an acquiring step of acquiring at least (i) a first information group composed of a plurality of data pieces each held by a first user and attached with a first attribute and a second attribute, and (ii) a second information group composed of a plurality of data pieces each held by a second user and attached with the first attribute and the second attribute; a generating step of, with respect to each of a plurality of values of the first attribute, extracting data pieces having a same value of the first attribute from the first information group and the second information group, thereby generating a first subgroup consisting of the data pieces having the same value from the first information group, and a second subgroup consisting of the data pieces having the same value from the second information group; a calculating step of, with respect to each of pair of generated first and second subgroups, each pair pertaining to a different one of the first attribute values, calculating a commonality between second attributes attached to the data pieces in the first subgroup and second attributes attached to the data pieces in the second subgroup in the pair; a determining step of determining a presentation order in which to present all the calculated commonalities, based on how many data pieces the first and second subgroups in each respective pair contain; and a presenting step of presenting the calculated commonalities arranged in the determined presentation order.

An integrated circuit of the present invention is an integrated circuit used in an information presenting device for presenting a relationship between pluralities of data pieces, each plurality of data pieces being held by a respective one of a plurality of users, the integrated circuit including: an acquiring unit operable to acquire at least (i) a first information group composed of a plurality of data pieces each held by a first user and attached with a first attribute and a second attribute, and (ii) a second information group composed of a plurality of data pieces each held by a second user and attached with the first attribute and the second attribute; a generating unit operable to, with respect to each of a plurality of values of the first attribute, extract data pieces having a same value of the first attribute from the first information group and the second information group, thereby generating a first subgroup consisting of the data pieces having the same value from the first information group, and a second subgroup consisting of the data pieces having the same value from the second information group; a calculating unit operable to, with respect to each of pair of generated first and second subgroups, each pair pertaining to a different one of the first attribute values, calculate a commonality between second attributes attached to the data pieces in the first subgroup and second attributes attached to the data pieces in the second subgroup in the pair; a determining unit operable to determine a presentation order in which to present all the calculated commonalities, based on how many data pieces the first and second subgroups in each respective pair contain; and a presenting unit operable to present the calculated commonalities arranged in the determined presentation order.

According to the stated structure, the calculated commonality ratios of each set are presented together. Therefore, the correlation between the first and second information groups can be presented in terms of a plurality of points of view in a manner that is easy to understand at a glance for the user.

BRIEF DESCRIPTION OF THE DRAWINGS

FIG. 1 shows the structure of a content recommending system of an embodiment of the present invention;

FIG. 2 is a block diagram showing the structure of a player terminal of an embodiment of the present invention;

FIG. 3 shows a viewing/listening history table stored by a player terminal;

FIG. 4 shows a viewing/listening history table stored by a player terminal;

FIG. 5 is a block diagram showing the structure of a content recommending device of an embodiment of the present invention;

FIG. 7 shows a union list and a product set list relating to ascertaining of a common relationship;

FIG. 10 shows a viewing/listening history stored by a player terminal;

FIG. 11 shows a viewing/listening history stored by a player terminal;

FIG. 13 is a diagram showing a commonality table;

FIGS. 19A and 19B each show a net purchase history table that is another user profile;

FIG. 22 is a flowchart showing processing for determining a content selection criterion;

FIG. 26 shows an example of a screen display that includes a commonality map image;

FIG. 27 shows an example of a screen display that includes commonality map images;

FIG. 28 shows an example of a screen display that includes commonality map images;

FIGS. 29A, 29B, 29C and 29D each show an example of a screen display that includes a commonality map image;

FIG. 33 shows a content information table that is a data structure for holding attributes and attribute values;

FIG. 34 shows a variation of the data structure of the content information table;

FIG. 37 shows an example of a screen display that includes commonality map images;

FIGS. 38A, 38B, 38C and 38D each show an example of a screen display that includes a commonality map image.

DESCRIPTION OF NUMERICAL REFERENCES

Figure 6:
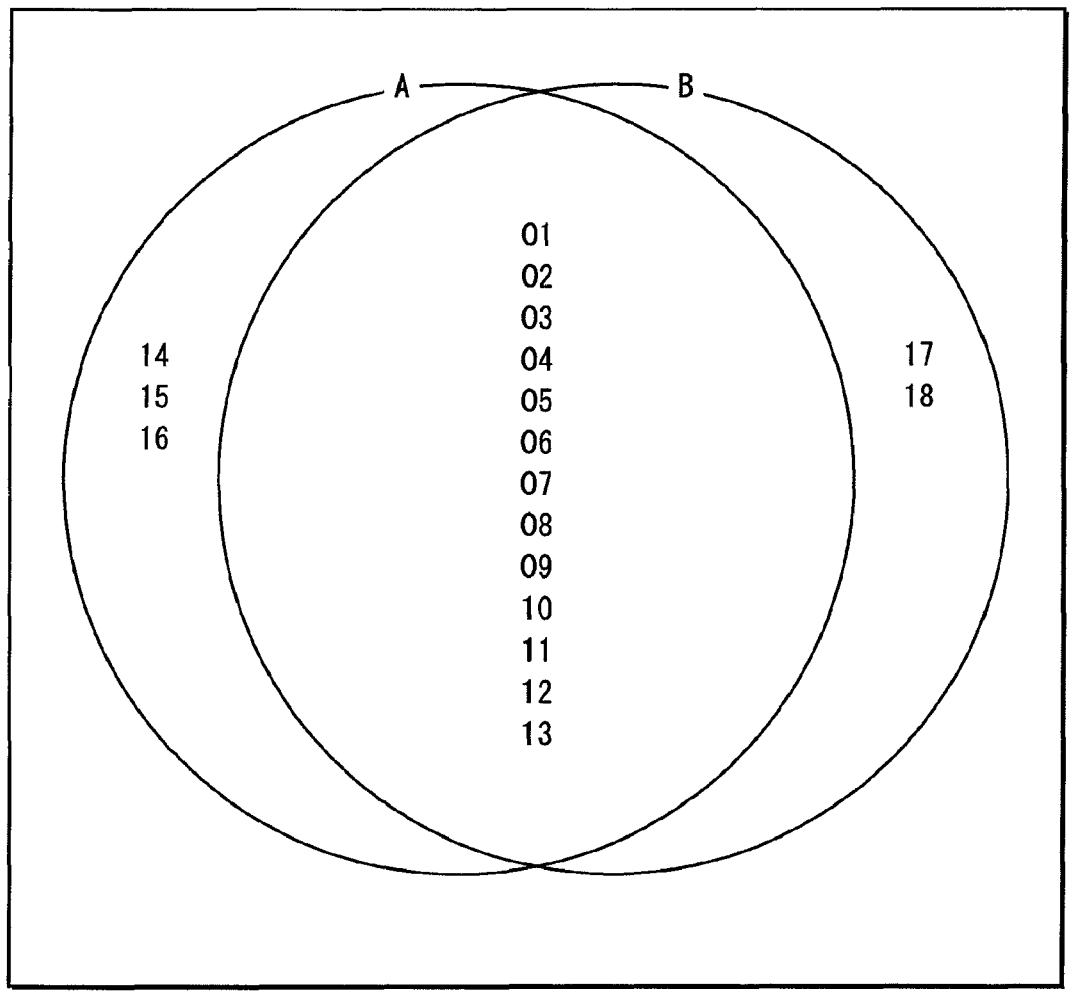
FIG. 6 is a Venn diagram showing a common relationship based on viewing/listening history tables.

1 Content recommending device
2 Player terminal
3 Player terminal
101 Multiple profile acquiring unit
102 Profile common relationship ascertaining unit
103 Content selection criterion storage unit
104 Content selection criterion ascertaining unit
105 Content selecting unit
106 Selected content presenting unit
201 Control unit
202 Content reproducing unit
203 Storage unit
204 Audio output unit
205 Display unit
206 Infrared communication unit
207 Network communication unit
208 Input unit
1001 STB device
1002 TV device
1003 Mobile terminal
1004 Mobile terminal
1111 Commonality map image
1112 Title image
1113 Venn diagram image
1114 Details button image
1115 Popup image

BEST MODE FOR CARRYING OUT THE INVENTION

A content recommending system relating to an embodiment of the present invention is composed of a content recommending device, and a plurality of player terminals each storing a plurality of contents. The content recommending device acquires a user profile including viewing/listening history or the like from each of the player terminals, and based on the acquired user profiles, selects and recommends contents that will stimulate conversation between users of the player terminals.

Furthermore, using a UI (User Interface), the content recommending device displays the mutual relationship between the user profiles in a manner that they can be easily grasped.

Here, contents that will stimulate conversation refers to contents that will be of great interest to the user.

Take an example of a plurality of users having listened to the majority of songs sung by a singer H. In this case, if it is found that there is a song C sung by the singer H that only the user A has listened to, the users besides user A will be highly interested in the song C that they have not listened to despite having listened to the majority of songs sung by the singer H. The users other than the user A will wish to listen to the song C, and will want the user A's impression of the song C. The user A will give the other users his/her impression or such from listening to the song C. In other words, as a result of the song C being recommended, the song C will stimulate conversation between the users.

The following describes embodiments of the present invention with use of the drawings.

1. First Embodiment

1.1 Structure

The content recommending system of a first embodiment of the present invention, as shown in FIG. 1, is composed of a content recommending device 1, a player terminal 2 used by a user A, and a player terminal 3 used by a user B.

Using infrared communication, the content recommending device 1 acquires user profiles such as viewing/listening history from the player terminal 2 and the player terminal 3, selects contents that will stimulate conversation, and displays the selected contents on a display or the like.

1.1.1 Player Terminal 2, Player Terminal 3

The player terminal 2 is a portable player for reproducing content, and as shown in FIG. 2 is composed of a control unit 201, a content reproducing unit 202, a storage unit 203, an audio output unit 204, a display unit 205, an infrared communication unit 206, and a network communication device 207.

The player terminal 2 is, specifically, a computer system composed of a microprocessor, a ROM, a RAM, a hard disk unit, a display unit, a keypad, an infrared communication device, a network adapter, a speaker, and the like. Computer programs are stored in the ROM or the hard disk unit. The player terminal 2 achieves its functions by the computer programs being read to the RAM, and the microprocessor operating in accordance with the computer programs.

The storage unit 203 is specifically a large-capacity hard disk unit, and stores a plurality of contents, a viewing/listening history table, and a purchase history table.

As one example, each of the contents may be music data. Each content has a content ID attached thereto so that each content can be distinguished from other contents. The music data is attached with attribute values determined in advance by a content creator. The attribute values relate to attributes such as a song title, song style, the name of the artist singing the song, and the genre of the artist.

Here, the song title is the title given to the music that is output as a result of the content being reproduced.

The song style is identification information for identifying the style of the song. For instance, values such as 2 for ballad-style music, 1 for rock-style music, 3 for rock-style music, and 4 for traditional-style music may be assigned to each piece of music data.

The artist name is the name of the artist performing the music or singing the song.

The artist genre is a value suitably assigned to classify the artist. For instance, if the artist is Japanese and a large proportion of the songs he/she sings are pop songs, a value 1 indicating "JPOPS" (i.e., "Japanese Pop") may be assigned. If the artist is not Japanese, a value 2 showing foreign music may be assigned, and if the artist is a traditional-style singer, the value 3 showing traditional style may be assigned.

The viewing/listening history table shows a history of which contents have been reproduced.

The viewing/listening history table stored by the player terminal 2 is a viewing/listening history table shown in FIG. 3.

The viewing/listening history table 11 includes at least one piece of viewing/listening history information. Each piece of viewing/listening history information includes a content ID, attribute values, and a reproduction count. Each attribute value corresponds to one of the attributes.

In the present embodiment, the plurality of attributes are song title, song style, artist name, and artist genre. These attributes are the same as the above-described attributes that are given to contents.

For example, one of the pieces in the viewing/listening history table 11 in FIG. 3 includes, for the content having a content ID "01", a value "YOU" for the attribute "song title", an attribute value "2" for the attribute "song style", an attribute value "MAYUMI HAMADA" for the attribute "artist name", and an attribute value "1" for the attribute "artist genre".

Furthermore, when the player terminal 2 again reproduces a content already recorded in the viewing/listening history table 11, the player terminal 2 increments the reproduction count in the piece of viewing/listening history information relating to the content by 1.

The purchase history table will be described later.

The content reproducing unit 202 is, specifically, an integrated circuit that performs reproduction of music data. The content reproducing unit 202 reproduces one of the contents stored in the storage unit 203 in accordance with an instruction from the control unit 201, and outputs an audio signal to the audio output unit 204.

In the case of the content being a moving image, the content reproducing unit 202 outputs the reproduced video signal to the display unit 205, which is a display.

The audio output unit 204 is, specifically, a speaker, and externally outputs audio based on an audio signal from the content reproducing unit 202.

The display unit 205 is, specifically, a display, and displays video based on a video signal received from the content reproducing unit 202.

The input unit 208 is a keypad used by the user to give an instruction to the player terminal 2, and outputs an instruction corresponding to a pressed key to the control unit 201.

The infrared communication unit 206 is an infrared communication device that performs infrared communication, and performs communication with the content recommending device 1 and the player terminal 3.

The network communication unit 207 is a communication device that performs communication using a network. As one example, the network communication unit 207 may be used when purchasing content via a network.

The control unit 201 controls overall operations of the player terminal 2 in accordance with user instructions received from the input unit 208.

Furthermore, the control unit 201 receives a transmission instruction from the content recommending device 1 via the infrared communication unit 206, and in accordance with the transmission instruction, transmits the viewing/listening history table 11 to the content recommending device 1.

The player terminal 3 is a portable player that reproduces content, and has the same structure as the player terminal 2.

The viewing/listening history table stored by the player terminal 3 is a viewing/listening history table 12 shown in FIG. 4. The player terminal 3 outputs the viewing/listening history table 12 to the content recommending device 1 in accordance with a transmission instruction from the content recommending device 1.

1.1.2. Content Recommending Device 1

The content recommending device 1 is a television receiver that is equipped with a display, and as shown in FIG. 5 is composed of a multiple profile acquiring unit 101, a profile common relationship ascertaining unit 102, a content selection criterion storage unit 103, a content selection criterion determining unit 104, a content selecting unit 105, and a selected content presenting unit 106.

The content recommending device 1 is, specifically, a computer system composed of a microprocessor, a ROM, a RAM, a hard disk unit, a display unit, a keypad, an infrared communication device, and the like. Computer programs are stored in the ROM or the hard disk unit. The content recommending device 1 achieves its functions by the computer programs being read to the RAM, and the microprocessor operating in accordance with the computer programs.

The multiple profile acquiring unit 101 includes an infrared communication device, and acquires a user profile from each of a plurality of player terminals according to infrared communication or the like.

In the present embodiment, the multiple profile acquiring unit 101 acquires the viewing/listening history table 11 as a user profile from the player terminal 2, and acquires the viewing/listening history table 12 as the user profile from the player terminal 3.

The profile common relationship ascertaining unit 102 ascertains the common relationship between the user profiles acquired by the multiple profile acquiring unit 101.

The profile common relationship ascertaining unit 102 calculates a commonality ratio S (described later) as an indicator for ascertaining the common relationship.

The profile common relationship ascertaining unit 102 outputs the calculated commonality ratio S to the content selection criterion judgment unit 104.

The ascertaining of the common relationship is described using FIG. 6.

Set A is a set whose elements are the content IDs contained in the viewing/listening history table 11. This is expressed as set A={01, 02, 03, 04, 05, 06, 07, 08, 09, 10, 11, 12, 13, 14, 15, 16}.

Set B is a set whose elements are the content IDs contained in the viewing/listening history table 12. This is expressed as set B={01, 02, 03, 04, 05, 06, 07, 08, 09, 10, 11, 12, 13, 17, 18}.

A set of the content IDs common to both the viewing/listening history table 11 and the viewing/listening history table 12, in other words the shared content IDs, is a product set (A&B) of set A and set B. This is expressed as (A&B)={01, 02, 03, 04, 05, 06, 07, 08, 09, 10, 11, 12, 13}.

Furthermore, songs that are included in at least one of the viewing/listening history table 11 and the viewing/listening history table 12, in other words songs that have been reproduced by at least one of the player terminal 1 and the player terminal 2 are a union (A|B) of set A and set B. This is expressed as (A|B)={01, 02, 03, 04, 05, 06, 07, 08, 09, 10, 11, 12, 13, 14, 15, 16, 17, 18}.

Specifically, in order to ascertain the common relationship, the profile common relationship ascertaining unit 102 generates a union list and a product list as shown in FIG. 7.

The profile common relationship ascertaining unit 102 actually calculates a commonality ratio S in order to ascertain the common relationship. The commonality ratio S is a ratio of the number of elements (hereinafter referred to as an element count) of the product set (A&B) and the element count of the union (A|B), and is expressed by the following expression.

$$S = \text{element count of } (A\&B)/\text{element count of } (A|B)$$

In the present embodiment, when S is a predetermined value (e.g., 0.7) or higher, contents corresponding to content IDs included in a subset (A−(A&B)) consisting of the elements of the set A with the exclusion of the set (A&B), and contents corresponding to content IDs included in a set (B−(A&B)). This stimulates conversation between user A and user B.

Although the present embodiment assumes for simplicity that the users are the two users A and B and that the number of content IDs included in each of the viewing/listening history tables is only in the order of tens of content IDs, the effects of the present invention are even clearer when, for instance, the number of users is in the hundreds, and the number of content IDs is in the thousands.

Take an example of the content recommending device 1 acquiring respective viewing/listening history tables of each of 1000 users, the union of the 1000 viewing/listening history tables consisting of 10000 content IDs, and the product set of the 10000 content IDs consisting of 9999 content IDs. In the present example, it is assumed that the content ID included in the union but not included in the product set is "1", and that this content ID is included in the viewing/listening history table of a user Z.

In this case, the only user who has viewed/listened to the content having the content ID of the value 1 is the user Z. The 999 users other than the user Z will be extremely interested, possibly speculating about what kind of content the content having the ID 1 is, and thus sparking lively discussion between users about the content having the ID 1.

The content selection criterion storage unit 103 stores one or more content selection criteria in accordance with the common relationship of profiles. The content selection criterion is a criterion for selecting contents that will stimulate conversation.

Figure 8:
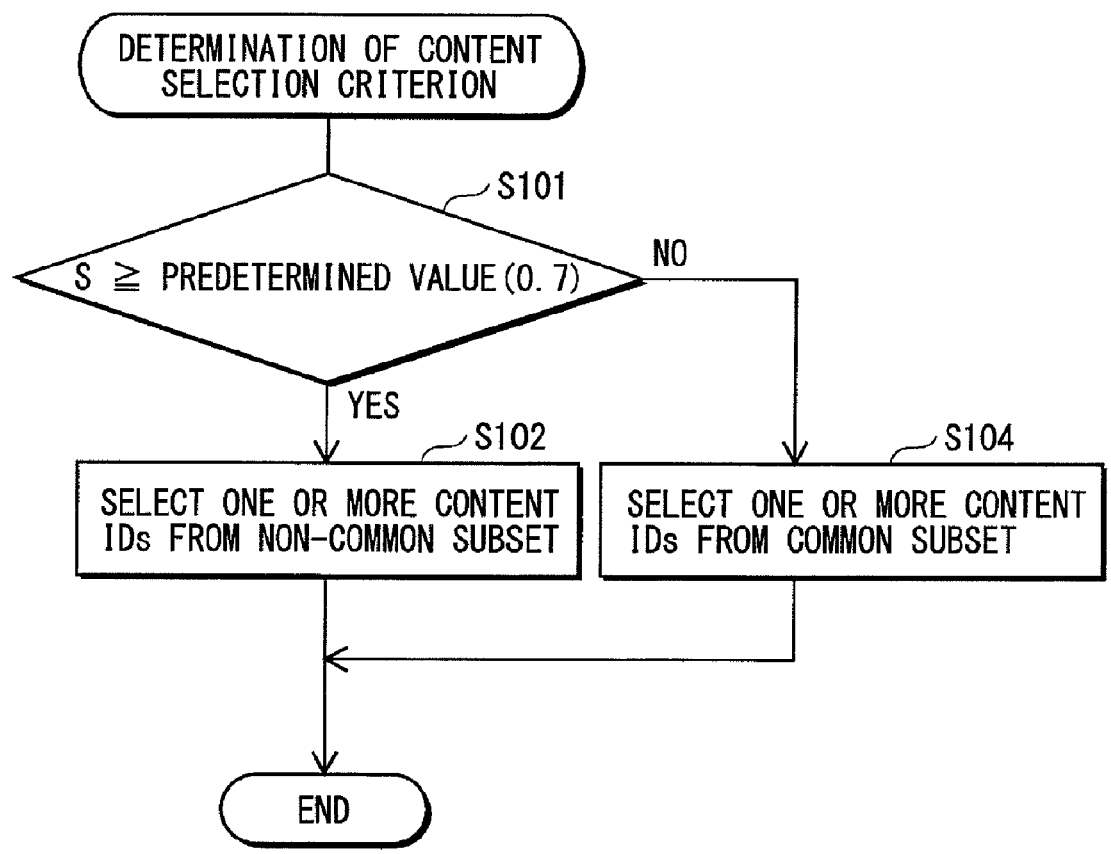
FIG. 8 is a flowchart showing processing for determining a content selection criterion.

An example of the content selection criterion is shown in FIG. 8.

If the commonality ratio S calculated by the profile common relationship ascertaining unit 102 has a predetermined value (e.g., 0.7) or higher (step S101: YES), the content selection criterion storage unit 103 selects content IDs in subsets (set A−set(A&B), set B−set (A&B)) that consist of content IDs that are not shared (step S102). If the commonality ratio S is lower than the predetermined value (step S101: NO), the content selection criterion storage unit 103 selects shared content IDs, in other words content IDs included in the set (A&B) (step S104).

The content selection criterion determining unit 104 determines a content selection criterion for selecting content. The content selection criterion determining unit 104 determines the content selection criterion based on the common relationship ascertained by the profile common relationship ascertaining unit 102 and one or more content selection criteria stored in the content selection criterion storage unit 103.

When the commonality ratio S is the predetermined value or higher, the content selection criterion determining unit 104 notifies the content selecting unit 105 to select content IDs not included in the set (A&B). When the commonality ratio S is 0, the content selection criterion determining unit 104 notifies the profile common relationship ascertaining unit 102 that another attribute is to be used. When the commonality ratio S is greater than 0 and less than the predetermined value, the content selection criterion determining unit 104 notifies the content selecting unit 105 to select content IDs from the set (A&B).

The content selecting unit 105 selects content IDs based on the criteria determined by the content selection criteria determining unit 104, and outputs the selected content IDs to the selected content presenting unit 106.

When instructed by the content selection criteria judging unit 104 to select content IDs from the set (A&B), the content selecting unit 105 selects content IDs from the set (A&B) (e.g., 14, 15, 16, 17, 18). When instructed to select content IDs not included in the set (A&B), the content selecting unit 105 selects content IDs not included in the set (A&B).

The selected content presenting unit 106 includes a display, and presents information relating to contents instructed by the content selecting unit 105.

Here, in addition to the selected contents, the selected content presenting unit 106 may display the content selection criterion that was used. Furthermore, the selected contents may be categorized into content selection criteria, and displayed together with the respective content selection criteria.

1.2. Operations

Figure 9:
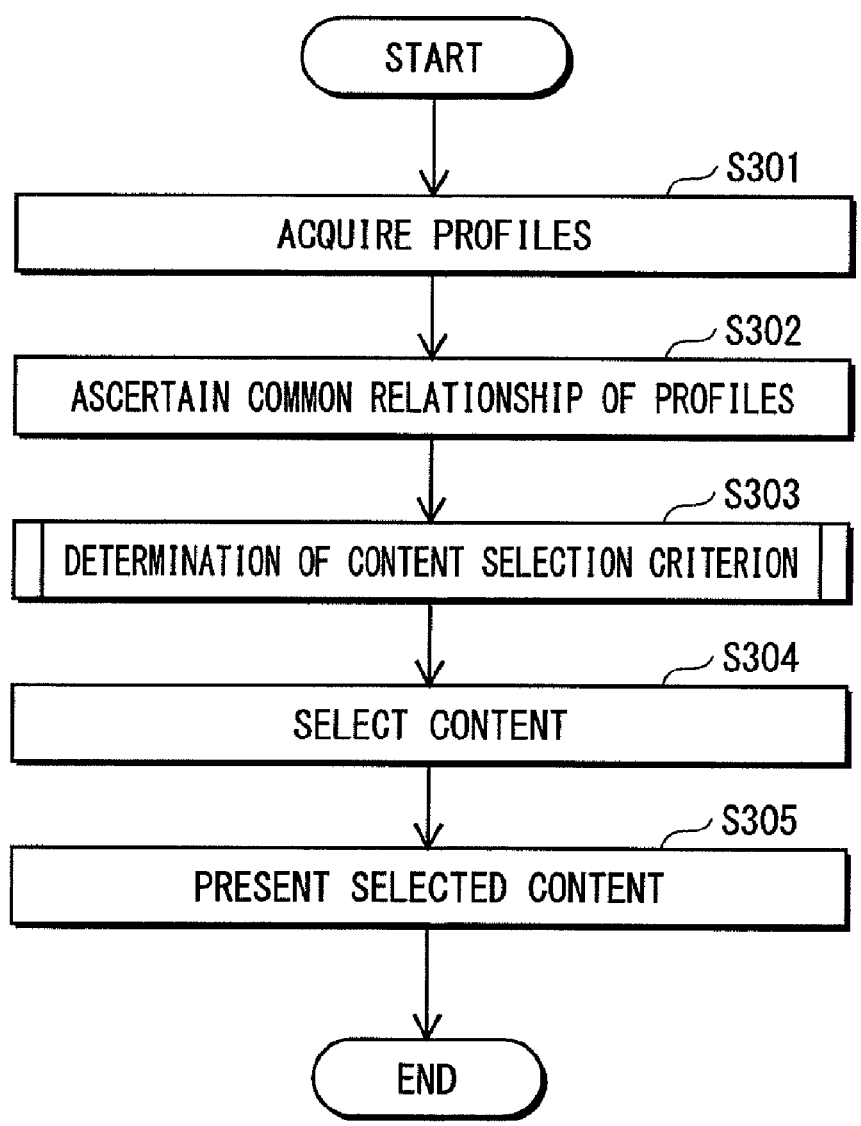
FIG. 9 is a flowchart showing operations of the content recommending device.

A description is given of the operations of the content recommending system with use of FIG. 9.

The user A inputs a content recommend instruction into the content recommending device 1 using a remote control or the like.

The content recommending device 1 transmits a user profile request to the player terminal 2 used by the user A and the player terminal 3 used by the user B.

The player terminal 2 receives the user profile request, and transmits the viewing/listening history table 11 to the content recommending device 1 as the user profile.

Similarly, the player terminal 3 receives the user profile request, and transmits the viewing/listening history table 12 to the content recommending device 1 as the user profile.

The multiple profile acquiring unit 101 of the content recommending device 1 acquires the viewing/listening history table 11 from the player terminal 2, and acquires the viewing/listening history table 12 from the player terminal 3 (step S301).

Next, the profile common relationship ascertaining unit 102 calculates a commonality ratio S in the way described earlier based on the viewing/listening history table 11 and the viewing/listening history table 12, in order to ascertain the common relationship between user profiles (step S302).

The content selection criterion determining unit 104 reads the one or more content selection criteria from the content selection criterion storage unit 103, and determines whether the commonality ratio S is in the range of any of the content selection criteria (step S303).

Details of step S303 are shown in the flowchart in FIG. 8.

According to these operations, the content selection criterion determining unit 104 determines, for instance, that the set to be recommended is a set (A−(A&B)) showing the portion of the set A that does not include the set (A&B).

The content selecting unit 105 selects the content IDs of the elements belonging to the set (A−(A&B)), and outputs the selected content IDs to the selected content presenting unit 106 (step S304).

The selected content presenting unit 106 presents content corresponding to the content IDs received from the content selecting unit 105 (step 305).

2. Second Embodiment

In the first embodiment, the common relationship is ascertained using only the content IDs. However, in the second embodiment, attributes are taken into consideration when ascertaining the common relationship.

2.1. Structure

The player terminal 2 holds a viewing/listening history table 13 shown in FIG. 10 instead of the viewing/listening history table 11, and the player terminal 3 holds a viewing/listening history table 14 shown in FIG. 11 instead of the viewing/listening history table 12. Processing the same as in the first embodiment is performed with respect to the attribute value "Mayumi Hamada" and the attribute value "Hikari Utada".

The profile common relationship ascertaining unit 102 ascertains the common relationship between each of the attribute values included in the attribute "artist name".

For the attribute value "Mayumi Hamada", the result will be the same as in the first embodiment.

In other words, the profile common relationship ascertaining unit 102 calculates a commonality ratio S=0.72 with respect to the attribute value "Mayumi Hamada".

The profile common relationship ascertaining unit 102 also ascertains the common relationship for the attribute value "Hikari Utada" using the same method as in the first embodiment.

Figure 12:
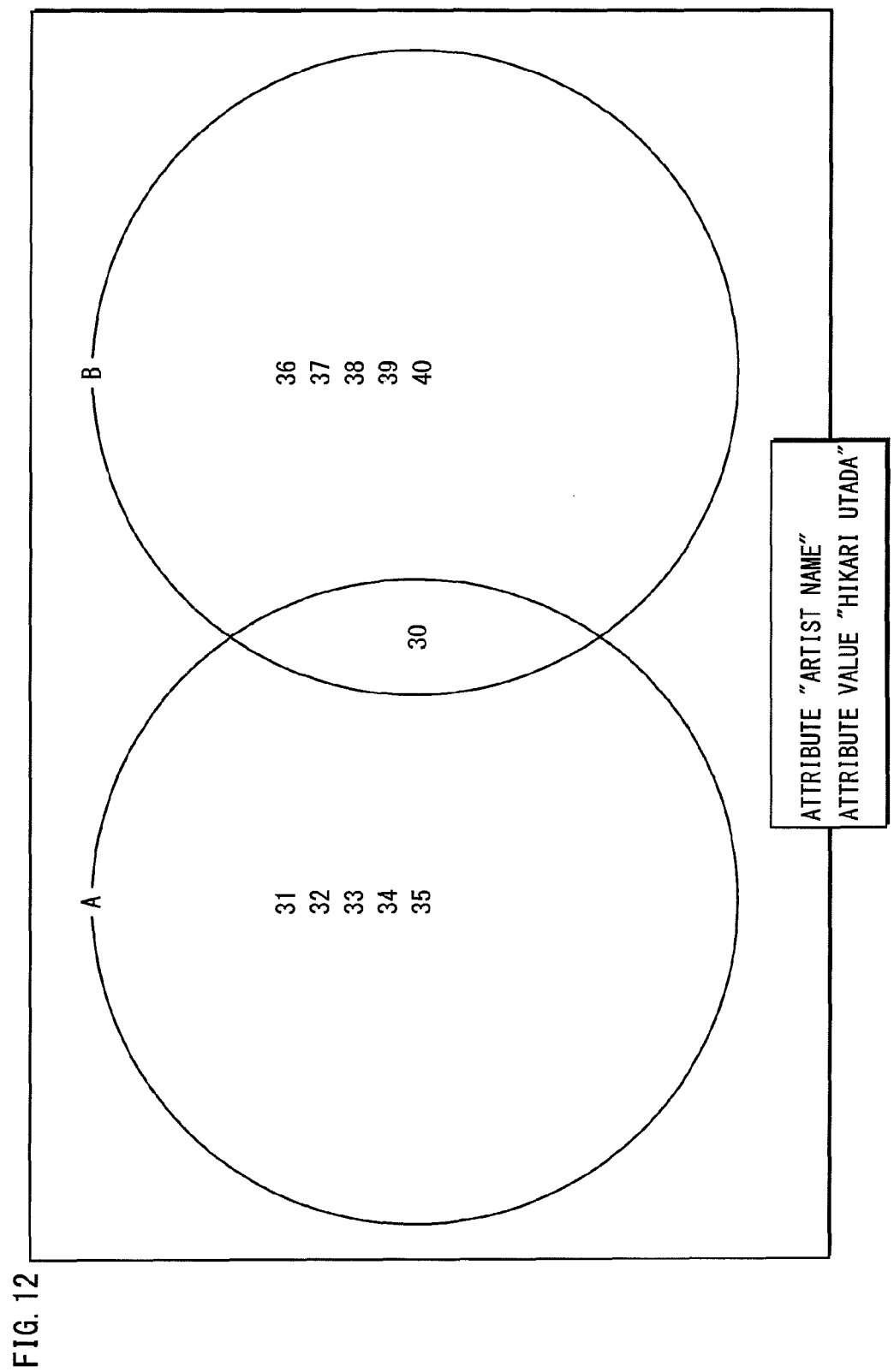
FIG. 12 shows a Venn diagram pertaining to content relating to the attribute value "Hikari Utada"

The Venn diagram for the contents having the attribute value "Hikari Utada" for the attribute "artist name" will be as shown in FIG. 12.

Here, the set A is a set of content IDs of contents having the attribute value "Hikari Utada" in the viewing/listening history table 13. This is expressed as A={30, 31, 32, 33, 34, 35}. The set B is a set of content IDs of contents having the attribute value "Hikari Utada" in the viewing/listening history table 14. This is expressed as B={30, 36, 37, 38, 39, 40}.

Furthermore, product set (A&B) and the union (A|B) are expressed as product set(A&B)={30}, and union(A|B)={30,31,32,33,34,35,36,37,38,39,40}.

The profile common relationship ascertaining unit 102 calculates S=1/11=0.09 as the commonality ratio S.

The profile common relationship ascertaining unit 102 stores the attribute value and the commonality ratios S as a commonality table such as that shown in FIG. 13.

The content selection criterion storage unit 103 stores one or more content selection criteria in accordance with the common relationship of profiles.

As one example, the content selection criterion may be the content selection criterion already described with use of FIG. 8. The content selection criterion is applied to the attribute value having the highest commonality ratio S in the commonality table.

With respect to the attribute value having the highest commonality ratio S in the commonality table, the content selection criterion determining unit 104 determines the content selection criterion in accordance with the content selection criterion described with use of FIG. 8.

2.2. Operations

Figure 14:
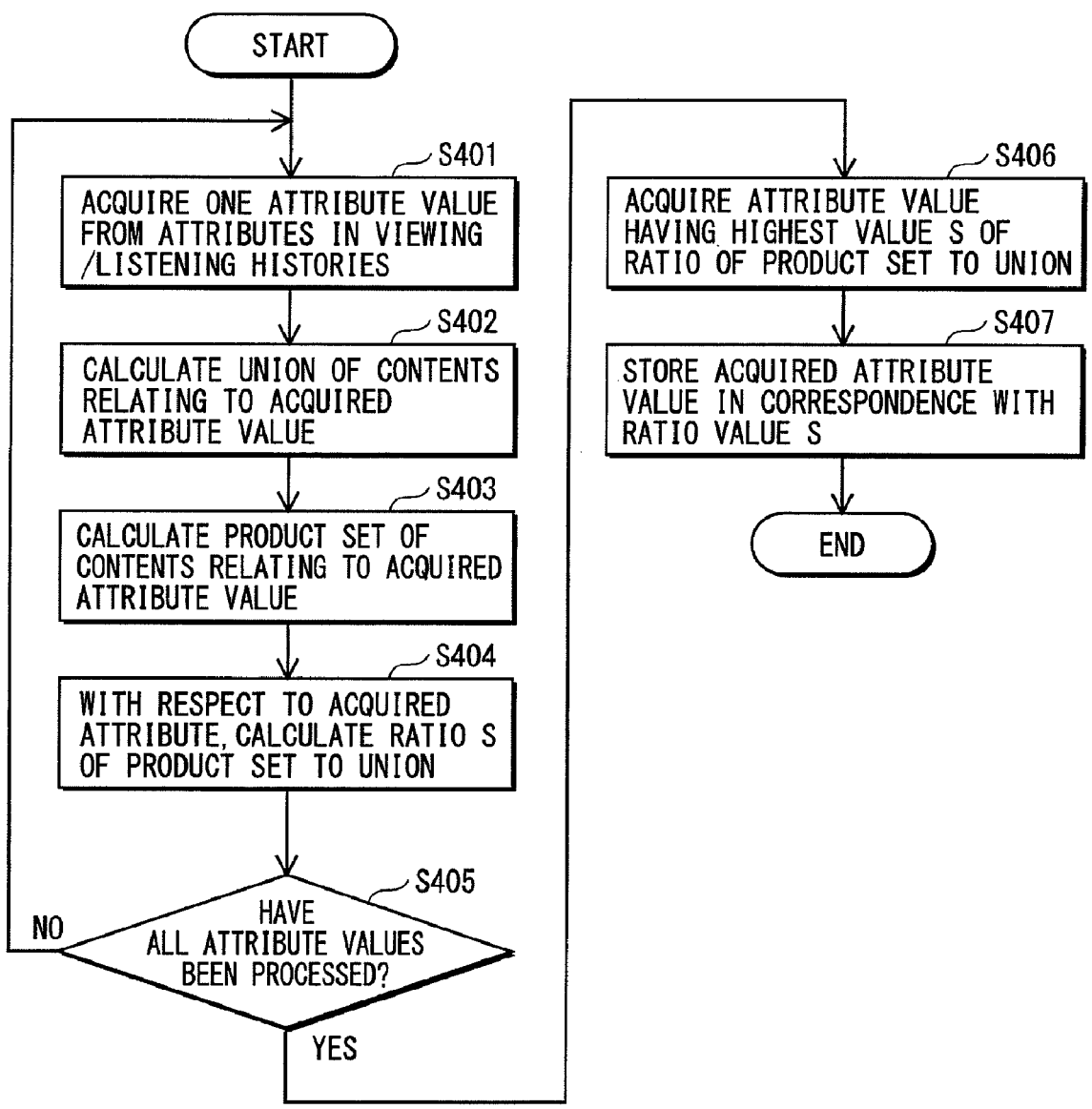
FIG. 14 is a flowchart showing a procedure for calculating a commonality ratio.

A description is given of the operations of the content recommending system of the present embodiment with use of FIG. 14.

The user A inputs a content recommend instructing into the content recommending device 1 using a remote control or the like.

The content recommending device 1 transmits a user profile request to the player terminal 2 used by the user A and the player terminal 3 used by the user B.

The player terminal 2 receives the user profile request, and transmits the viewing/listening history table 13 to the content recommending device 1 as the user profile.

Similarly, the player terminal 3 receives the user profile request, and transmits the viewing/listening history table 14 to the content recommending device 1 as the user profile.

The multiple profile acquiring unit 101 of the content recommending device 1 acquires the viewing/listening history table 13 from the player terminal 2, and acquires the viewing/listening history table 14 from the player terminal 3.

The profile common relationship ascertaining unit 102 selects one of the attribute values of the attributes in the viewing/listening histories of a plurality of users. In the present example it is assumed that the selected attribute is "artist name" and the attribute value is "Mayumi Hamada" (step S401).

The profile common relationship ascertaining unit 102 generates a union (A|B) of the content IDs with respect to the attribute value "Mayumi Hamada" (step S402).

The profile common relationship ascertaining unit 102 generates a union (A&B) of the content IDs with respect to the attribute value "Mayumi Hamada" (step S403).

The profile common relationship ascertaining unit 102 calculates a commonality ratio S with respect to "Mayumi Hamada" (step S404).

Next, the profile common relationship ascertaining unit 102 determines whether the processing from step S401 to step S404 has been performed with respect to all attribute values belonging to the attribute "artist name" (step S405), and when said processing has not been performed with respect to all attribute values belonging to the attribute "artist name", returns to step S401.

At step S405, when the processing has been performed with respect to all attribute values included in the selected attribute (step S405: YES), the profile common relationship ascertaining unit 102 selects the attribute value having the highest commonality ratio S among the commonality ratios S calculated with respect to the attribute values (step S406), and stores the selected attribute value and its commonality ratio S in correspondence (step S407).

In the present embodiment, since S is 0.72 for the attribute value "Mayumi Hamada" and S is 0.09 for the attribute value "Hikari Utada", the attribute value "Mayumi Hamada" is selected at step S406.

Since the commonality ratio S (0.72) for the attribute value "Mayumi Hamada" is the predetermined value or higher, in accordance with the content selection criterion, the content selection criterion determining unit 104 determines that the contents that, among the contents having the attribute value "Mayumi Hamada", are not currently shared are to be selected.

In accordance with the selection criterion determined in the content selection criterion determining unit 104, the content selecting unit 105 selects the content IDs (14, 15, 16, 17, 18) that are not currently shared, and transmits the selected content IDs to the content presenting unit 106. In other words, the content selecting unit 105 selects the content IDs included in the group ((A|B)−(A&B)) of the attribute value "Mayumi Hamada" shown in FIG. 6.

The selected content presenting unit 106 presents the contents corresponding to the content IDs received from the content selecting unit 105.

Note that although in the present embodiment "artist name" is used as the attribute in selection processing, the attribute that is used is not limited to "artist name". Instead, a different attribute may be focused on, and subjected to processing in the same way as described for "artist name".

For instance, with respect to the attribute "song style ID", a commonality ratio S of each of the set of content IDs having the attribute value "1 (rock)" and of the set of content IDs having the attribute value "2 (ballad)" may be calculated.

Furthermore, although the attribute value having the highest commonality ratio S is selected at step S406, and the selected attribute value and the commonality ratio S thereof are stored at step S407, the present embodiment is not limited to this. As one example, attribute values may be successively selected in order of commonality ratio S starting from the attribute value having the highest commonality ratio S, and each selected attribute value may be subjected to the processing at steps S101 to S104. This processing results in content IDs being selected from a subset consisting of content IDs not currently shared, or in content IDs being selected from a subset consisting of currently shared content IDs.

3. Third Embodiment

In the second embodiment, in order to ascertain the common relationship using a plurality of viewing/listening history tables, a certain attribute is selected from a plurality of attributes in the plurality of viewing/listening history tables, and a commonality ratio S is calculated for each attribute value of the selected attribute. In contrast, in the third embodiment, a commonality ratio S is calculated for each attribute value of two or more of the plurality of attributes in the viewing/listening history table.

3.1. Structure

The common relationship ascertaining unit 102 of the present embodiment performs the calculation of the commonality ratio S of each of the attribute values "Mayumi Hamada" and "Hikari Utada" of the attribute "artist name" as was performed in the second embodiment, and additionally calculates a commonality ratio S of each of the attribute values "2 (ballad)" and "1 (rock)".

Figure 15:
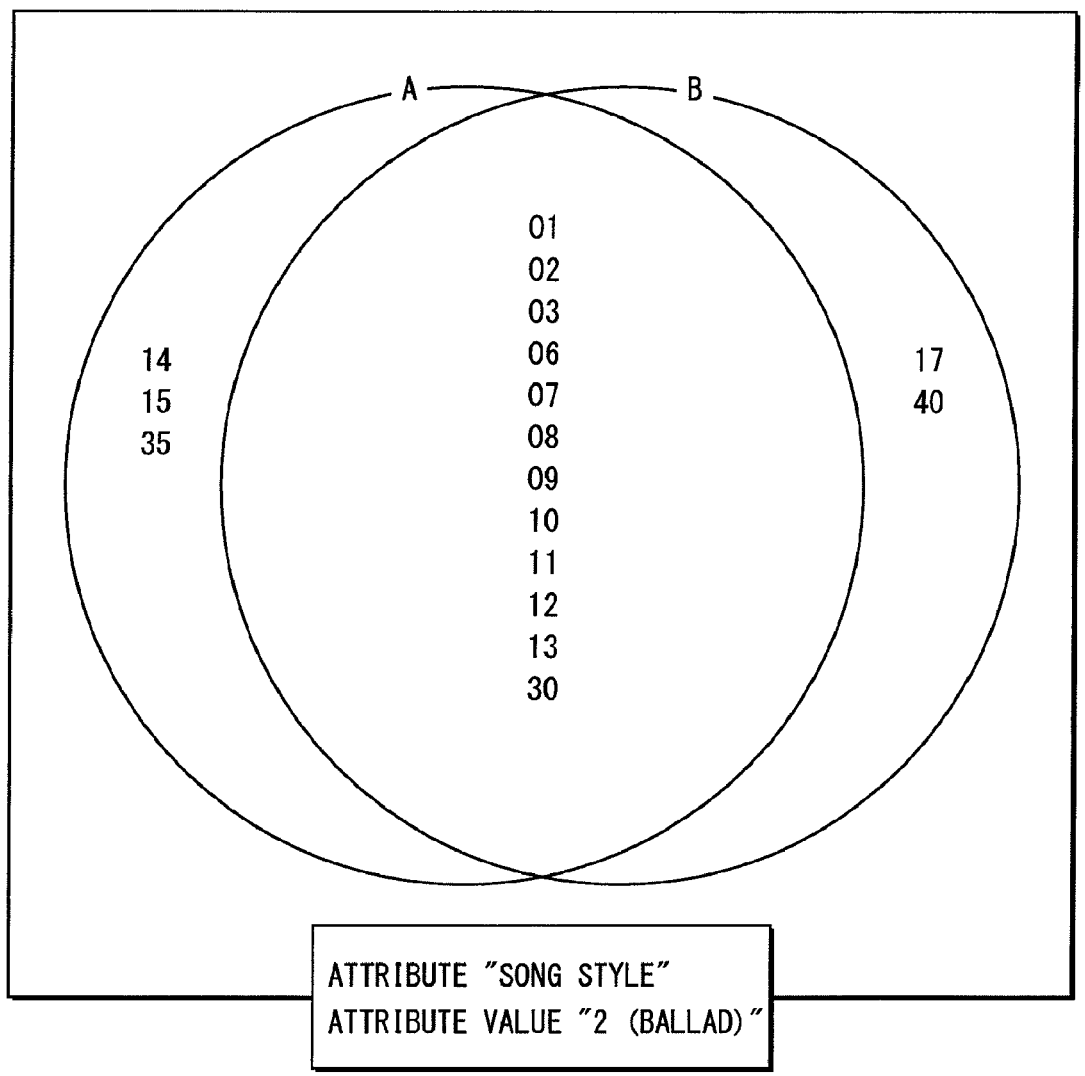
FIG. 15 is a Venn diagram pertaining to an attribute value "ballad"
Figure 16:
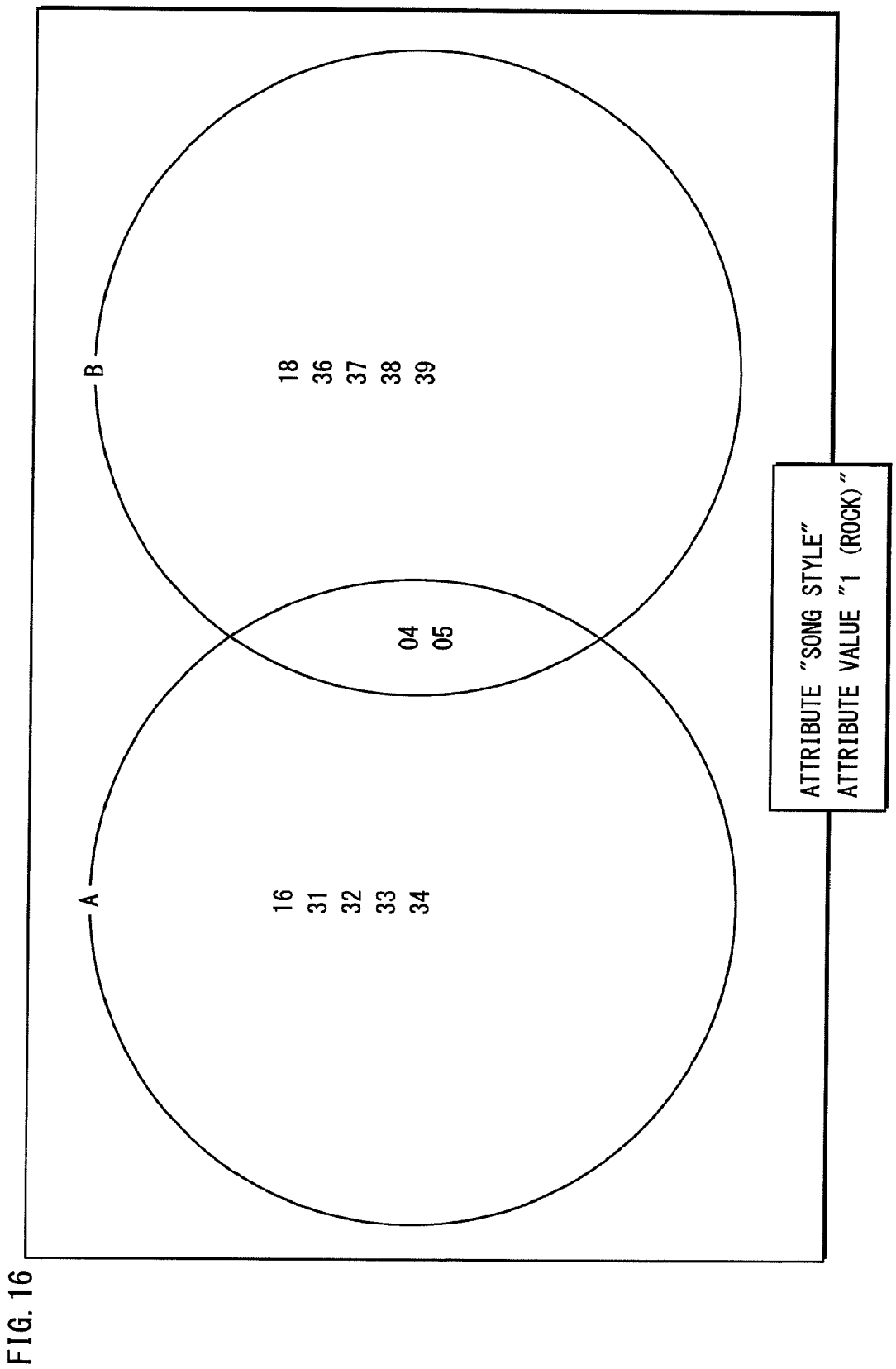
FIG. 16 is a Venn diagram pertaining to an attribute value "rock"

A Venn diagram of the attribute value "2 (ballad)" of the attribute "song style" from the viewing/listening history table 13 and the viewing/listening history table 14 can be conceptually expressed as shown in FIG. 15, and a Venn diagram of the attribute value "1 (rock)" of the attribute "song style" from the viewing/listening history table 13 and the viewing/listening history table 14 can be conceptually expressed as shown in FIG. 16.

Figure 17B:
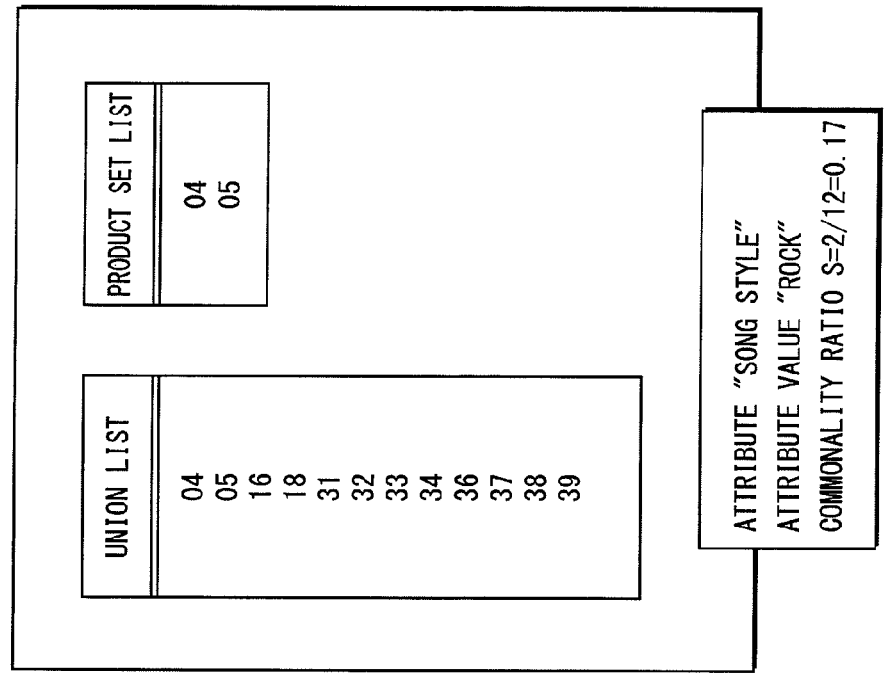
FIGS. 17A and 17B each show an example of a union list and a product set list.
Figure 17A:
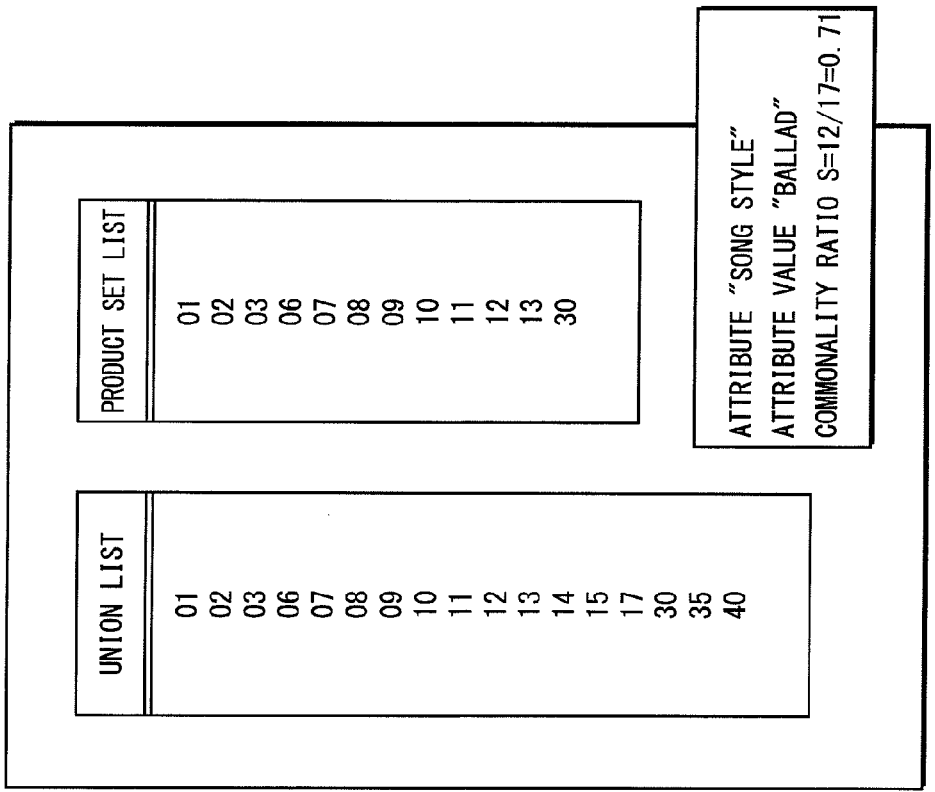

Based on the viewing/listening history table 13 and the viewing/listening history table 14, the profile common relationship ascertaining unit 102 generates a union list and a product set list for the attribute value "ballad" of the attribute "song style" as shown in FIG. 17A, generates a union list and a product set list for the attribute value "rock" of the attribute "song style" as shown in FIG. 17B, and calculates a commonality ratio S of each of FIG. 17A and FIG. 17B.

For the attribute value "ballad" of the attribute "song style", S=0.71, and for the attribute value "rock" of the attribute "song style", S=0.17.

The profile common relationship ascertaining unit 102 calculates a commonality ratio S for each attribute value of each attribute, and generates a commonality table such as that in FIG. 13.

The content selection criterion storage unit 103 stares one or more content selection criteria in accordance with the common relationship of profiles.

As one example, the content selection criterion may be the content selection criterion already described with use of FIG. 8. The content selection criterion is applied to all attribute values having a commonality ratio S higher than a predetermined value in the commonality table.

The content selection criterion determining unit 104 selects one attribute value at a time from among all of the attribute values having a commonality ratio S greater than the predetermined value in descending order of the commonality ratio S, and determines a content selection criterion with respect to each selected attribute value in accordance with the content selection processing already described with use of FIG. 8.

The content selecting unit 105 selects one or more content IDs based on the criteria determined by the content selection criteria determining unit 104, and outputs the selected content presenting unit 106.

Here, in a case of a plurality of content IDs being selected, the content IDs may be, but are not limited to being, selected in descending order of the corresponding reproduction counts in the viewing/listening history tables.

The selected content presenting unit 106 presents the contents selected by the content selecting unit 105. Here, in addition to the selected content, the selected content presenting unit 106 may display the content selection criterion that was used. Furthermore, the selected content may be categorized into content selection criteria, and displayed together with the respective content selection criteria.

Note that although one attribute or one attribute value is used to ascertain the profile common relationship and determine the content selection criteria in the third embodiment, a combination of a plurality of attribute and/or a plurality of attribute values may be used.

3.2. Operations

Figure 18:
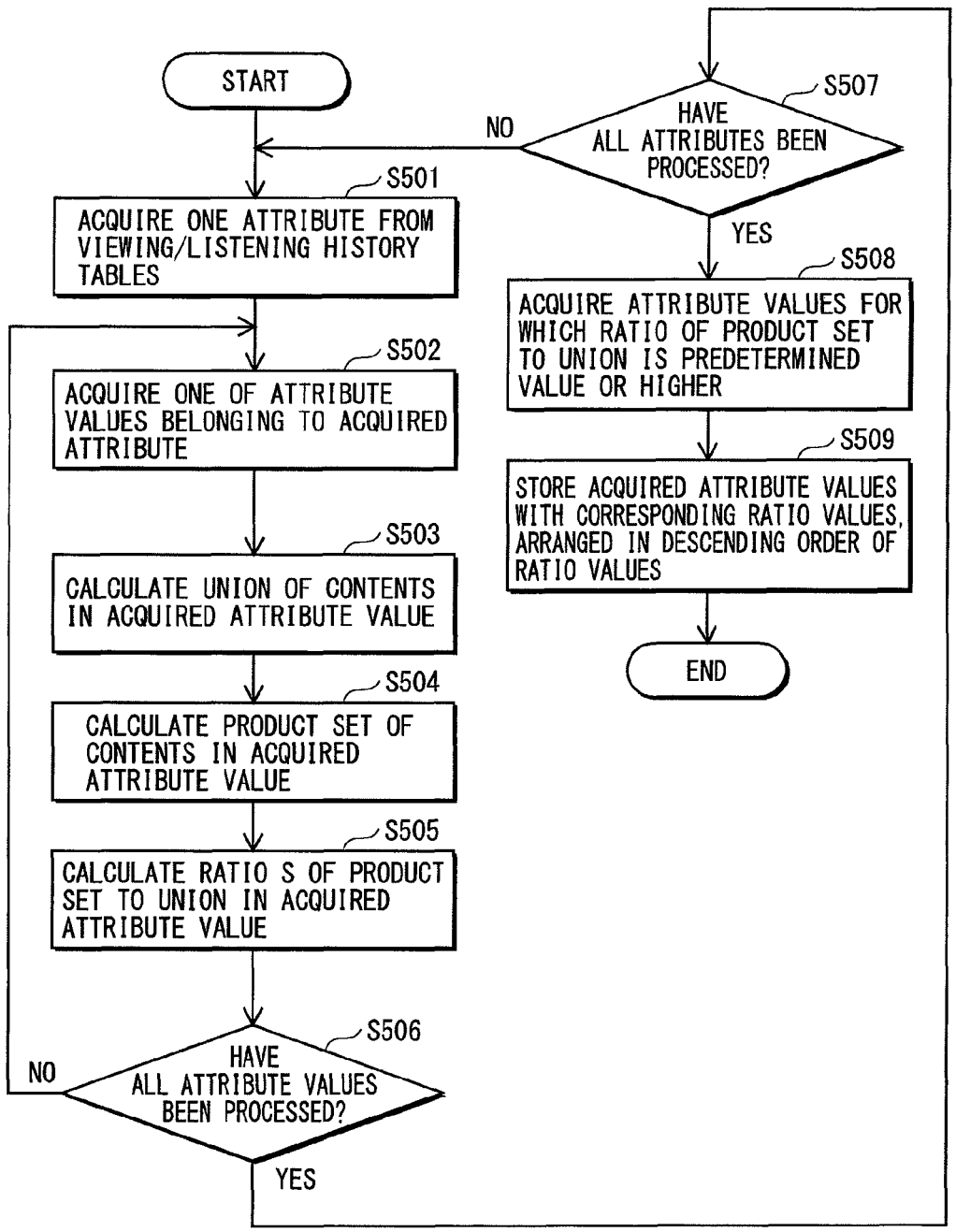
FIG. 18 is a flowchart showing processing for ascertaining a common relationship.

Here, a description of how the profile common relationship ascertaining unit 102 ascertains the common relationship is given with use of FIG. 18.

First, the profile commonality ascertaining unit 102 acquires one attribute from the viewing/listening history tables of a plurality of users (step S501).

Next, the profile commonality ascertaining unit 102 acquires one attribute value from the attribute values belonging to the attribute acquired at step S501 (step S502).

Next, with respect to the attribute value acquired at step S502, the profile commonality ascertaining unit 102 calculates a union of the content IDs in the viewing/listening history table of the plurality of users (step S503).

Next, with respect to the attribute value acquired at step S502, the profile commonality ascertaining unit 102 calculates a product set of the content IDs in the viewing/listening history table of the plurality of users (S504).

Next, with respect to the attribute value acquired at step S502, the profile commonality ascertaining unit 102 calculates a commonality ratio S that is a ratio of the product set calculated at step S504 to the union calculated at step S503 (step S505).

Next, the profile commonality ascertaining unit 102 determines whether or not the processing at steps S502 to S505 has been performed with respect to all the attribute values, and if not, returns to step S502. If the processing has been performed with respect to all the attribute values, the profile commonality ascertaining unit 102 proceeds to step S507 (step S506).

Next, the profile commonality ascertaining unit 102 determines whether the processing at steps S501 to S506 has been performed with respect to all attributes, and if not, returns to step S501. If the processing has been performed with respect to all the attributes, the profile commonality ascertaining unit 102 proceeds to step S508 (step S507).

Next, the profile commonality ascertaining unit 102 acquires the one or more attribute values for which the value of the ratio of the product set to the union calculated at steps S501 to S507 is equal to or greater than a predetermined value (step S508).

Next, the profile commonality ascertaining unit 102 arranges the attribute values acquired at step S508 in descending order of the ratio of the product set to the union, and stores the attribute values together with their respective corresponding ratio of the product set to the union as a commonality table (step S509).

4. Fourth Embodiment

In contrast to the content recommending devices 1 in the above-described embodiments that acquire one user profile from each of the player terminal 2 and the player terminal 3, the content recommending device 1 in the present embodiment acquires a plurality of user profiles from each individual player terminal.

The content recommending device 1 acquires two user profiles from the player terminal 2, namely the viewing/listening history table 11 and a net purchase history table 15 shown in FIG. 19A.

Furthermore, the content recommending device 1 acquires two user profiles from the player terminal 3, namely the viewing/listening history table 12 and a net purchase history table 16 shown in FIG. 19B.

The net purchase history table 15 is information about content that the user of the player terminal 2 has purchased and downloaded via a network. The net purchase history table 15 includes at least one content ID, and the attributes "song title", "song style", "artist name", and "artist genre". The attributes are the same as those in the viewing/listening history tables.

One example of content recorded in the net purchase history table 15 as having been purchased is content whose content ID is 01, and whose attribute "song name" has an attribute value "YOU", attribute "song style" has an attribute value "ballad", attribute "artist name" has an attribute value "Mayumi Hamada", and attribute "artist genre" has an attribute value "JPOP".

The net purchase history table 16 has the same structure as the net purchase history table 15, and therefore a description thereof is omitted here.

In order to ascertain the common relationship, a table that is the viewing/listening history table 11 and the net purchase history table 15 added together is used.

Figure 20:
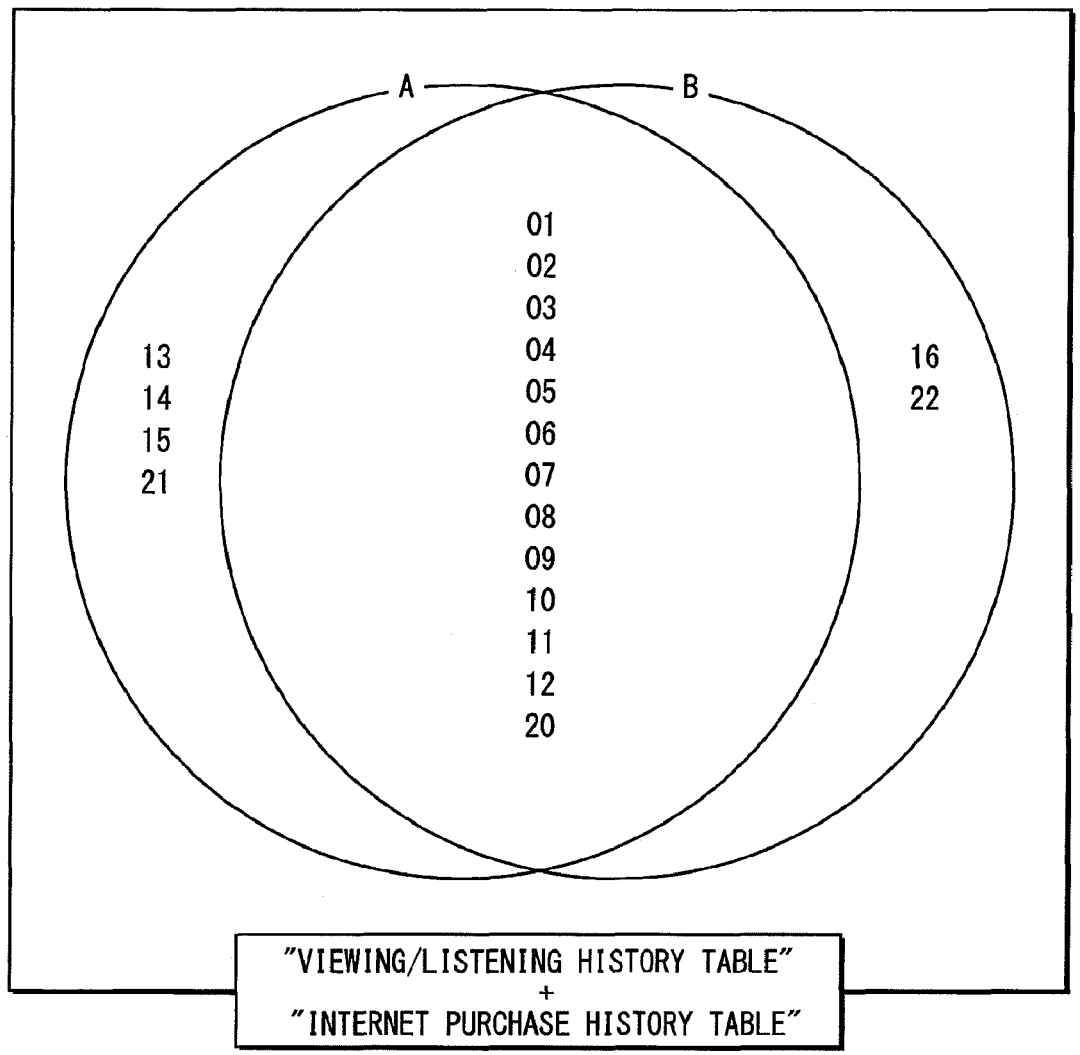
FIG. 20 is a Venn diagram based on two user profiles.

The common relationship in this case can be expressed by the Venn diagram shown in FIG. 20.

The elements in the set A are the content IDs included in at least one of the viewing/listening history table 11 and the net purchase history table 15. This may be expressed as A={01, 02, 03, 04, 05, 06, 07, 08, 09, 10, 11, 12, 13, 14, 15, 16, 20, 21}.

The elements in the set B are the content IDs included in at least one of the viewing/listening history table 12 and the net purchase history table 16. This may be expressed as B=f{01, 02, 03, 04, 05, 06, 07, 08, 09, 10, 11, 12, 13, 17, 18, 20, 22}.

The means for generating a union (A|B) and a product set (A&B) of the set A and the set B and for calculating the commonality ratio S, and the subsequent processing, are the same as already described in the above-described embodiments, and therefore a description thereof is omitted.

The selected content presenting unit 106 presents the content selected by the content selecting unit 105. Here, in addition to the selected content, the selected content presenting unit 106 may display the content selection criterion that was used. Furthermore, the selected content may be categorized into content selection criteria, and displayed together with the respective content selection criteria.

Note that in the present and above-described embodiments, each user profile may be information directly input by the user, or information acquired from information other than the content viewing/listening history, examples of which are activity information and purchase history.

Note that although one attribute or one attribute value is used to ascertain the profile common relationship and determine the content selection criteria in the third embodiment, a combination of a plurality of attributes and/or a plurality of attribute values may be used.

5. Fifth Embodiment

In the embodiments described so far, content IDs included in the non-common subset are recommended in the case that the commonality ratio S is a predetermined value or higher.

The present embodiment, when recommending content IDs included in a non-common subset, uses a common relationship that includes other attributes with relation to the non-common subset in order to determine in detail what order the content IDs will be recommended in.

5.1. Concept

Figure 21:
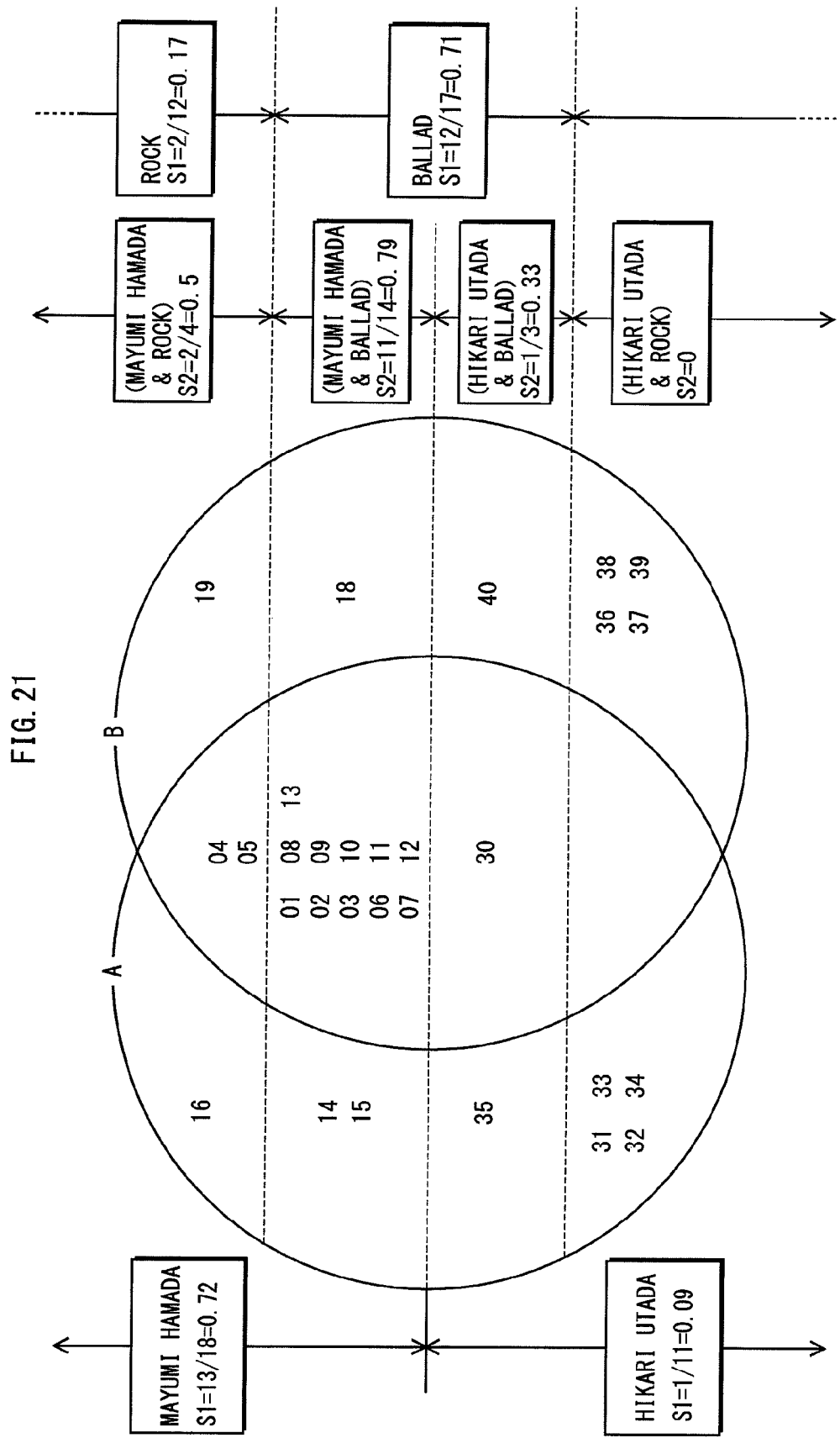
FIG. 21 is a Venn diagram restricted by a plurality of attributes.

A description is now given of the concept of the present embodiment using the example of the Venn diagram of FIG. 21.

The set A is a set of content IDs based on the viewing/listening history table 13, and the set B is a set of content IDs based on the viewing/listening history table 14.

Here, as shown in the already-described embodiments, the profile common relationship ascertaining unit 102 calculates a commonality ratio S1 for each of the attribute "artist name" and the attribute "song style" included in the viewing/listening history tables 13 and 14. The profile common relationship ascertaining unit 102 calculates each of the commonality ratios S1 using all attribute values of the respective attribute.

More specifically, since attribute values "Mayumi Hamada" and "Hikari Utada" are included in the attribute "artist name", and "rock" and "ballad" are included in the attribute "song style", a commonality ratio S1 is calculated for each of the four attribute values "Mayumi Hamada", "Hikari Utada", "rock" and "ballad".

The commonality ratios S1 are S1=0.72 for the attribute value "Mayumi Hamada", S1=0.09 for the attribute value "Hikari Utada", S1=0.71 for the attribute value "ballad", and S1=0.17 for the attribute value "rock".

The content selection criterion determining unit 104 selects the attribute value "Mayumi Hamada", for which S1 is the highest and is also equal to or greater than the predetermined value, and determines a union of content IDs to be selected. Specifically, the union is a union of (i) content IDs having the attribute value "Mayumi Hamada" in the set (A−(A&B)), which is a non-common subset, and (ii) content IDs having the attribute value "Mayumi Hamada" in the set (B−(A&B)), which is a non-common subset. The content selecting unit 105 selects {14, 15, 16, 18, 19}.

In order to determine which order to select the content IDs in from among the five selected content IDs {14, 15, 16, 18, 19}, the content selecting unit 105 further makes a determination using the attribute "song style" with respect to the selected non-common groups.

More specifically, the profile common relationship ascertaining unit 102 calculates a commonality ratio S2 for a set of content IDs having the attribute value "Mayumi Hamada" for the attribute "artist name" as well as the attribute value "ballad" for the attribute "song type", and a commonality ratio S2 for a set of content IDs having the attribute value "Mayumi Hamada" for the attribute "artist name" as well as the attribute value "rock" for the attribute "song type". Next, sets are selected in descending order of the value of the commonality ratio S2, and the content IDs included in the selected sets are recommended.

A new attribute can be incorporated in the determination if the order in which the content IDs are recommended is to be determined in even more detail.

For instance, although not illustrated, the determination may be additionally made with respect to attribute values "producer 1" and "producer 2" of an attribute "producer name".

As has been described, by adding further attributes as a target of determination, the order in which content IDs are recommended can be organized such that content IDs that are more likely to stimulate conversation are higher in the order.

5.2 Operations

The procedure for processing for determining the content selection criterion in the present embodiment is now described with use of the flowchart in FIG. 22.

It is assumed in the preset example that the content recommending device 1 acquires the viewing/listening history table 13 from the player terminal 2, and acquires the viewing/listening history table 14 from the player terminal 3.

The profile common relationship ascertaining unit 102 acquires one of the attributes included in the viewing/listening history table 13 and the viewing/listening history table 14 (step S701).

The one attribute is, for instance, selected randomly from among the attributes included in the viewing/listening history tables. In the present example, it is assumed that "artist name" is selected.

The profile common relationship ascertaining unit 102 acquires one attribute value from among attributes values included in the selected one attribute in the viewing/listening history tables. In the present example, it is assumed that "Mayumi Hamada" is selected (step S702).

The profile common relationship ascertaining unit 102 calculates a union of the acquired attributed value based on the viewing/listening history tables (step S703).

For example, the profile common relationship ascertaining unit 102 calculates the union of the attribute value "Mayumi Hamada" of the attribute "artist name".

Next, the profile common relationship ascertaining unit 102 calculates a product set of the attribute values included in the attribute based on the viewing/listening history tables (step S704).

For example, the profile common relationship ascertaining unit 102 calculates a product set of the attribute value "Mayumi Hamada" of the attribute "artist name".

Next, the profile common relationship ascertaining unit 102 calculates a commonality ratio S1 in relation to the attribute value (step S705).

For example, the profile common relationship ascertaining unit 102 calculates a commonality ratio S1 with respect to the attribute value "Mayumi Hamada" of the attribute "artist name".

Next, the profile common relationship ascertaining unit 102 judges whether or not all attribute values have been acquired (step S706).

In the present example, the result of the judgment is "NO" because only the attribute value "Mayumi Hamada" has been acquired, despite attribute values "Mayumi Hamada" and "Hikari Utada" being included for the attribute "artist name". When the judgment result is "NO" (step S706: NO), the processing moves to step S702, and "Hikari Utada" is selected as the attribute value at step S702.

When the judgment result is "YES" at step S706, the profile common relationship ascertaining unit 102 judges whether or not all attributes have been acquired (step S707). In the present example, the only attribute that has been acquired is "artist name", and the therefore result of the judgment is "NO". When the judgment result is "NO" (step S707: NO), the processing moves to step S701. In the present example, "song style" is selected as the attribute at step S701.

When the judgment result is "YES" at step S707, the attribute values are selected one at a time in descending order of the value of the calculated S1 (step S708). In the present example, it is assumed that S1=0.72 for the attribute value "Mayumi Hamada", S1=0.71 for "Hikari Utada", S1=0.17 for the attribute value "rock", and S1=0.71 for the attribute value "ballad". In this case, the attribute value "Mayumi Hamada" is first selected. The attribute value "Mayumi Hamada" becomes a first attribute value.

Next, the profile common relationship ascertaining unit 102 acquires an attribute to which the first attribute value does riot belong (step S709). In the present example, the first attribute value is "Mayumi Hamada", and therefore an attribute (song style) other than "artist name" to which "Mayumi Hamada" belongs is selected. Here, the second attribute is "song style".

Next, the profile common relationship ascertaining unit 102 acquires one attribute value from among all attribute values included in the second attribute (step S710). In the present example, it is assumed that the attribute value "rock" is acquired, and this attribute value "rock" is the second attribute value.

Next, the profile common relationship ascertaining unit 102 calculates a union of (first attribute value &second attribute value) (step S711). In the present example, the profile common relationship ascertaining unit 102 calculates a union of "Mayumi Hamada" and "rock".

Next, the profile common relationship ascertaining unit 102 calculates a product set of (first attribute value & second attribute value) (step S712).

In the present example, the profile common relationship ascertaining unit 102 calculates a product set of "Mayumi Hamada" and "rock".

Next, the profile common relationship ascertaining unit 102 calculates a commonality ratio S2 of (first attribute value & second attribute value) (step S713). In the present example, the profile common relationship ascertaining unit 102 calculates a commonality ratio S2 of the set of "Mayumi Hamada" and "rock".

Next, the profile common relationship ascertaining unit 102 judges whether or not all attribute values included in the second attribute have been acquired (step S714). In the present example, since "rock" is the only attribute value included in the second attribute that has been acquired, the result of the judgment is "NO", and the processing moves to step S710. The attribute value "ballad" included in the second attribute is acquired at step S710.

Next, the profile common relationship ascertaining unit 102 judges whether or not all attributes that the first attribute value does not belong to have been acquired (step S715).

Next, the profile common relationship ascertaining unit 102 judges whether or not all attribute values that are to be acquired as the first attribute value have been acquired (step S716). In the present example, since attribute values such as "ballad" for which S1 has been calculated have not yet been acquired, the judgment result is "NO" at step S716, and the profile common relationship ascertaining unit 102 moves to step S708. At step S708, "ballad" is selected as the first attribute, and the described processing from step S707 onwards is performed with respect to "ballad".

As a result of the above-described processing, S2=0.79 for the set of content IDs having the attribute value "Mayumi Hamada" for the attribute "artist name" and the attribute value "ballad" for the attribute "song style", and S2=0.5 fort the group of content IDs having the attribute value "Mayumi Hamada" for the attribute "artist name" and the attribute value "rock" for the attribute "song style". Therefore, the content IDs {14, 14, 18} included in the set for which S2=0.79 are recommended ahead of the content IDs {16, 19} included in the set for which S2=0.50.

6. Sixth Embodiment

The present embodiment realizes a function (hereinafter referred to as a content recommending function) for executing processing (hereinafter referred to as content recommending processing) for selecting and recommending contents that will be a point of discussion as in the already-described embodiments. The present embodiment realizes the content recommending function using a system composed of devices having a different structure to those in the already-described embodiments. Furthermore, the results of the content recommending processing are presented to the user in an easy-to-understand manner with use of a UI.

The following describes the structure of the system of the present embodiment, and then describes the UI.

6.1 System Structure

Figure 24:
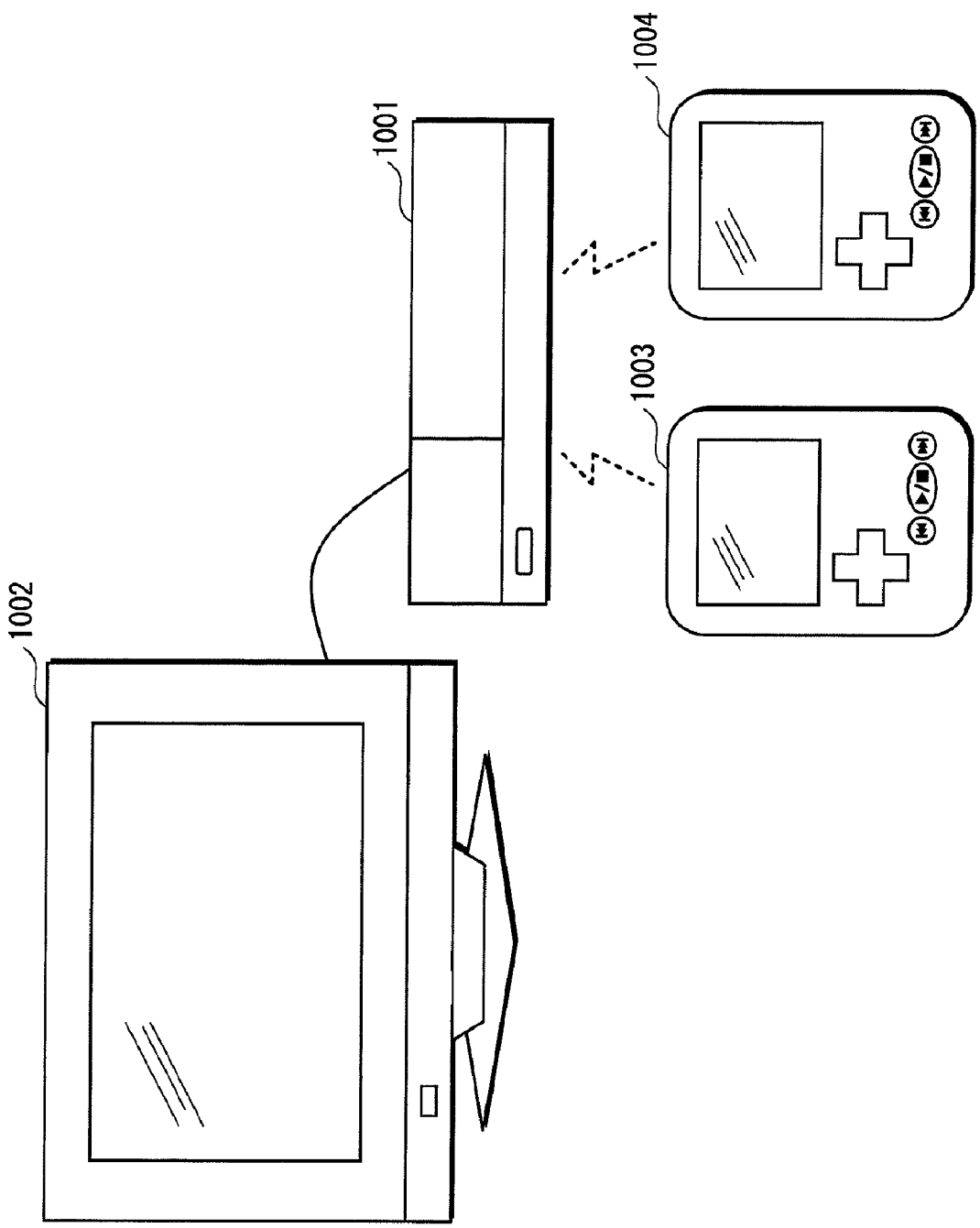
FIG. 24 shows the structure of a content recommending system in an embodiment of the present invention.

The content recommending system of the present embodiment, as shown in FIG. 24, is composed of an STB (Set Top Box) device 1001, a TV device 1002, and mobile terminals 1003 and 1004. The STB device 1001 has a built-in content recommending function, and is connected to the TV device 1002. The mobile terminals 1003 and 1104 communicate with the STB device 1001.

6.1.1. TV Device 1002

The TV device 1002 is a display device such as a PDP or an LCD.

The TV device 1002 is, specifically, a computer system composed of a microprocessor, a ROM, a RAM, a display unit, a communication device, and the like. Computer programs are stored in the ROM. The TV device 1002 achieves its functions by the computer programs being read to the RAM, and the microprocessor operating in accordance with the computer programs.

The TV device 1002 receives a video signal for displaying a UI, content or the like output by the STB device 1001, and displays video based on the video signal.

Furthermore, the display screen of the TV device 1002 is a touch panel, and when the user touches the touch panel, the TV device 1002 outputs touch location information indicating the location on the touch panel that was touched, to the STB device 1001.

6.1.2. STB Device 1001

The STB device 1001 is a HDD recorder, a DVD recorder, a stereo component or the like that includes the content recommending function. The STB device 1001 may, for instance, communicate with the TV device 1002 using a cable or radio communication, and communicate with the mobile terminals 1003 and 1004 using infrared communication, radio, or a LAN.

The STB device 1001 is, specifically, a computer system composed of a microprocessor, a ROM, a RAM, a hard disk unit, a communication device, a network adapter, and the like. Computer programs are stored in the ROM or the hard disk unit. The STB device 1001 achieves its functions by the computer programs being read to the RAM, and the microprocessor operating in accordance with the computer programs.

The STB device 1001 acquires a user profile, such as a content viewing/listening history, from each of the mobile terminal 1003 and 1004 by communication, and using the content recommending function, selects contents that will stimulate conversation based on the acquired user profiles.

The STB device 1001 then generates a UI or the like to present the content to be recommend to the users in an easy-to-understand manner, and transmits a signal to the TV device 1002 and the mobile terminals 1003 and 1004 in order to have the UI displayed.

The STB device 1001 receives the touch location information from the TV device 1002.

Using the touch location information, the STB device 1001 specifies the location and image that the user has touched in the UI being displayed on the screen of the TV device 1002. As one example, the STB device 1001 displays an image showing a button in the UI, and recognizes that the button has been touched by the user on the screen displayed by the UI. The STB device 1001 then executes processing stored in advance as processing to be performed when the button is touched.

Figure 25:
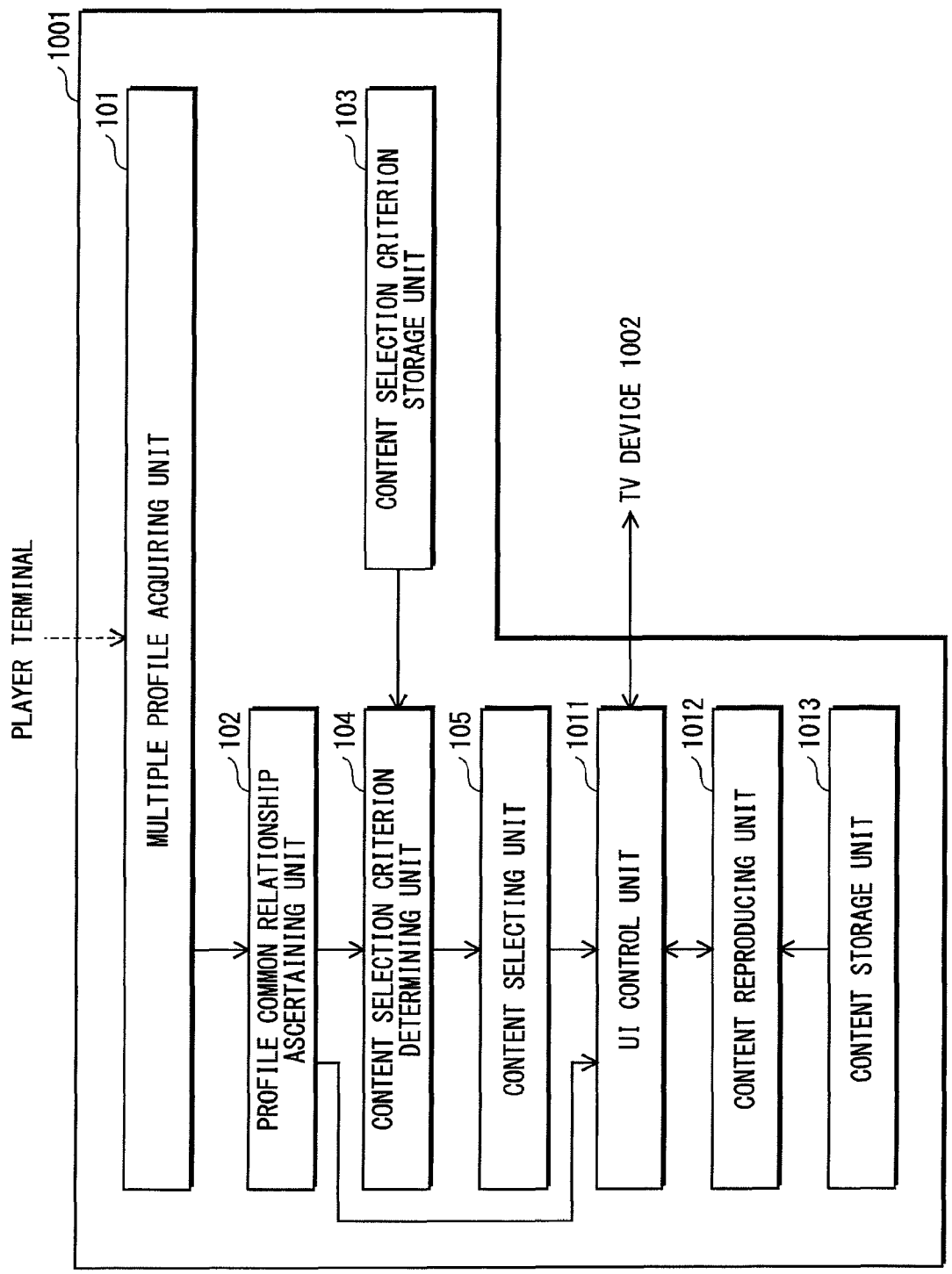
FIG. 25 is a block diagram showing the internal structure of an STB device.

The STB device 1001, as shown in FIG. 25, is composed of the multiple profile acquiring unit 101, the profile common relationship ascertaining unit 102, the content selection criterion storage unit 103, the content selection criterion determining unit 104, the content selecting unit 105, a UI control unit 1011, a content reproducing unit 1012, and a content storage unit 1013.

Here, unless otherwise stated, the multiple profile acquiring unit 101, the profile common relationship ascertaining unit 102, the content selection criterion storage unit 103, the content selection criterion determining unit 104, and the content selecting unit 105 are the same as the compositional elements having the same numeric references as already described in FIG. 5, and therefore a description thereof is omitted.

The UI control unit 1011 generates a UI based on the touch location information received from the TV device 1002, and outputs a video signal to the TV device 1002 so that the TV device 1002 displays the UI.

The UI control unit 1011 stores, in advance, the UI to be displayed next in the case that the image displayed in the location shown in the touch location information in the UI being displayed is touched. Upon receiving the touch location information from the TV display 1002, the UI control unit 1011 generates a UI to be displayed, and outputs a video signal representing the UI to the TV device 1002.

Furthermore, when the UI control unit 1011 judges that a content ID is being displayed in a location shown by received touch location information in the UI being displayed, the UI control unit 1011 transmits a reproduction instruction to the content reproducing unit 1012 so that the content reproducing unit 1012 reproduces the content corresponding to the content ID.

In accordance with the reproduction instruction, the content reproducing unit 1012 reads the content to be reproduced from the content storage unit 1013, and reproduces the read content.

The content storage unit 103 is a storage device for storing content.

The mobile terminal 1003 is a mobile terminal used by the user A, such as a PDA, a music player, a photograph viewing device, or a moving picture reproducing device.

The mobile terminal 1004 is a mobile terminal used by the user B.

The mobile terminal 1003 is, specifically, a computer system composed of a microprocessor, a ROM, a RAM, a hard disk unit, a display unit, a keypad, a communication device, a network adapter, a speaker, and the like. Computer programs are stored in the ROM or the hard disk unit. The mobile terminal 1003 achieves its functions by the computer programs being read to the RAM, and the microprocessor operating in accordance with the computer programs. The functions achieved by the mobile terminal include a content reproduction function, and a function of displaying a recommended content display UI that is based on a signal received from the STB device 1001, and that is for displaying recommended content, a UI of which display is instructed, or the like.

The mobile terminal 1003 stores a user profile, such as a viewing/listening history table, of the user who uses the mobile terminal 1003. The mobile terminal 1003 transmits the user profile to the STB device 1001 when, for instance, an instruction to do so is received from the user, or when a terminal device used by another user is in close proximity of the mobile terminal 1003.

The mobile terminal 1003 receives a signal for displaying a UI or the like from the STB device 1001, and displays the UI.

Furthermore, the mobile terminal 1003 includes a display unit for displaying a UI or the like. The surface portion of the display unit is a touch panel. The user gives an instruction to the mobile terminal 1003 by touching the touch panel. When reproduction of content is instructed by the user touching the touch panel, the mobile terminal 1003 reproduces the designated content.

The mobile terminal 1004 has the same structure as the mobile terminal 1003, and therefore a description thereof is omitted.

6.2. UI 6.2.1. UI Generated by the STB Device 1001

The following describes the UI more specifically.

The UI is generated by the STB device 1001. The TV device 1002 receives a video signal or the like representing the generated UI, and displays the UI on a display that is part of the TV device 1002.

FIG. 26 shows a UI for presenting the results of content recommending processing to the user in an easy-to-understand manner.

An image 1100 is the image that is first displayed in order to display the results of the content recommending processing.

The image 1100 includes an image 1102 that includes a commonality map image 1111, and an image 1101 in which an explanation of the commonality map image 1111 is given.

The purpose of the commonality map image 1111 is to present, to the user in an easy-to-understand manner, the results of the content recommending processing relating to the user profiles of the user A and the user B described in the above embodiments.

The commonality map image 1111 includes a title image 1112, a Venn diagram image 1113, a details button image 1114, and a pop-up image 1115.

The title image 1112 shows which attribute was used in the content recommending processing that the commonality map image 1111 shows the results of.

In the present example, the text "overall" is shown in the title image 1112.

This shows that the elements of the set A are all content IDs in the user profile of the user A, and the elements of the set B are all the content IDs in the user profile of the user B.

The Venn diagram image 1113 shows the same Venn diagram as FIG. 6 described in the first embodiment, and includes a circle 1116 representing the set A and a circle 1117 representing the set B.

The circles may be made more easily distinguishable by, for instance, rendering the circle 1116 with blue lines and the circle 1117 with red lines.

In the Venn diagram image 1113, the areas that include the content IDs selected as a result of the content recommending processing to stimulate conversation, in order words areas showing the set (A−(A&B)) and the set (B−(A&B)), are displayed in an emphasized manner that allows them to be easily distinguished from other areas.

In the present embodiment, the emphasized manner of display is achieved by using diagonal lines to render the areas to be emphasized.

Furthermore, the greater the commonality ratio S is, the greater extent to which the circles 1116 and 1117 overlap with each other in the Venn diagram image 1113. This is so that the size of the commonality ratio S (the ratio of the product set (A&B) to the union (A|B)) can be easily grasped at a glance.

An explanation of the display of the image 1102 is given in the image 1101.

For instance, the set A in the Venn diagram image 1113 shows content IDs relating to "Taro Tsuchida" as user A, and the set B in the Venn diagram 1113 shows the content IDs relating to "Hanako Sonobe" as user B.

Furthermore, in the image 1102, for ease of distinction, the circle 1116 showing the set A in the Venn diagram image 1113 is outlined in blue, and the circle 1117 showing the set B in the Venn diagram 1113 is outlined in red.

Furthermore, at least one of the images or areas in the UI denotes "points of note" indicating content selected as a result of the content recommending processing that will stimulate conversation.

In the present embodiment, the areas including the content IDs that will stimulate conversation are the parts shown as hatching with diagonal lines on the UI. The parts hatched with the diagonal lines on the UI are denoted as "points of note".

Note that although in the image 1101 information presented to the user is distinguished by outlining the circles representing each user with different colors, the information may instead be distinguished by way of shape, lines, or any other way.

Furthermore, although diagonal line hatching is used to make the areas that stimulate conversation easily distinguishable, these areas may instead be distinguished by way of color, shape, or any other way.

The popup image 1115 pops up as a list of content belonging to an area on the UI selected by the user touching the touch panel.

As one example, in the case of the image 1100 of FIG. 26 being displayed on the touch panel, if the user touches the area representing the set (A−(A&B)), the popup image 1115 will be displayed with respect to the area representing the set (A−(A&B)).

Here, the popup image 1115 may display content belonging to an area that is displayed in an emphasized manner in the Venn diagram image 1113 to stimulate conversation regardless of whether or not the user touches the touch panel.

Furthermore, the popup display in which the content IDs are displayed in the popup image may be displayed in a manner that the user can designate a content ID from among those displayed in the popup image. When a content ID is selected, the content corresponding to the selected content ID may be reproduced.

The details button image 1114 is a button for displaying an image showing more detailed information when the user touches the details button image 1114 displayed on the touch panel.

For instance, when the image shown in FIG. 26 is displayed and the details button image 1114 displayed on the touch panel is touched by the user, the displayed image 1100 transitions from the image shown in FIG. 26 to the image shown in FIG. 27.

FIG. 27 shows an image for displaying detailed information relating to the image shown in FIG. 26.

The image 1102, as shown in FIG. 27, is reduced in size compared to the state shown in FIG. 26, and is displayed together with the image 1103.

The image 1103 displays information in more detail than the image 1102, namely broken down into attributes.

As one example, in the content recommending processing described in the second and third embodiments, several unions (e.g., 3) may be selected in descending order of the number of elements contained therein from among the unions (A|B) corresponding to the attributes, and a commonality map image of each of the attributes corresponding to the selected unions may be displayed in the image 1103.

More specifically, as shown in FIG. 26, commonality map images 1121, 1122 and 1123 are displayed in the image 1103.

Similar to the commonality map image 1111, the commonality map image 1121 includes a title image 1131, a Venn diagram image 1134, and a details button image 1137.

The title image 1131 shows which attribute was used in the content recommending processing that the commonality map image 1121 is based on the results of.

Here, the title image 1131 lists the text "artist" and "Mayumi Hamada" showing that the elements are content IDs having the attribute value "Mayumi Hamada" for the attribute "artist".

The Venn diagram image 1134 is an image showing a similar Venn diagram to the Venn diagram image 1113, with the exception that the elements of the sets A and B are the content IDs having the attribute value "Mayumi Hamada" for the attribute "artist".

Similar to the commonality map image 1121, the commonality map image 1122 includes a title image 1132, a Venn diagram image 1135, and a details button image 1138.

The commonality map image 1122 is the same as the commonality map image 1121, with the exception that the elements of the sets A and B are the content IDs having the attribute value "rock" for the attribute "genre".

Similar to the commonality map image 1121, the commonality map image 1123 includes a title image 1133, a Venn diagram image 1136, and a details button image 1139.

The commonality map image 1123 is the same as the commonality map image 1121, with the exception that the elements of the sets A and B are the content IDs having the attribute value "Hikari Utada" for the attribute "artist".

As with the commonality map image 1111, a popup image listing content belonging to an area on the UI touched by the user may be displayed with respect to the commonality map images 1121 to 1123.

Furthermore, by touching one of the commonality map images 1121 to 1123 displayed on the touch panel, the user can select the sets (A−(A&B)), (B−(A&B)) and the product set (A&B) in the touched commonality map image.

When the user then further touches the part showing one of these sets that takes his/her interest, a list of contents belonging to the area that the user selected is displayed as a popup image. When the user touches one of the content IDs displayed in the popup image, the content designated by the user is reproduced.

Although the image shown in FIG. 26 is described as being displayed first, the image shown in FIG. 27 may be displayed first.

Furthermore, the "details button image" in the selected commonality map image becomes selectable, and when the user selects the selectable "details button image" by touching the "details button image", the display changes to an image such as an image 1200 shown in FIG. 28.

The image 1200 includes an image 1202 and an image 1203, the image 1202 including commonality map images 1211 to 1213, and the image 1203 including commonality map images 1221 to 1223 for explaining the commonality map image 1212 in further detail.

The image 1201 shows an explanation of the commonality map images 1211 to 1213 and the commonality map images 1221 to 1223. The image 1202 has the same contents as the image 1103 in the image 1100, but the display position is different to the display position in the image 1100.

The image 1203 shows the image 1212 in detail by attribute.

As one example, in the content recommending processing described in the second and third embodiments with respect to the content IDs having the attribute value "rock" for the attribute "genre", several unions (e.g., 3) may be selected in descending order of the number of elements contained therein from among the unions (A|B) corresponding to the attributes, and a commonality map image of each of the attributes corresponding to the selected unions may be displayed in the image 1203.

More specifically, as shown in FIG. 28, commonality map images 1221, 1222 and 1223 are displayed in the image 1203.

The commonality map image 1221 is the same as the commonality map image 1121, except that the elements of the sets A and B are content IDs having an attribute value "Devonce" for the attribute "artist".

The commonality map image 1222 is the same as the commonality map image 1121, except that the elements of the sets A and B are the content IDs having an attribute value "Girlz Women".

The commonality map image 1223 is the same as the commonality map image 1121, except that the elements of the sets A and B are the content IDs having an attribute value "Stevie Carey".

Here, when the display is switched from the image 1100 to the image 1200, the image 1101 (or the image 1201) may continue to be displayed, without being switched.

Furthermore, similar to the switch from the screen 1100 to the screen 1200, the screen transition when the user selects the "details" area in any of sections 1221 to 1223 results in a commonality map of, the user A and the user B narrowed down to a range of a set using a further attribute value being displayed.

Furthermore, section selection, area selection and content designation by the user after the switch, and the corresponding display style and the like, are the same as in the screen 1100 and the screen 1200.

Note that instead of the user touching a target area of the touch panel in the TV device 1002 as described to press a button, select an area or designate content, the following may be performed.

The mobile terminal 1003 (1004) may be used as a remote control, and operation information corresponding to an operation of the keypad of the mobile terminal 1003 (1004) may be transmitted to the STB device 1001 or the TV device 1002 by way of infrared communication or the like.

Alternatively, the user may touch a target place on a screen of a touch panel mounted in the mobile terminal 1003 (1004), or select and designate a target place by operating an arrow keypad or the like mounted in the mobile terminal 1003 (1004). The mobile terminal 1003 (1004) then transmits corresponding information to the STB device 1001 or the TV device 1002 by way of wireless communication or the like.

Furthermore, in the case that the mobile terminal 1003 (1004) is used as a remote control, instead of selecting the "details button image", the described display performed when the "details button image" is pressed can be displayed by the user selecting a target area on the UI, and then performing an operation such as pressing a right arrow button on the arrow keypad.

6.2.1. UI Generated by the Mobile Terminals 1003 and 1004

Referring to FIGS. 29A to 29D, a description is now given of the UI displayed by the mobile terminals 1003 and 1004, and transition and the like relating thereto.

The display mounted in the mobile terminal 1003 is extremely small compared to the TV device 1002, and therefore there are considerable restrictions on the size of the screen for displaying the UI.

If an image, such as the image 1100, that includes the image 1103 in which three commonality map images are disposed in parallel is displayed on the display of the TV device 1002, this would have the opposite effect of making the contents of the image difficult for the user to grasp.

FIG. 29A shows a content recommendation presentation UI displayed by the mobile terminal 1003 used by the user A.

A screen 1300 shown in FIG. 29, for instance, is first displayed on the display of the mobile terminal 1003.

The contents of the image 1300 are basically the same as the contents of the image 1100 already described, but with the following differences.

The listing "Taro Tsuchida" has been replaced with a listing "you" showing that "Taro Tsuchida" is the user of the terminal 1003.

Furthermore, an area that will stimulate conversation for "you" who is the user A may be displayed so as to be clearly distinguishable by rendering the area in the Venn diagram image with diagonal lines, for instance.

When, for instance, the user selects the "details button image" in the image 1300, the screen switches to display an image 1400 shown in FIG. 29B as a commonality map based on a single attribute of user A and user B.

The image 1400 is basically the same as the image 1100 already described, but with the following differences.

The image 1400 displays a commonality map image relating to the attribute of the union that has the greatest number of elements among the unions (A|B) of each of the attributes extracted in the content recommending processing described in the second embodiment and the third embodiment.

Although an area in the image being displayed is selected using the touch panel in the TV device 1002, in the mobile terminal 1003 an area is selected by an operation of the arrow keypad, for instance.

Furthermore, an image 1500 that includes a commonality map image 1511 relating to another attribute may be displayed by an up arrow button image 1421 or a down arrow button image 1422 in the image 1400 being selected when the image 1400 is being displayed.

Then, when the image 1500 is being displayed, it is possible to return to the image 1400 that includes the commonality map image 1411 by selecting an up arrow button image 1421 on the image 1500.

Here, when the user selects the "details button image", a commonality map image relating to an attribute value relating to an attribute that, among attributes in a lower level, has the greatest number of elements in its union (A|B) is displayed.

The commonality map image displayed here is, for instance, an image like the image 1221 shown in FIG. 28.

Furthermore, similar to the already described switch from the image 1300, the screen transition when the user selects the "details button image" results in displaying of a commonality map of the user A and the user B narrowed down to a range of a set using a further attribute value.

Furthermore, section selection, area selection and content designation by the user after the switch, and the corresponding display style and the like, are the same as in the image 1400 and the image 1500 already described.

The UI displayed by the mobile terminal 1004 used by the user B is basically the same as in the mobile terminal 1003 in aspects such as display style, area selection, and how content is designated.

One difference, however, is that where the user who uses the mobile terminal is listed, the user is shown as "YOU". For instance in the image 1601 in the image 1600 displayed by the mobile terminal 1004, in terms of the participating users, the user A is shown as "Taro Tsuchida" and the user B is shown as "YOU".

Furthermore, the area displayed in a distinguishable manner (the area unknown to the user who uses the mobile terminal) that is to stimulate conversation to the user who uses the mobile terminal is different. For instance, whereas in the image 1502 displayed by the mobile terminal 1003 displays the set (B−(A&B)) in a highlighted manner as the area that will stimulate conversation selected in the content recommending processing, in the image 1602 in the mobile terminal 1004, the set (A−(A&B)) is displayed in a distinguishable manner as the area that will stimulate conversation selected in the content recommending processing.

Note that the mobile terminal 1003 (1004) may have a touch panel, and the user may perform operations such as selecting a section of an area of the UI, or designating contents by touching the touch panel.

Furthermore, the mobile terminal 1003 (1004) may have an arrow keypad or the like, and the user may perform selection of a target place, designation of content, or the like by operating the arrow keypad.

Note that in order for the users to share topics of conversation, information may be exchanged between the mobile terminal 1003 used by the user A and the mobile terminal 1004 used by the user B.

For instance, according to an operation of the mobile terminal 1003 by the user A, the mobile terminal 1003 may notify information being displayed on the screen of the mobile terminal 1003 (e.g., a Venn diagram) to the mobile terminal 1004.

The mobile terminal 1004 may display the information notified by the mobile terminal 1003 on the screen of the mobile terminal 1004.

This enables the user A and the user B to exchange the information displayed on the screens with each other.

Note that although the content recommending system in the above includes as its devices two mobile terminals used by respective ones of two users, the content recommending system may include three or more mobile terminals.

In the case of three or more terminals, the display of the Venn diagram or the like will be made based on information relating to three or more users.

7. Seventh Embodiment

In the sixth embodiment, a description was given of the content recommending system being composed of the STB device 1001, the TV device 1002, the mobile terminal 1003 used by the user A, and the mobile terminal 1004 used by the user B.

Figure 30:
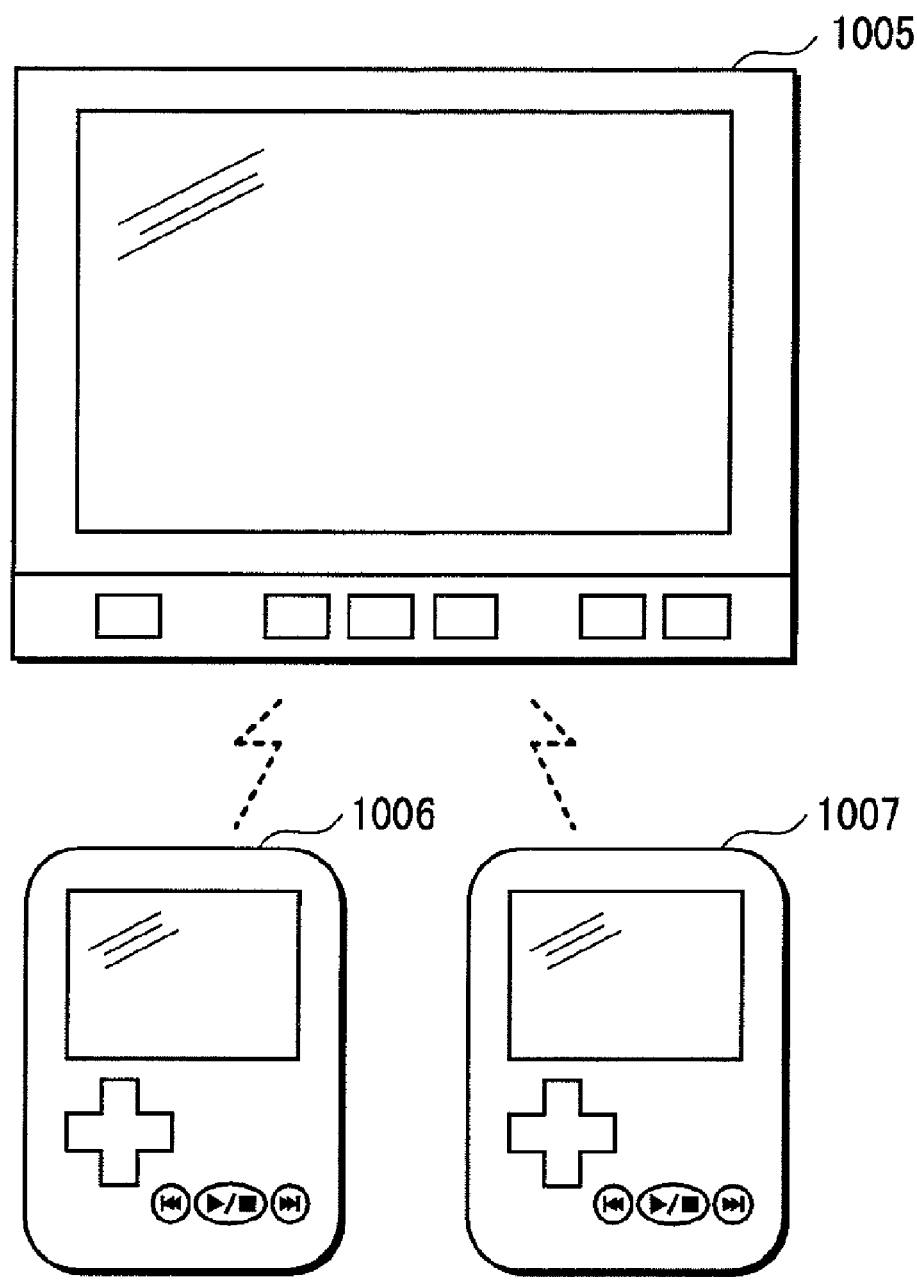
FIG. 30 shows a variation of the structure of a content recommending system.

The content recommending system in the present embodiment has a different device structure to that of the sixth embodiment. As shown in FIG. 30, the content recommending system of the present embodiment is composed of an integrated device 1005, a mobile terminal 1006 used by a user A, and a mobile terminal 1007 used by a user B. The integrated device 1005 is equipped with a content recommending function.

The integrated device 1005 may be a device such as a car navigation device or a personal computer, and is, specifically, a computer system composed of a microprocessor, a ROM, a RAM, a hard disk unit, a display unit, communication device, a network adapter, and the like.

Computer programs are stored in the ROM or the hard disk unit, and the integrated device 1005 achieves the content recommending function, display of the recommended content display UI and the like by the computer programs being read to the RAM, and the microprocessor operating in accordance with the computer programs.

The content recommending function achieved here is achieved by the internal processing in the content recommendation that has been described in the previous embodiments.

Furthermore, the recommended content presentation UI displayed by the display function achieved here is the same as the recommended content presentation UI displayed by the display function included in the TV device 1002 described using FIG. 27 and FIG. 28 in the sixth embodiment.

Using the included content recommending function, the integrated device 1005 acquires user profiles such as content viewing/listening histories from the mobile terminal 1006 and the mobile terminal 1007 using infrared communication, wireless communication, or the like. The integrated device 1005 selects content that will stimulate conversation, and generates a UI for displaying the selected content.

Furthermore, the using the included display function, the integrated device 1005 displays the content recommended by the included content recommending function, a UI for which a display instruction has been received, and so on.

The integrated device 1005 includes a touch panel that a user can use to designate an area in a displayed UI, and reproduces content belonging to the designated area.

Each of the mobile terminals 1006 and 1007 may be a mobile telephone, a PDA, a music player, a photograph viewing device, or a moving picture reproducing device, and is, specifically, a computer system composed of a microprocessor, a ROM, a RAM, a hard disk unit, a display unit, a keypad, a communication device, a network adapter, a speaker, and the like.

Computer programs are stored in the ROM or the hard disk unit. By the computer programs being read to the RAM, and the microprocessor operating in accordance with the computer programs, the mobile terminals 1006 and 1007 each achieve functions such as a content reproduction function, and a function of displaying a recommended content display UI based on a signal that is for displaying recommended content and is received from the integrated device 1005.

The recommended content presentation UI displayed according to the display function achieved here is the same as the recommended content presentation UI displayed according to the display function included in the mobile terminals 1003 and 1004, described with use of FIG. 27 in the sixth embodiment.

Each of the mobile terminals 1006 and 1007 stores a user profile, such as the content viewing/listening history, of the user of the mobile terminal. Each of the mobile terminals 1006 and 1007 transmits the user profile to the STB device 1001 when, for instance, an instruction to do so is received from the user, or when a terminal device used by another user is in close proximity of the mobile terminal.

Each of the mobile terminals 1006 and 1007 receives, from the STB device 1001, a signal for displaying recommended content or a UI of which displayed has been instructed or the like, and displays the recommended content or the UI.

Each of the mobile terminals 1006 and 1007 includes a touch panel that the user can use to designate an area in the displayed UT, and reproduces the contents belonging to the designated area.

Note that in order for the users to share topics of conversation, information may be exchanged between the mobile terminal 1006 used by the user A and the mobile terminal 1007 used by the user B.

For instance, according to an operation of the mobile terminal 1006 by the user A, the mobile terminal 1006 may notify information being displayed on the screen of the mobile terminal 1006 (e.g., a Venn diagram) to the mobile terminal 1007.

The mobile terminal 1007 displays the information notified by the mobile terminal 1006 on the screen of the mobile terminal 1007.

This enables the user A and the user B to exchange the information displayed on the screens with each other.

Note that although the content recommending system in the above includes as its devices two mobile terminals used by respective ones of two users, the content recommending system may include three or more mobile terminals.

In the case of three or more terminals, the display of the Venn diagram or the like will be made based on information relating to three or more users.

8. Eighth Embodiment

In the sixth embodiment, a description was given of the content recommending system being composed of the STB device 1001, the TV device 1002, and the mobile terminals 1003 and 1004 used by the user A and the user B.

Furthermore, in the seventh embodiment, a description was given of the content recommending system being composed of the integrated device 1005 including the content recommending function, and the mobile terminals 1006 and 1007 used by the user A and the user B.

Figure 31:
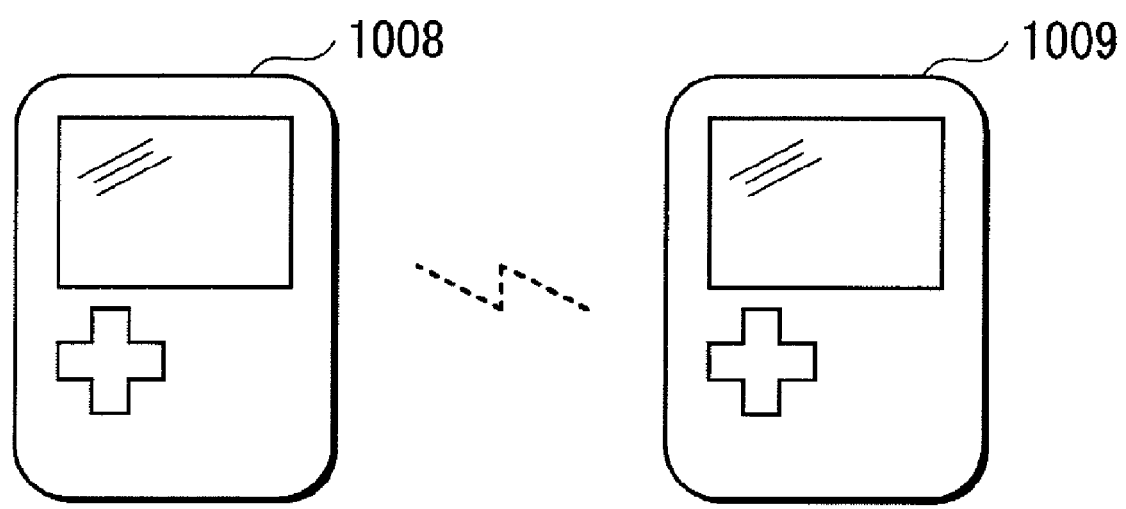
FIG. 31 shows a variation of the structure of a content recommending system.

The content recommending system of the present embodiment, as shown in FIG. 31, is composed of a mobile terminal 1008 used by a user A and a mobile terminal 1009 used by a user B.

In other words, a device such as the described STB device 1001, the TV device 1002 or the integrated device 1005 is not used. Each of the mobile terminals 1008 and 1009 may be a mobile telephone, a PDA, a music player, a photograph viewing device, or a moving picture reproducing device, and is, specifically, a computer system composed of a microprocessor, a ROM, a RAM, a hard disk unit, a display unit, a keypad, a communication device, a network adapter, a speaker, and the like.

Computer programs are stored in the ROM or the hard disk unit. By the computer programs being read to the RAM, and the microprocessor operating in accordance with the computer programs, the mobile terminals 1008 and 1009 each achieve functions such as a content reproduction function, a content recommending function, and a recommended content display UI display function.

The content recommending processing achieved here is achieved by the internal processing in the content recommendation that has been described in the previous embodiments. The recommended content presentation UI displayed by the display function achieved here is the same as the recommended content presentation UI displayed according to the display function included in the mobile terminals 1003 and 1004 described using the FIG. 29 in the sixth embodiment.

Each of the mobile terminals 1008 and 1009 stores a user profile, such as the content viewing/listening history, of the user of the mobile terminal, and selects content that will stimulate conversation based on the stored user profile and displays the selected contents when, for instances an instruction to do so is received from the user, or when a terminal device used by another user is in close proximity of the mobile terminal.

Using the included display function, each of the mobile terminals 1008 and 1009 displays the content recommended by the included content recommending function, a UI that for which a display instruction has been received, and so on. Each of the mobile terminals 1008 and 1009 includes a touch panel that a user can use to designate an area in a displayed UI, and reproduces content belonging to the designated area.

Note that in order for the users to share topics of conversation, information may be exchanged between the mobile terminal 1008 used by the user A and the mobile terminal 1009 used by the user B as described in the seventh embodiment.

Note that although the content recommending system in the above includes as its devices two mobile terminals used by respective ones of two users, the content recommending system may include three or more mobile terminals.

In the case of three or more terminals, the display of the Venn diagram or the like will be made based on information relating to three or more users.

9. Ninth Embodiment

In the embodiments so far, examples of using a viewing/listening history of commercial contents, such as songs, as a user profile have been described.

In the example described in the present embodiment, the user profile is data history of personal content and content information, such as history of photographs taken by the camera of a user, or data detected using some kind of sensor.

The content recommending system of the present embodiment is the same as the embodiments described so far in terms of aspects such as (i) the internal processing in the content recommendation, such as setting and calculating the commonality ratio, and the variations of the internal processing, (ii) the system for performing the internal processing in the content recommendation processing, and (iii) the device structure and the variations of the device structure.

In the present embodiment, the mobile terminal 1006 generates content information.

The mobile terminal 1006 has a camera.

The content is photographs taken by the user using the camera of the mobile terminal 1006 by continuous shooting.

The content information is information relating to the activities or location of the user when he/she took the photographs that are the contents.

The content information is obtained by analyzing the activities, location or the like of the user based on data detected using, for instance, a GPS or a gyro sensor included in the camera of the user, or an environment sensor located in a room or at a base station. Each piece of content information is in correspondence with an attribute and an attribute value corresponding to the attribute.

The attributes constitute a logical hierarchical structure. The attributes are more detailed the deeper they are in the levels, the highest level in the hierarchical structure being a first level, which is followed by a second level, a third level, and so on, through to an n-th level.

Figure 32:
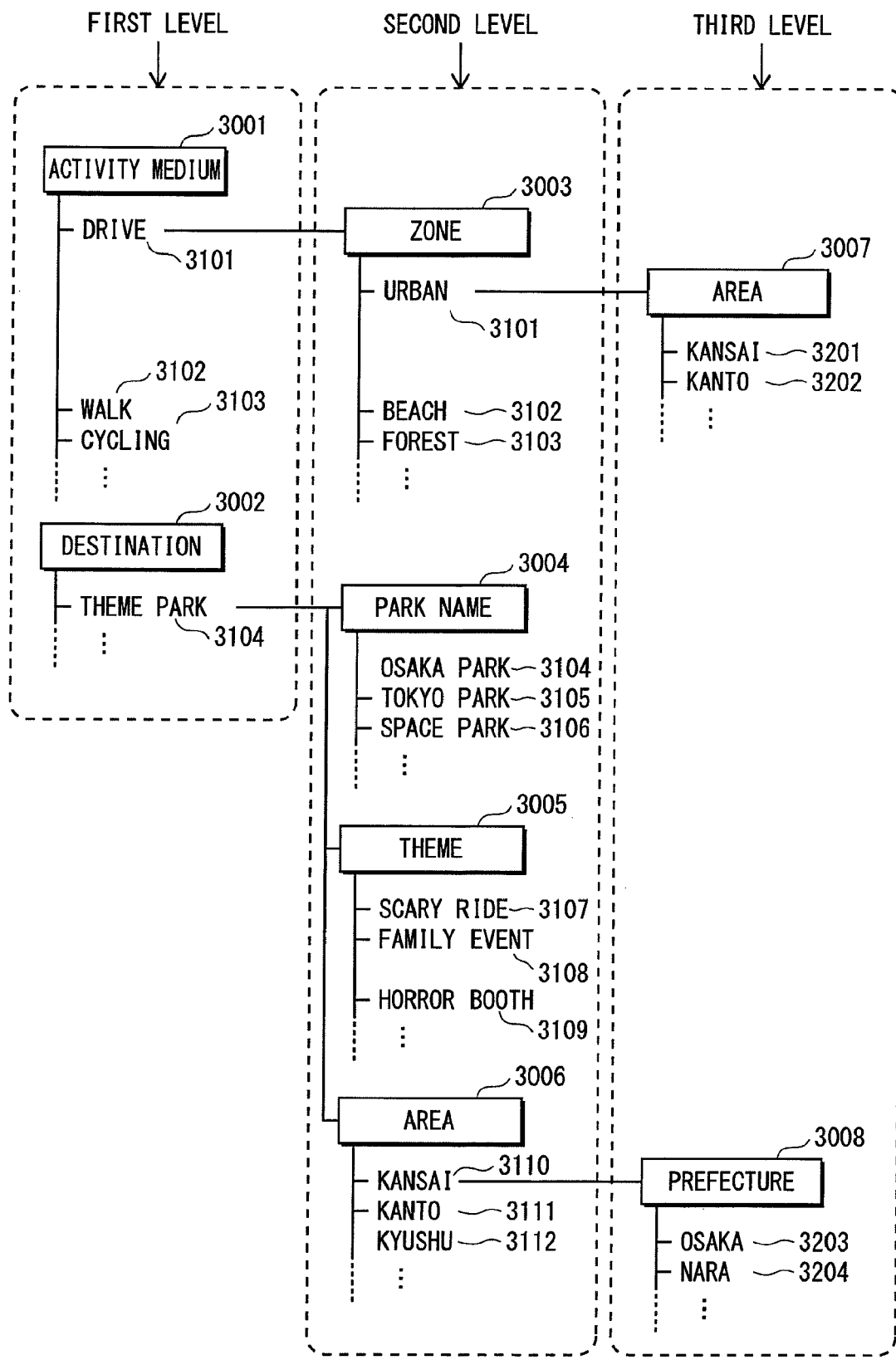
FIG. 32 shows a hierarchical structure of attributes and attribute values.

FIG. 32 shows the attributes and the attribute values in the hierarchical structure.

Each text shown surrounded by a rectangle in FIG. 32 is an attribute.

As shown in FIG. 32, "activity medium" (3001) and "destination" (3002) are attributes in the first level, "zone" (3003), "park name" (3004), "theme" (3005) and "area" (3006) are attributes in the second level, and "area" (3007) and "prefecture" (3008) are attributes in the third level.

As also shown in FIG. 32, if a certain content has the attribute value "drive" (3101) for the attribute "activity medium" (3001) in the first level, the content will have "zone" (3003) as the attribute in the second level.

Furthermore, if the attribute value is "urban" (3101) for the attribute "zone" (3003) in the second level, the certain content will have "area" (3007) as the third level attribute.

The certain content will have one of "Kansai" (3201), "Kanto" (3202), etc. as the attribute value for the attribute "area" (3007) in the third level.

It is assumed here that the hierarchical structure shown in FIG. 32 is determined in advance, and stored in the mobile terminal 1006 and other devices in the system as a database.

Next, a description is given of the data structure for holding the contents, the attributes and the attribute values in the system in accordance with the hierarchical structure.

FIG. 33 shows a content information table that is the data structure for holding the attributes and attribute values.

In FIG. 33, "(A,B)" denotes an entry in which an attribute A and an attribute value B are in correspondence.

The content information table is generated as follows.

Here, it is assumed that a photo 1 (3301) is taken by the camera in the mobile terminal 1006.

Using a GPS function, the mobile terminal 1006 recognizes that it (i.e., the mobile terminal 1006) is moving at a speed at which a car moves, and thus determines the attribute value of the attribute "activity medium" as "drive", and writes "(activity medium, drive)" (entry 3302) in the same line as photo 1 (3301) in the content information table.

Furthermore, the mobile terminal 1006 checks information showing the current location recognized by the GPS function against map information stored in advance in the mobile terminal 1006, and recognizes that the mobile terminal 1006 is traveling through an urban area.

When the attribute value of the attribute "activity medium" in the first level is "drive", the mobile terminal 1006 recognizes based on FIG. 32 that the attribute in the second layer to be used is "zone", and determines the attribute value of the attribute "zone" in the second level as "urban".

Furthermore, the mobile terminal 1006 adds "zone, urban" (entry 3303) to the same line as photo 1 (3301) in the content information table.

The mobile terminal 1006 also ascertains other attributes to be used based on FIG. 32, and sets an attribute value of each of the attributes to be used, based on data detected by a sensor such as a GPS or a gyro, or an environment sensor provided in a room or a based station.

In this way, the entries showing combinations of attribute and attribute value recorded in the content information table with respect to "photo 1" (3301) are (activity medium, drive) 3302, (zone, urban) 3303, (area, Kansai) 3304, (destination, theme park) 3305, and (park name, Osaka Park) 3306.

Similarly, with respect to "photo 100" 3307 in FIG. 33, (destination, theme park) 3308, (park name, Tokyo park) 3309, (theme, scary ride) 3310, (area, Kanto) 3311, and (prefecture, Chiba) 3312 are recorded in the content information table.

In FIG. 33, the entries corresponding attributes and attribute values are arranged in the content information table without regard to the levels of the attributes. Therefore, in this case, the levels of the attributes will have to be referred to separately using the hierarchical structure shown in FIG. 32.

The data structure of the content information table may be as shown in FIG. 34.

Each column in FIG. 34 shows entries relating to attributes in a same level.

For example, an entry 3402 (activity medium, drive), an entry 3405 (destination, theme park), and an entry 3407 (activity content, travel) are entries in the same first level.

Furthermore, an entry 3403 (zone, urban), an entry 3406 (park name, Osaka park), and an entry 3408 (area, Kansai) are entries in the same second level.

Furthermore, an entry 3404 (area, Kansai) is an entry in the third level.

Entries that are related to each other are in a same line in FIG. 34.

With regard to the entry 3402 (activity medium, drive) on the first level, the entry one level below is the entry 3403 (zone, drive) on the second level, and the entry below the entry 3403 is the entry 3404 (area, Kansai) on the third level.

In this case, although there is no need to refer separately to a hierarchical structure such as that in FIG. 32, there may be entries that double up in terms of content, such as the entries 3404 3408.

Although not illustrated the FIG. 32 to 34, the following gives a further specific example of the attributes and attribute values in the levels.

The attributes in the first level include "activity medium", "destination", and "activity content".

The attribute values of "activity medium" attribute include "drive (car)", "walk (on foot)", and "cycling (bicycle)".

The attribute values of the "destination" attribute include "theme park", "movie theatre", and "karaoke".

The attribute values of the "activity content" attribute include "travel", "sport", and "party".

The attributes on the second level include "zone", "spot" and "area", which are more detailed attributes of the attributes on the first level, and correspond to the attribute value "drive" of the attribute "activity medium" on the first level.

The other attributes on the first level, such as the attribute "destination", are is correspondence with other attributes as attributes on the second level.

The attribute values of the "zone" attribute include "urban", "beach" and "forest".

The attribute values of the "spot" attribute include "night lights", "nature", "date course".

The attribute values of the "area" attribute include "Kansai", "Kanto", and "Kyushu".

The attributes on the second level also include "theme", "park name", and "area", which are more detailed attributes of the attribute value "theme park" of the attribute "destination" on the second level.

The attribute values of the "theme" attribute include "scary ride", "family event", and "horror booth".

The attribute values of the "park name" attribute include "Osaka Park", "Tokyo Park", and "Space Park".

As the attribute values of the "area" attribute, "Kansai", "Kanto", "Kyushu", and so on, are given as information.

Note that internal processing to allocate a unique attribute ID (grouping ID) to each of the attribute values may be performed.

Furthermore, the types and structure of the content information are not limited to the described types and structure, but other types and structure may be used.

Figure 35:
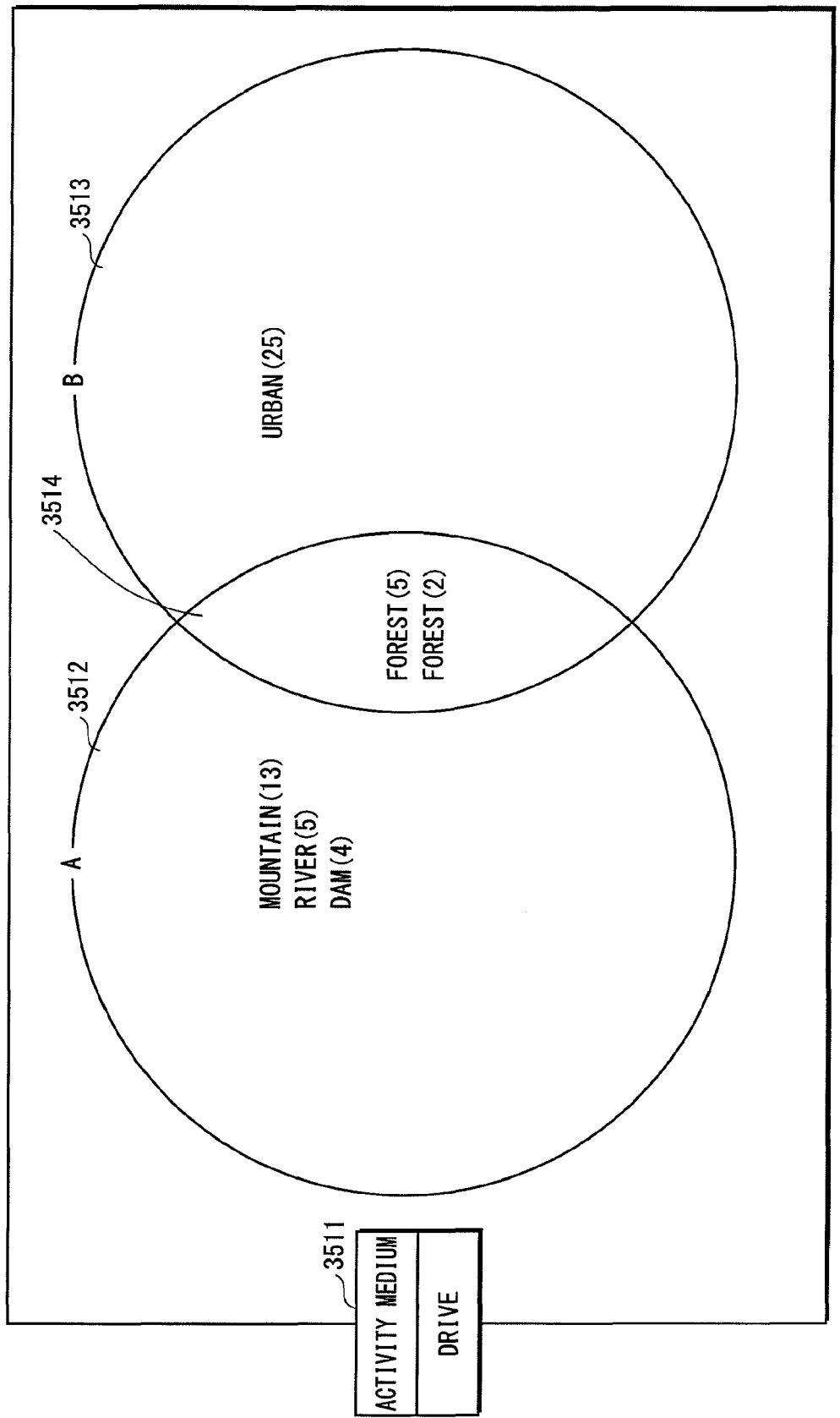
FIG. 35 shows an example of a Venn diagram generated using the content information table.

FIG. 35 shows an example of a Venn diagram using the content information shown as one example in FIG. 33.

The Venn diagram is of contents having the attribute value "drive" for the attribute "activity medium" in the first level.

The set A includes the second level attribute values "mountain", "river", "dam" and "forest" relating to the attribute value "drive" of the attribute "activity medium" in the first level.

Here, "forest (5)" in FIG. 35 shows that five entries have "forest" as an attribute value in the second level.

The set B includes the second-level attribute value "urban" relating to the attribute value "drive" of the attribute "activity medium" in the first level.

In the Venn diagram in FIG. 35, the set A and the set B are sets whose elements are respective attribute values of second-level attributes of content having the attribute value "drive" for the first-level attribute in the first level, based on the content information table recorded as user profiles of each of the user A and the user B. A commonality ratio S is calculated according to the ratio of the product set (A&B) to the union (A|B), using the same calculation method described in the previous embodiments.

Figure 36:
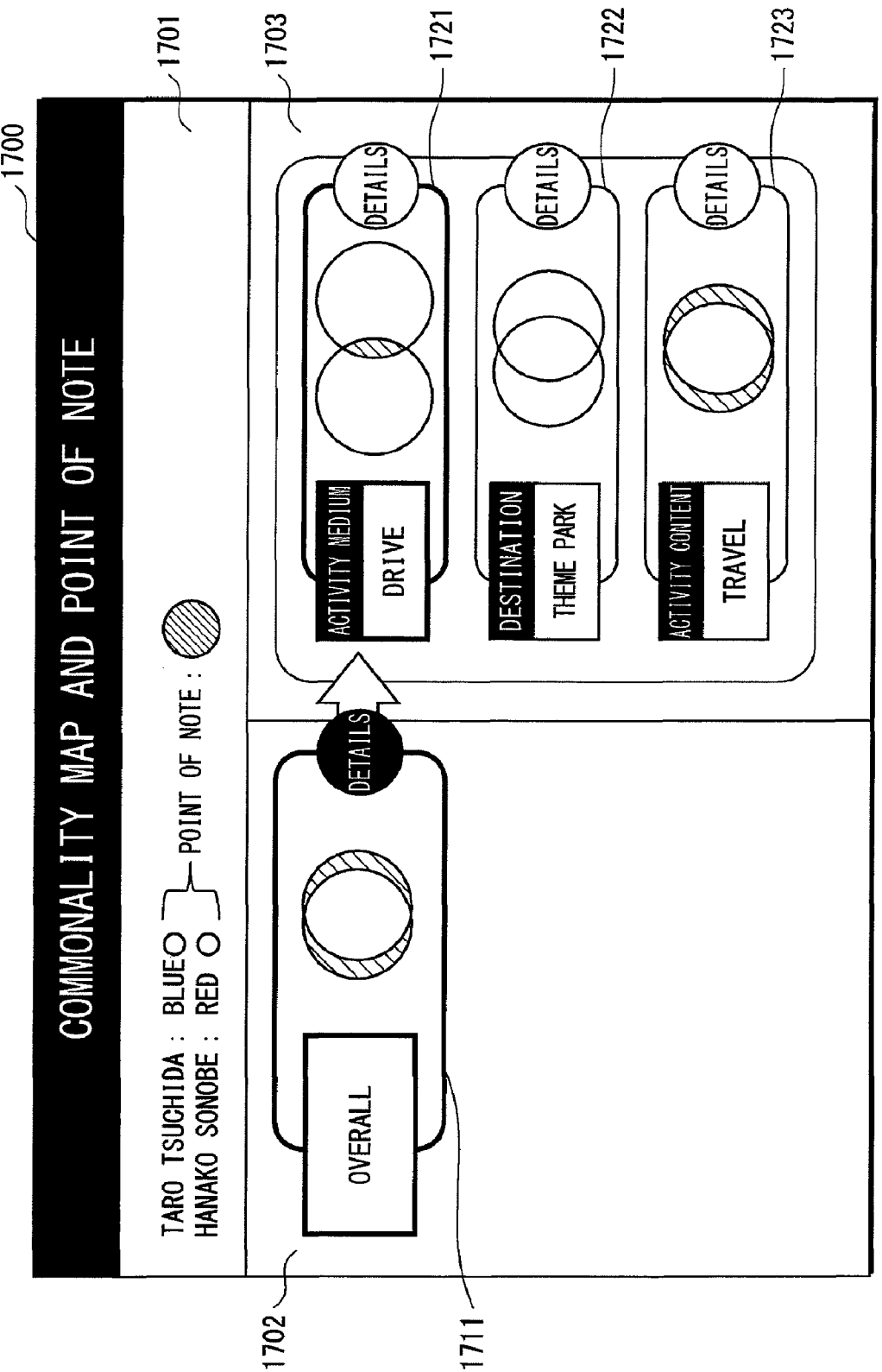
FIG. 36 shows an example of a screen display that includes commonality map images.

FIGS. 36 to 38 show an example of a recommended content presentation UI generated using the content, the content information, the user profiles, and the content information table described in the present embodiment.

FIGS. 36 to 38 correspond approximately to FIGS. 27 to 29 in terms of the operations when the details button image is pressed.

The difference is that whereas FIGS. 27 to 29 are Venn diagrams of sets containing content IDs as elements, the elements of the Venn diagrams in FIGS. 36 to 38 are the attribute values on lower levels with respect to attributes and attribute values in the title images.

In FIGS. 36 to 38, when the "details image button" is pressed, display is performed of sets whose elements are the attributes and attribute values one level below the attributes and attribute values shown in the title image in the commonality map image that includes the pressed "details image button".

For instance, the commonality map image 1711 is generated based on the commonality ratio etc. calculated using the content information data history of the user A and the user B.

In this case, the elements of the set A are the attribute values of all attributes in the first level with respect to the user A.

Furthermore, the elements of the set B are the attribute values of all attributes in the first level with respect to the user B.

The commonality map image 1711 shows a Venn diagram relating to the set A and the set B.

The image 1721 in the image 1703 in FIG. 36 is one image for displaying details of the highest-level attribute "overall". The image 1721 is generated using the attribute values of the second level relating to the contents for which the attribute value of the attribute "activity medium" in the first level (i.e., the level below the attribute "overall" on the highest level) is "drive".

Figure 39:
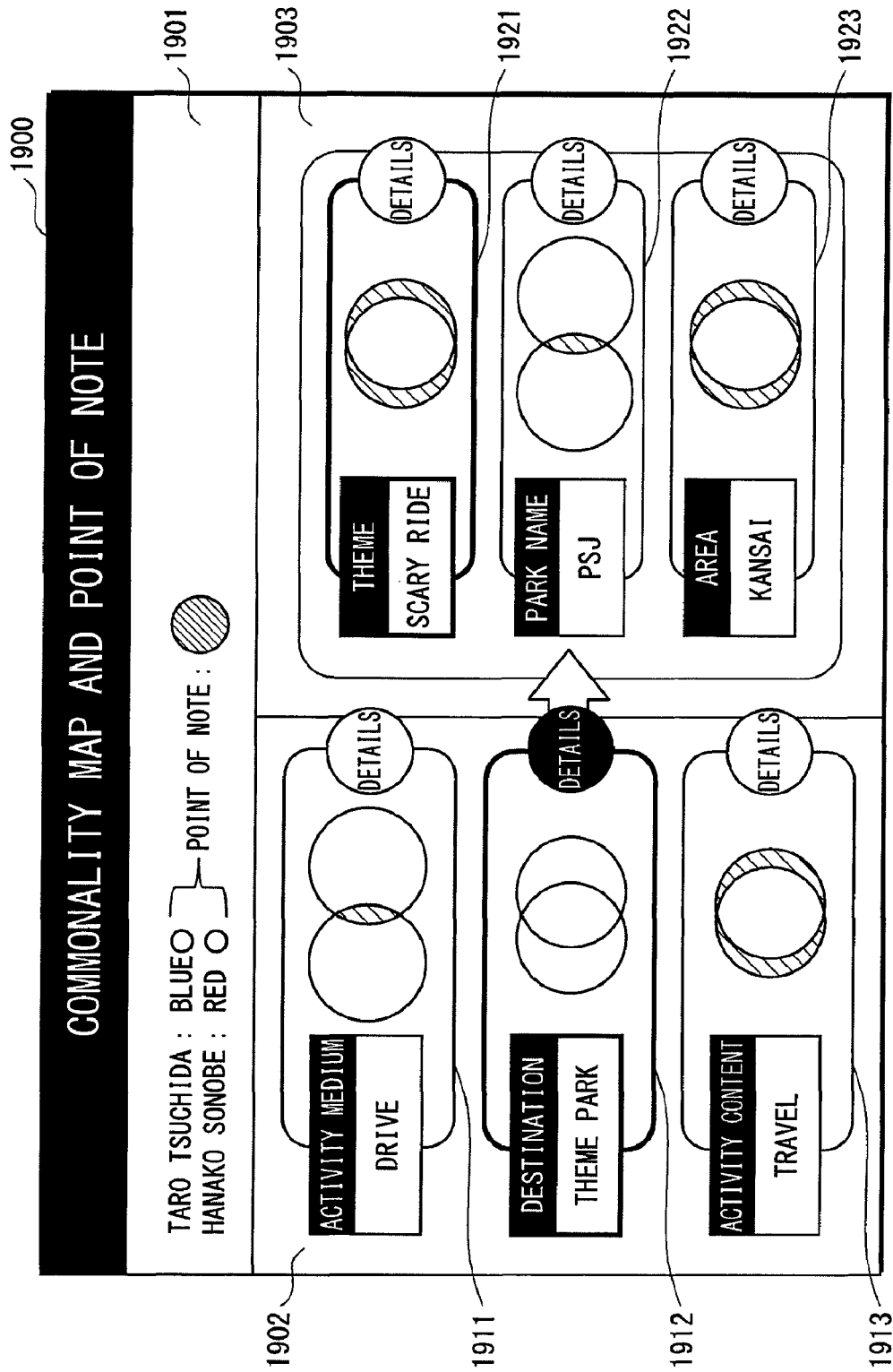
FIG. 39 shows an example of a screen display that includes commonality map images.

Note that FIG. 39 is an image displayed in the following situation. In the case of FIG. 37 being displayed, the details image button of the commonality map image 1811 is selected. If a user operation is performed to instead select the details image button of the commonality map image 1812, the image displayed after the details image button of the commonality map image 1812 is selected is the image shown in FIG. 39. The displayed image changes from the image 1803 relating to the attribute value "drive" of the attribute "recording medium" to the image 1903 relating to the attribute value "theme park" of the attribute "destination".

In this way, depending on which of the plurality of displayed details image buttons is selected, the user can change which "attribute" and "attribute value" the displayed detailed commonality map image is the commonality map image of.

Note that the reason that attribute values are used in processing the common relationship such as the commonality ratio is that unlike commercial contents, when information acquired by a camera or a sensor used by an individual is used, it is highly likely that, unlike in the previous embodiment, content IDs used commonly by users will not exist, or that IDs will not be used at all.

However, an alternative is to allocate grouping IDs to the attribute values.

10. Further Remarks

Although the present invention has been described based on the above embodiments, the present invention is by no means limited to the above embodiments. Cases such as the following are also included in the present invention.

(1) Although the content IDs are the first judgment criterion in the content selection criteria in the described embodiments, other information may be used.

For instance, other information relating to content may be used, examples being genre, artist, distribution date and time, or distribution period.

(2) Although song ID, artist name and the like are used as attributes in the above-described embodiments, any kind of criteria that enable classification of contents may be used as the attributes.

For instance, producer name, musical instrument used, artist management company, distribution date and time, or distribution period may be used as attributes.

(3) In the case that a plurality of content IDs are selected, the order in which the content IDs are displayed may be determined based on a criterion other than attributes.

For instance, the content IDs may be presented in descending order of how many times the contents corresponding to the selected content IDs have been reproduced. Alternatively, in the case of contents purchased on the Internet, the number of downloads of each content may be acquired separately, and the content IDs may be presented in descending order of the number of downloads.

(4) Although an example of the content recommending device 1 acquiring two pieces of viewing/listening history information as user profiles is described in the embodiments, the number of user profiles acquired is not limited to two. For instance, three or more user profiles may be acquired and processed.

Furthermore, the commonality ratio S is not limited to being calculated with respect to a subset common to all sets, but may be calculated with respect to sets that include a common parts. When the calculated commonality ratio S is a predetermined value of higher, one or more sets other than the sets including the common part may be selected.

Figure 23:
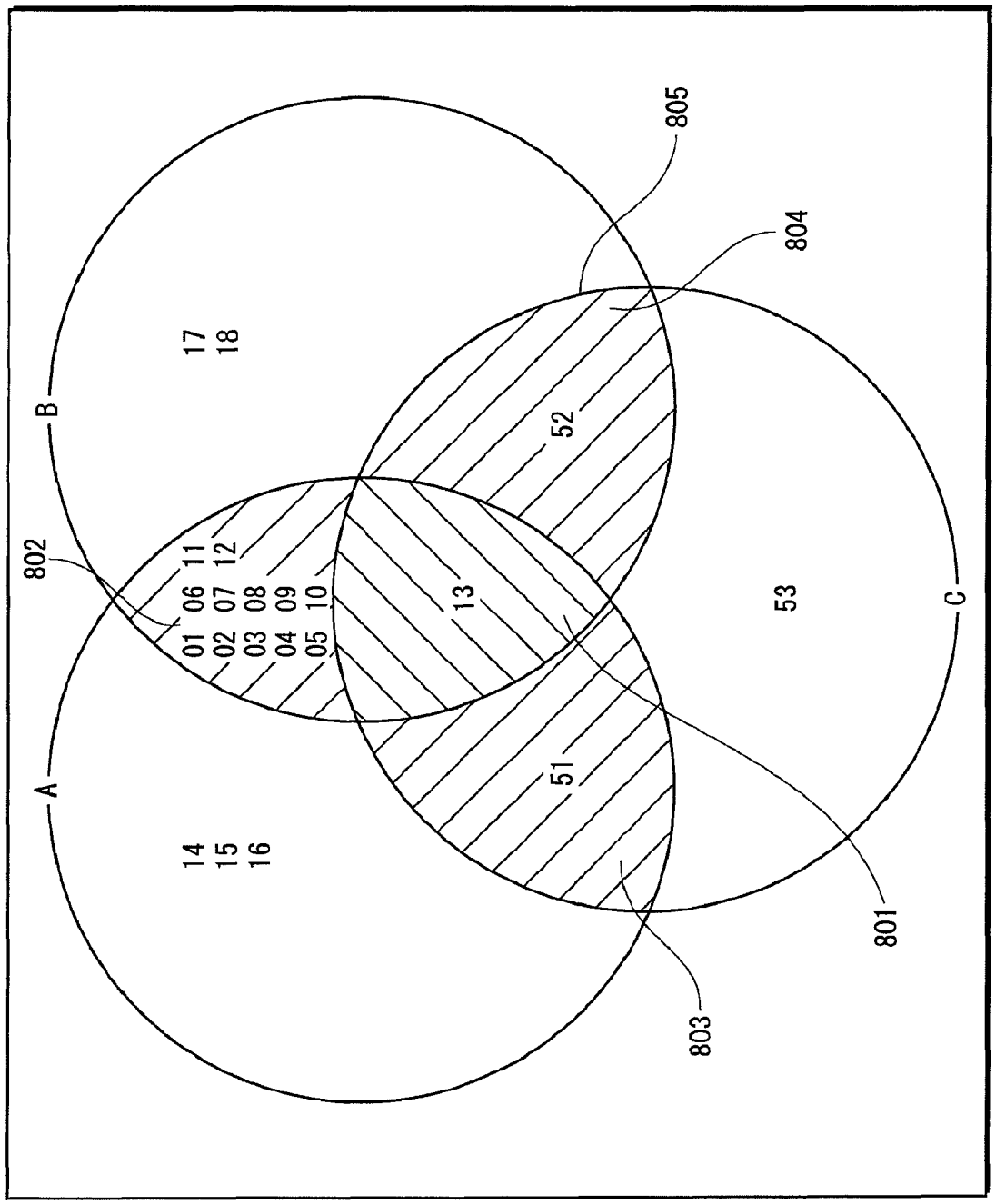
FIG. 23 is a Venn diagram in a case that three user profiles are used.

This is described using the Venn diagram in FIG. 23 as an example.

Here, Set A={01, 02, 03, 04, 05, 06, 07, 08, 09, 10, 11, 12, 13, 14, 15, 16, 51}, Set B={01, 02, 03, 04, 05, 06, 07, 08, 09, 10, 11, 12, 13, 17, 18, 52}, and Set C={13, 51, 52, 53}.

Although the commonality ratio S is calculated with respect to the set (A&B&C) in the embodiments, in the present modification example, the commonality ratio S is calculated with respect to a subset that is the overlapping part of at least two sets.

For instance, the commonality ratio S may be calculated with respect to each of a set 801, a set 802, a set 803, and a set 804 in FIG. 23, or may be calculated with respect to a set 805 that is a set combining the set 801, the set 802, the set 803, and the set 804.

For instance, when the commonality ratio S calculated with respect to the set 805 is a predetermined value or higher, the following set may be selected: set ((A|B|C)−((A&B|(B&C)|(C&A))).

Here, the set 801 is the set (A&B&C), the set 802 is the set ((A&B)−(A&B&C)), the set 803 is the set ((A&C)−(A&B&C)), the set 804 is the set ((B&C)−(A&B&C)), and the set 805 is the set ((A&B)|(B&C)|(C&A)).

(5) Although a case in which the ratio of a product set and a union is calculated as the commonality ratio S is described in the embodiments, a different criterion may be used for the commonality ratio S.

(6) In the above, the description of content recommending processing, a recommended content display UI, and the like is based on a case in which the content information is in a hierarchical structure. However, if the content information is not in a hierarchical structure, the commonality ratio S may for instance be calculated as follows. Namely, instead of using a detailed attribute that is on a level below the attribute that is the target of the set, the commonality ratio S may be calculated by using an attribute other than the attribute that is the target of the set, and the result of this processing may be displayed as a Venn diagram.

(7) In the embodiments, a description is given of an example of history of data of photos taken by a camera used by a user and detected by a sensor being used as a user profile. However, the present invention is not limited to this. Other data history may be used as a user profile.

(8) In the descried embodiments, in the example of using the viewing/listening history of commercial content such as songs, the sets of content IDs are used as profiles, and the commonality ratio is calculated from the product set and the union of the sets. However, the present invention is not limited to this.

As shown in the example of personal contents being used in the ninth embodiment, grouping IDs may be used as elements of the sets, and the commonality ratio may be calculated based on the product set and union of these sets.

Furthermore, when the content information is not defined as a hierarchical structure, instead of displaying the commonality ratio of attributes on the lower levels as detailed attributes, the commonality ratio S may be calculated using different attributes, and the resultant Venn diagrams may be displayed.

(9) In the described embodiments, an explanation was given of calculating a commonality ratio from the union and product set of a set having grouping IDs as elements when the data history of personal contents is used. However, the present invention is not limited to this.

For instance, in an environment in which contents can be exchanged between users by using a user content exchange system or the like, when there are content IDs shared by users, a commonality ratio may be calculated from the union and product set of sets whose elements are the content IDs, as described in the examples using commercial contents in embodiments 1 to 8.

(10) In the described embodiments, viewing/listening history of commercial content such as usage of songs and data history of personal contents are described separately. However, both types of history may be treated as one data history relating to user activities. Here, for instance, the usage of the commercial contents may be processed in the same way as the attributes in the data history of the private contents ("activity medium", "destination", "activity contents"), and content recommendations, recommended content usage UI generation and the like may be performed based on both the commercial contents and the personal contents.

(11) In the described embodiments, a description is given of processing for content recommendation and content usage UI generation using data history of content information. However, processing such as that described in the ninth embodiment may be performed using data history of user activities, locations and the like that are unrelated to contents (i.e., unrelated to commercial content such as music and personal content such as photographs), and UIs such as those described using FIGS. 36 to 39 in the ninth embodiment may be generated based on the data history of the user activities, locations and the like.

(12) In the described embodiments, a description is given of using a Venn diagram as the display style for ascertaining a common relationship between users, expressing the commonality ratio between users by way of the degree to which the circles in the Venn diagrams overlap, and making the parts of the Venn diagram distinguishable by use of color. However, the parts of the Venn diagram may be displayed in a more easily distinguishable manner by further enhancing the Venn diagram.

For instance, the common relationship between users may be made more easily ascertainable by setting the color of the overlapping area between users in the Venn diagram so as to be a mix of colors set for the users on whom the overlapping area is based. The mix may be made by additive color mixing or subtractive color mixing of the colors set for the users.

Another example of how the common relationship between users can be made more easily ascertainable is to make the color of the areas representing the users in the Venn diagram, or the boundaries of said areas, darker, the higher (or the lower) the commonality ratio between the users is.

A further example of how the common relationship between users can be made more easily ascertainable is to make the color of the overlapping area of users in the Venn diagram darker, the higher (or lower) the commonality ratio between the users is.

Yet a further example of how the common relationship between users can be made more easily ascertainable is to make the color of the area that is to stimulate conversation in the displayed Venn diagram darker, the smaller (or larger) that area is. When diagonal lines are used to distinguish the area that is to stimulate conversation as described in the embodiments, the number of lines may for instance be increased, the smaller (or larger) the area is.

(13) In the described embodiments, a description was given of using Venn diagrams as the display style for ascertaining a commonality ratio between users, and expressing the commonality ratio between users by way of the degree to which the circles in the Venn diagrams overlap. However, another method may be used to express the commonality ratio between users. For instance, a certain marker or facial expression may be put in correspondence with each of various ranges of the commonality ratio. Displaying a marker or facial expression enables the common relationship between users to be Ascertained by a user.

(14) Each described device is, specifically, a computer system composed of a microprocessor, a ROM, a RAM, a hard disk unit, a display unit, a keyboard, a mouse, and the like. A computer program is stored in the RAM or the hard disk unit. The computer program is composed of a plurality of instruction codes showing instructions with respect to a computer in order to have predetermined functions achieved. Each device achieves predetermined functions by the microprocessor operating according to the computer programs. In other words, the microprocessor reads one of the instructions included in the computer program at a time, decodes the read instruction, and operates in accordance with the result of the decoding.

(15) All or part of the compositional elements of each device may be composed of one system LSI (Large Scale Integrated circuit) The system LSI is a super-multifunctional LSI on which a plurality of compositional units are manufactured integrated on one chip, and is specifically a computer system that includes a microprocessor, a ROM, a RAM, or the like. A computer program is stored in the RAM. The system LSI achieves its functions by the microprocessor operating according to the computer program. The units that are the compositional elements of each of the devices may be realized separately with individual chips, or part or all may be included on one chip.

Here, the LSI may be an IC, a system LSI, a super LSI, or ultra LSI, depending on the degree of integration.

Furthermore, the integration of circuits is not limited to being realized with LSI, but may be realized with a special-purpose circuit or a general-use processor. Alternatively, the integration may be realized with use of an FPGA (field programmable gate array) that is programmable after manufacturing of the LSI, or a re-configurable processor that enables re-configuration of the connection and settings of circuit cells in the LSI.

Furthermore, if technology for an integrated circuit that replaces LSIs appears due to advances in or derivations from semiconductor technology, that technology may be used for integration of the functional blocks. Bio-technology is one possible application.

(16) Part or all of the compositional elements of each device may be composed of a removable IC card or a single module. The IC card or the module is a computer system composed of a microprocessor, a ROM, a RAM, or the like. The IC card or the module may be included the aforementioned super-multifunctional LSI. The IC card or the module achieves its functions by the microprocessor operating according to computer program. The IC card or the module may be tamper-resistant.

(17) The present invention may be methods shown by the above. Furthermore, the methods may be a computer program realized by a computer, and may be a digital signal representing the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal. Furthermore, the present invention may be the computer program or the digital signal recorded on any of the aforementioned recording media.

Furthermore, the present invention may be the computer program or the digital signal transmitted on a electric communication network, a wireless or wired communication network, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

(5) The present invention may be any combination of the above-described embodiment and modifications.

INDUSTRIAL APPLICABILITY

The present invention is suitable for use as a content reproduction device or the like, such a portable music player that selects and reproduces content from among multiple contents.

The invention claimed is:

1. An information presenting device for presenting a relationship between pluralities of data pieces, each plurality of data pieces of the pluralities of data pieces being held by a respective one of a plurality of users, the information presenting device comprising:
    an acquiring unit operable to acquire at least (i) a first information group including a first plurality of data pieces, each data piece of the first plurality of data pieces being held by a first user and having a first attribute and a second attribute attached thereto, and (ii) a second information group including a second plurality of data pieces, each data piece of the second plurality of data pieces being held by a second user and having the first attribute and the second attribute attached thereto;
    a generating unit operable to, (i) with respect to each different attribute value of a plurality of different attribute values of the first attribute, extract data pieces, of the first plurality of data pieces, having a same attribute value of the first attribute from the first information group so as to generate respective first subgroups each consisting of the data pieces having the same attribute value of the first attribute extracted from the first information group and (ii), with respect to each different attribute value of a plurality of different attribute values of the first attribute, extract data pieces, of the second plurality of data pieces, having a same attribute value of the first attribute from the second information group so as to generate respective second subgroups each consisting of the data pieces having the same attribute value of the first attribute extracted from the second information group;

a calculating unit operable to, with respect to each of one or more pairs of the generated first and second subgroups pertaining to a same attribute value of the first attribute from among all of the first and second subgroups generated by the generating unit, calculate a commonality between attribute values of the second attribute attached to the data pieces of the first subgroup and attribute values of the second attribute attached to the data pieces of the second subgroup, for each of different attribute values of the second attribute;

a determining unit operable to determine a presentation order in which to present all of the commonalities calculated by the calculating unit, the presentation order being determined based on how many data pieces are contained in each of the one or more pairs of the generated first and second subgroups; and a presenting unit operable to present the commonalities calculated by the calculating unit arranged in the presentation order determined by the determining unit.

2. The information presenting device of claim 1, wherein the presenting unit includes:
a set selecting sub-unit operable to, with respect to each of the one or more pairs of the generated first and second subgroups, select one of (a) a product set of the first subgroup and the second subgroup and (b) a difference set of (i) the first subgroup or the second subgroup and (ii) the product set; and
a display sub-unit operable to display the commonalities arranged in the determined presentation order and in a manner such that the selected one of the product set and the difference set is easily distinguishable from any other displayed set.

3. The information presenting device of claim 2, wherein the set selecting sub-unit selects the difference set when a ratio of a number of elements in the product set and a number of elements in a union is a predetermined value or higher.

4. The information presenting device of claim 2, wherein the set selecting sub-unit selects the product set when a ratio of a number of elements in the product set and a number of elements in a union is lower than a predetermined value.

5. The information presenting device of claim 1, wherein the determining unit determines the presentation order as a descending order of a number of elements contained in each of a plurality of unions, each respective union of the plurality of unions being a union of the first and second subgroups of a pair of the one or more pairs of the generated first and second subgroups.

6. The information presenting device of claim 1, wherein the determining unit determines the presentation order as a descending order of size of the commonalities of each of the one or more pairs of the generated first and second subgroups.

7. The information presenting device of claim 1,
wherein the calculating unit further calculates, with respect to each different attribute value of the plurality of different attribute values of the first attribute, a commonality between attribute values of the first attribute attached to the data pieces of the first subgroup and attribute values of the first attribute attached to the data pieces of the second subgroup, and wherein the presenting unit is further operable to illustrate, to a user, the calculated commonalities between attribute values of the first attribute in a visualized manner.

8. The information presenting device of claim 7, wherein the presenting unit is further operable to receive a switch instruction from the user to switch the presentation, and when the switch instruction is received, switch from the illustration of the commonality of the first attributes to an illustration of commonalities of the second attributes, the illustration of the commonalities of the second attributes being details of what is illustrated in the illustration of the commonality of the first attributes.

9. The information presenting device of claim 7, wherein the presenting unit is further operable to receive a switch instruction from the user to switch the presentation, and when the switch instruction is received, switch from the illustration of the commonality of the first attributes to an illustration of commonalities of the first attributes and the second attributes, the illustration of the commonalities of the first attributes and the second attributes being details of what is illustrated in the illustration of the commonality of the first attributes.

10. The information presenting device of claim 7,
wherein the presenting unit for each of the one or more pairs of the generated first and second subgroups, when the commonality between the first attributes attached to the data pieces of the first subgroup and the first attributes attached to the data pieces of the second subgroup is equal to or greater than a predetermined value, selects a difference set of (a) the first information group or the second information group and (b) a product set of the first information group and the second information group, and
wherein the presenting unit displays the selected difference set in a manner that the selected difference set is easily distinguishable from any other displayed set.

11. The information presentation device of claim 7,
wherein the presenting unit for each of the one or more pairs of the generated first and second subgroups, when the commonality between the first attributes attached to the data pieces of the first subgroup and the first attributes attached to the data pieces of the second subgroup is less than a predetermined value, selects a product set of the first information group and the second information group, and
wherein the presenting unit displays the selected product set in a manner that the selected difference set is easily distinguishable from any other displayed set.

12. The information presenting device of claim 7, wherein the presenting unit displays the calculated commonality of the first attributes and calculated commonalities of the second attributes for each of the one or more pairs of the generated first and second subgroups.

13. The information presenting device of claim 1, wherein each respective first attribute of the first information group and the second information group is a grouping ID showing a grouping to which a respective data piece belongs, and each respective second attribute of the first information group and the second information group is a data ID that identifies the respective data piece.

14. The information presenting device of claim 1, wherein each respective first attribute of the first information group and the second information group is a grouping ID showing a grouping to which a respective data piece belongs, and each respective second attribute of the first information group and the second information group is a different grouping ID than the respective first attribute.

15. The information presenting device of claim 1,
wherein the first and second attributes of the first information group and the second information group compose a tree structure in which the first attributes are on a top level and the second attributes are on a level below the top level, and
wherein possible values of the second attributes are predetermined in advance in correspondence with contents of the first attributes.

16. The information presenting device of claim 1, wherein the presenting unit displays, for each of the one or more pairs of the generated first and second subgroups, each commonality in a visualized manner by displaying a Venn diagram showing a relationship between the first subgroup and the second subgroup.

17. The information presenting device of claim 1, wherein each data piece is digital content.

18. The information presenting device of claim 1, wherein each data piece is data history.

19. The information presenting device of claim 1, further comprising:
a commonality calculating unit operable to calculate a commonality relating to the acquired first information group and the acquired second information group;
a set selecting unit operable to, based on the commonality related to the acquired first information group and the acquired second information group, select one of (a) a common set consisting of common portions of the first information group and the second information group, and (b) a non-common set consisting of one of (i) a portion of the first information group, excluding the common portion of the first information group and (ii) a portion of the second information group, excluding the common portion of the second information group; and
an information selecting unit operable to select data information pieces included in the one of the common set and the non-common set selected by the set selecting unit.

20. The information presenting device of claim 19, wherein the set selecting unit selects the non-common set when the commonality related to the acquired first information group and the acquired second information group is a predetermined value or higher.

21. The information presenting device of claim 19, wherein the set selecting unit selects the common set when the commonality related to the acquired first information group and the acquired second information group is lower than a predetermined value.

22. The information presenting device of claim 19, wherein the commonality calculating unit (a) calculates a first number showing how many data information pieces are included in at least one of the first information group and the second information group, (b) calculates a second number showing how many data information pieces are included in the common set, and (c) calculates, as the commonality related to the acquired first information group and the acquired second information group, a ratio of the second number to the first number.

23. The information presentation device of claim 19,
wherein each data information piece includes a respective data ID identifying the respective data piece, and a respective grouping ID showing which grouping the data piece belongs to,
wherein the acquiring unit (a) acquires a third information group including a third plurality of data information pieces, and a fourth information group including of a fourth plurality of data information pieces, (b) with respect to each value of the respective grouping IDs included in the data information pieces of the third information group and the fourth information group, generates the first information group consisting of one or more data information pieces whose respective grouping ID has the value from among the data information pieces of the third information group, and generates the second information group consisting of one or more data information pieces whose respective grouping ID has the value from among the data information pieces of the fourth information group,
wherein the commonality calculating unit is further operable to calculate, with respect to each value of the respective grouping IDs, a commonality of the first information group and the second information group corresponding to the respective grouping ID,
wherein the set selecting unit is further operable to (a) select at least one of the respective grouping IDs in descending order of a size of the commonalities corresponding to values of the respective grouping IDs, and (b) based on the commonality corresponding to the selected at least one grouping ID, select one of (i) a common set consisting of common portions of the first and second information groups corresponding to a value of the selected at least one grouping ID, and (ii) a non-common set consisting portions from the first information group and the second information group corresponding to a value of the selected at least one grouping ID excluding the common portions, and
wherein the information selecting unit selects one or more data information pieces included in the one of the common set and the non-common set selected by the set selecting unit.

24. An information presenting method used in an information presenting device for presenting a relationship between pluralities of data pieces, each plurality of data pieces of the pluralities of data pieces being held by a respective one of a plurality of users, the information presenting method comprising:
an acquiring step of acquiring at least (i) a first information group including a first plurality of data pieces, each data piece of the first plurality of data pieces being held by a first user and having a first attribute and a second attribute attached thereto, and (ii) a second information group including a second plurality of data pieces, each data piece of the second plurality of data pieces being held by a second user and having the first attribute and the second attribute attached thereto;
a generating step of (i), with respect to each different attribute value of a plurality of different attribute values of the first attribute, extracting data pieces, of the first plurality of data pieces, having a same attribute value of the first attribute from the first information group so as to generate respective first subgroups each consisting of the data pieces having the same attribute value of the first attribute extracted from the first information group and (ii), with respect to each different attribute value of a plurality of different attribute values of the first attribute, extracting data pieces, of the second plurality of data pieces, having a same attribute value of the first attribute from the second information group so as to generate respective second subgroups each consisting of the data pieces having the same attribute value of the first attribute extracted from the second information group;
a calculating step of, with respect to each of one or more pairs of the generated first and second subgroups pertaining to a same attribute value of the first attribute from among all of the first and second subgroups generated by the generating step, calculating a commonality between attribute values of the second attribute attached to the data pieces of the first subgroup and attribute values of the second attribute attached to the data pieces of the second subgroup, for each of different attribute values of the second attribute;

a determining step of determining a presentation order in which to present all of the commonalities calculated by the calculating step, the presentation order being determined based on how many data pieces are contained in each of the one or more pairs of the generated first and second subgroups; and a presenting step of presenting the commonalities calculated by the calculating step arranged in the presentation order determined by the determining step.

25. An non-transitory computer-readable recording medium having an information presenting program recorded thereon, the information presenting program being used by an information presenting device for presenting a relationship between pluralities of data pieces, each plurality of data pieces of the pluralities of data pieces being held by a respective one of a plurality of users, and the information presenting program causing a computer to execute a method comprising:

an acquiring step of acquiring at least (i) a first information group including a first plurality of data pieces, each data piece of the first plurality of data pieces being held by a first user and having a first attribute and a second attribute attached thereto, and (ii) a second information group including a second plurality of data pieces, each data piece of the second plurality of data pieces being held by a second user and having the first attribute and the second attribute attached thereto;

a generating step of (i), with respect to each different attribute value of a plurality of different attribute values of the first attribute, extracting data pieces, of the first plurality of data pieces, having a same attribute value of the first attribute from the first information group so as to generate respective first subgroups each consisting of the data pieces having the same attribute value of the first attribute extracted from the first information group and (ii), with respect to each different attribute value of a plurality of different attribute values of the first attribute, extracting data pieces, of the second plurality of data pieces, having a same attribute value of the first attribute from the second information group so as to generate respective second subgroups each consisting of the data pieces having the same attribute value of the first attribute extracted from the second information group;

a calculating step of, with respect to each of one or more pairs of the generated first and second subgroups pertaining to a same attribute value of the first attribute from among all of the first and second subgroups generated by the generating step, calculating a commonality between attribute values of the second attribute attached to the data pieces of the first subgroup and attribute values of the second attribute attached to the data pieces of the second subgroup, for each of different attribute values of the second attribute;

a determining step of determining a presentation order in which to present all of the commonalities calculated by the calculating step, the presentation order being determined based on how many data pieces are contained in each of the one or more pairs of the generated first and second subgroups; and a presenting step of presenting the commonalities calculated by the calculating step arranged in the presentation order determined by the determining step.

26. An integrated circuit used in an information presenting device for presenting a relationship between pluralities of data pieces, each plurality of data pieces of the pluralities of data pieces being held by a respective one of a plurality of users, the integrated circuit comprising:

an acquiring unit operable to acquire at least (i) a first information group including a first plurality of data pieces, each data piece of the first plurality of data pieces being held by a first user and having a first attribute and a second attribute attached thereto, and (ii) a second information group including a second plurality of data pieces, each data piece of the second plurality of data pieces being held by a second user and having the first attribute and the second attribute attached thereto;

a generating unit operable to (i), with respect to each different attribute value of a plurality of different attribute values of the first attribute, extract data pieces, of the first plurality of data pieces, having a same attribute value of the first attribute from the first information group so as to generate respective first subgroups each consisting of the data pieces having the same attribute value of the first attribute extracted from the first information group and (ii), with respect to each different attribute value of a plurality of different attribute values of the first attribute, extract data pieces, of the second plurality of data pieces, having a same attribute value of the first attribute from the second information group so as to generate respective second subgroups each consisting of the data pieces having the same attribute value of the first second attribute extracted from the second information group;

a calculating unit operable to, with respect to each of one or more pairs of the generated first and second subgroups pertaining a same attribute value of the first attribute from among all of the first and second subgroups generated by the generating unit, calculate a commonality between attribute values of the second attribute attached to the data pieces of the first subgroup and attribute values of the second attribute attached to the data pieces of the second subgroup, for each of different attribute values of the second attribute;

a determining unit operable to determine a presentation order in which to present all of the commonalities calculated by the calculating unit, the presentation order being determined based on how many data pieces are contained in each of the one or more pairs of the generated first and second subgroups; and a presenting unit operable to present the commonalities calculated by the calculating unit arranged in the presentation order determined by the determining unit.

* * * * *